US012784620B2

(12) United States Patent
Lee et al.

(10) Patent No.: US 12,784,620 B2
(45) Date of Patent: Nov. 3, 2026

(54) DISPLAY DEVICE AND HEAD MOUNTED DISPLAY DEVICE

(71) Applicant: Samsung Display Co., LTD., Yongin-si (KR)

(72) Inventors: Yong Hee Lee, Yongin-si (KR); Jin Seon Kwak, Yongin-si (KR); Kyung Bae Kim, Yongin-si (KR); Ok Kyung Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/917,642

(22) Filed: Oct. 16, 2024

(65) Prior Publication Data

US 2025/0279017 A1 Sep. 4, 2025

(30) Foreign Application Priority Data

Mar. 4, 2024 (KR) ........................ 10-2024-0030803

(51) Int. Cl.
*G09G 3/00* (2006.01)
*G02B 27/01* (2006.01)

(52) U.S. Cl.
CPC ......... *G09G 3/002* (2013.01); *G02B 27/0172* (2013.01); *G02B 2207/101* (2013.01); *G09G 2300/0439* (2013.01)

(58) Field of Classification Search
CPC ........... G09G 3/002; G09G 2300/0439; G02B 27/0172; G02B 2207/101; G02B 27/017;
(Continued)

(56) References Cited

U.S. PATENT DOCUMENTS 5,739,800 A * 4/1998 Lebby .................... H04N 23/55 345/82
5,818,404 A * 10/1998 Lebby ................. H04M 1/0202 345/82

(Continued)

FOREIGN PATENT DOCUMENTS

KR 10-2020-0079389 A 7/2020
WO WO 2022/162490 A1 8/2022

*Primary Examiner* — Temesghen Ghebretinsae
*Assistant Examiner* — Karin Kiyabu
(74) *Attorney, Agent, or Firm* — Womble Bond Dickinson (US) LLP

(57) ABSTRACT

A display device and a head mounted display device are provided. A display device includes: a first single crystal semiconductor substrate on which a plurality of pixel circuits arranged along a first direction and a second direction intersecting the first direction is located, the plurality of pixel circuits including a first transistor; a second single crystal semiconductor substrate on the first single crystal semiconductor substrate, the second single crystal semiconductor substrate on which a plurality of sub-pixels including a plurality of light emitting elements and arranged along the first direction and the second direction is located; and a connection line layer between the plurality of light emitting elements and the first single crystal semiconductor substrate and including a plurality of bridge lines, each of the plurality of bridge lines electrically connected to one of the plurality of pixel circuits and one of the plurality of sub-pixels.

20 Claims, 31 Drawing Sheets

(58) Field of Classification Search
CPC ............. H10K 59/1213; H10K 59/123; H10K 59/1275; H10K 59/131; H10K 77/10; H10K 59/87
See application file for complete search history.

(56) References Cited

U.S. PATENT DOCUMENTS

| | | | | |
|---|---|---|---|---|
| 6,633,134 | B1 * | 10/2003 | Kondo | H10K 59/131 313/506 |
| 9,829,710 | B1 * | 11/2017 | Newell | G09G 3/3659 |
| 12,538,651 | B2 * | 1/2026 | Iwane | G02B 27/0172 |
| 2023/0047907 | A1 * | 2/2023 | Seto | H10K 77/10 |
| 2023/0170353 | A1 | 6/2023 | Aoyagi | |
| 2024/0090284 | A1 | 3/2024 | Kozuma et al. | |
| 2025/0048858 | A1 * | 2/2025 | Choi | H10K 59/1201 |
| 2025/0143104 | A1 * | 5/2025 | Kwak | H10K 59/1275 |
| 2025/0176386 | A1 * | 5/2025 | No | H10K 59/131 |
| 2025/0224618 | A1 * | 7/2025 | No | G02B 27/0176 |
| 2025/0241150 | A1 * | 7/2025 | Kang | H10K 59/123 |
| 2025/0275364 | A1 * | 8/2025 | Kang | H10K 59/1213 |
| 2025/0324867 | A1 * | 10/2025 | Kang | H10K 59/1275 |
| 2025/0338731 | A1 * | 10/2025 | Kim | H10K 59/131 |
| 2025/0359432 | A1 * | 11/2025 | Kim | H10K 59/1213 |

* cited by examiner

DISPLAY DEVICE AND HEAD MOUNTED DISPLAY DEVICE

CROSS-REFERENCE TO RELATED APPLICATION

The present application claims priority to and the benefit of Korean Patent Application No. 10-2024-0030803, filed on Mar. 4, 2024, in the Korean Intellectual Property Office, the entire disclosure of which is incorporated herein by reference.

BACKGROUND

1. Field

One or more embodiments of the present disclosure relate to a display device and a head mounted display device.

2. Description of the Related Art

A head mounted display device (HMD) is an image display device that is worn on a user's head in the form of glasses or a helmet and focuses on a distance close to the user's eyes. The head mounted display device may implement virtual reality (VR) or augmented reality (AR).

The head mounted display device enlarges and displays an image displayed on a small display device using a plurality of lenses. Therefore, a display device applied to the head mounted display device may provide a high-resolution image, for example, an image having a resolution of 3000 pixels per inch (PPI) or higher. To this end, organic light emitting diode on silicon (OLEDoS), which is a high-resolution, small-sized organic light emitting display device, may be used as the display device applied to the head mounted display device. The OLEDOS is a device that displays an image by disposing an organic light emitting diode (OLED) on a semiconductor wafer substrate on which a complementary metal oxide semiconductor (CMOS) is disposed.

SUMMARY

Aspects and features of embodiments of the present disclosure provide a micro display device including a plurality of different single crystal semiconductor substrates and a head mounted display device including the same.

Aspects and features of embodiments of the present disclosure also provide a micro display device implemented by efficient layout design of connection wirings connecting two different semiconductor substrates and a method of manufacturing the same.

However, the present disclosure is not limited to those set forth herein. The above and other embodiments of the present disclosure will become more apparent to one of ordinary skill in the art to which the present disclosure pertains by referencing the detailed description of the present disclosure given below.

According to one or more embodiments a display device includes: a first single crystal semiconductor substrate on which a plurality of pixel circuits arranged along a first direction and a second direction intersecting the first direction is located, the plurality of pixel circuits comprising a first transistor; a second single crystal semiconductor substrate on the first single crystal semiconductor substrate, the second single crystal semiconductor substrate on which a plurality of sub-pixels comprising a plurality of light emitting elements and arranged along the first direction and the second direction is located; and a connection line layer between the plurality of light emitting elements and the first single crystal semiconductor substrate and comprising a plurality of bridge lines, each of the plurality of bridge lines electrically connected to one of the plurality of pixel circuits and one of the plurality of sub-pixels, wherein the second single crystal semiconductor substrate includes a plurality of through holes in which a corresponding ones of conductive vias electrically connected to corresponding ones of the plurality of light emitting elements of each of the plurality of sub-pixels and corresponding ones of the plurality of bridge lines is located, wherein the connection line layer comprises a first conductive layer at which a first bridge line is located, a second conductive layer at which a second bridge line is located, and an interlayer insulating layer between the first conductive layer and the second conductive layer, and wherein at least some of the plurality of sub-pixels are electrically connected to the first bridge line, and other ones of the plurality of sub-pixels adjacent to the sub-pixels connected to the first bridge line are electrically connected to the second bridge line.

According to one or more embodiments, outermost sub-pixels in the first direction and outermost sub-pixels in the second direction from among the plurality of sub-pixels are electrically connected to different first bridge lines.

According to one or more embodiments, sub-pixels adjacent to inside of the outermost sub-pixels in the first and second directions from among the plurality of sub-pixels are electrically connected to different second bridge lines.

According to one or more embodiments, a sub-pixel from among the plurality of sub-pixels of a first pixel row located at one side in the first direction is electrically connected to a pixel circuit from among the plurality of pixel circuits that is aligned in the first direction with the sub-pixel of the first pixel row, and a sub-pixel from among the plurality of sub-pixels of a second pixel row adjacent to one side of the first pixel row in the second direction is electrically connected to a pixel circuit from among the plurality of pixel circuits that is not aligned in the first direction with the sub-pixel of the second pixel row.

According to one or more embodiments, the bridge lines electrically connected to the sub-pixel of the first pixel row overlap the sub-pixel of the first pixel row.

According to one or more embodiments, at least a portion of the bridge lines electrically connected to the sub-pixel of the second pixel row overlaps the sub-pixel of the first pixel row.

According to one or more embodiments, a first sub-pixel located at an outermost portion of the first pixel row is connected to the first bridge line, a second sub-pixel adjacent to the first sub-pixel of the first pixel row is connected to the second bridge line, and the first bridge line connected to the first sub-pixel is located on an other side of the second bridge line connected to the second sub-pixel in the second direction.

According to one or more embodiments, a sub-pixel from among the plurality of sub-pixels of a first pixel column at an other side in the second direction is electrically connected to a pixel circuit from among the plurality of pixel circuits that is aligned in the second direction with the sub-pixel of the first pixel column, and a sub-pixel from among the plurality of sub-pixels of a second pixel column adjacent to an other side of the first pixel column in the first direction is electrically connected to a pixel circuit from among the plurality of pixel circuits that is not aligned in the second direction with the sub-pixel of the second pixel column.

According to one or more embodiments, a first sub-pixel at an outermost portion of the first pixel column is connected to the first bridge line, a second sub-pixel adjacent to the first sub-pixel of the first pixel column is connected to the second bridge line, and the first bridge line connected to the first sub-pixel is located at one side of the second bridge line connected to the second sub-pixel in the first direction.

According to one or more embodiments, a first sub-pixel at an outermost portion from among the plurality of sub-pixels arranged along a diagonal direction is connected to the first bridge line, a second sub-pixel adjacent to the first sub-pixel in the diagonal direction is connected to the second bridge line, and the second bridge line is located above the first bridge line.

According to one or more embodiments, a position of one end of the first bridge line in a sub-pixel from among the plurality of sub-pixels is different from a position of one end of the second bridge line in a sub-pixel adjacent to inside of the sub-pixel connected to the first bridge line.

According to one or more embodiments, the plurality of sub-pixels comprises overlapping sub-pixels that overlap the pixel circuits, and non-overlapping sub-pixels that do not overlap the pixel circuits, and wherein a portion of a bridge line connected to the non-overlapping sub-pixel from among the plurality of bridge lines does not overlap the first single crystal semiconductor substrate.

According to one or more embodiments, the bridge line connected to the non-overlapping sub-pixel from among the plurality of bridge lines is longer than a bridge line connected to the overlapping sub-pixels.

According to one or more embodiments, a bridge line connected to the overlapping sub-pixels from among the plurality of bridge lines has a zigzag shape.

According to one or more embodiments, an area of the first single crystal semiconductor substrate is smaller than an area of the second single crystal semiconductor substrate.

According to one or more embodiments, a display device includes: a first single crystal semiconductor substrate on which a plurality of first transistors and a plurality of pixel circuits are located, the plurality of pixel circuits comprising the first transistors; a second single crystal semiconductor substrate on the first single crystal semiconductor substrate, the second single crystal semiconductor substrate on which a plurality of sub-pixels comprising a plurality of light emitting elements is located; and a connection line layer between the plurality of light emitting elements and the first single crystal semiconductor substrate, wherein the second single crystal semiconductor substrate includes a plurality of through holes in which conductive vias electrically connected to corresponding ones of the plurality of light emitting elements of each of the plurality of sub-pixels is located, wherein the connection line layer comprises a plurality of conductive layers comprising a plurality of bridge lines and a plurality of bridge contacts, and an interlayer insulating layer between the plurality of conductive layers, and wherein the plurality of sub-pixels comprises a first sub-pixel connected to one of the plurality of pixel circuits through a first bridge line at a first conductive layer of the connection line layer, and a second sub-pixel connected to one of the plurality of pixel circuits through a second bridge line at a second conductive layer on the first conductive layer of the connection line layer.

According to one or more embodiments, the second bridge line is electrically connected to a first bridge contact at the first conductive layer, and the first bridge line is electrically connected to a second bridge contact at the second conductive layer.

According to one or more embodiments, each of the second bridge line and the second bridge contact is connected to corresponding one of the conductive vias.

According to one or more embodiments, at least a portion of the first bridge line is connected to the second bridge line at the second conductive layer.

According to one or more embodiments, a head mounted display device includes: a frame; a plurality of display devices on the frame; and lenses on each of the plurality of display devices, wherein the display device includes: a first single crystal semiconductor substrate including a plurality of pixel circuits arranged along a first direction and a second direction intersecting the first direction, the plurality of pixel circuits comprising a first transistor; a second single crystal semiconductor substrate on the first single crystal semiconductor substrate, the second single crystal semiconductor substrate including a plurality of sub-pixels comprising a plurality of light emitting elements and arranged along the first direction and the second direction; and a connection line layer between the plurality of light emitting elements and the first single crystal semiconductor substrate and comprising a plurality of bridge lines, each of the plurality of bridge lines electrically connected to one of the plurality of pixel circuits and one of the plurality of sub-pixels, wherein the second single crystal semiconductor substrate includes a plurality of through holes in which a corresponding ones of conductive vias electrically connected to corresponding ones of the plurality of light emitting elements of each of the plurality of sub-pixels and corresponding ones of the plurality of the bridge lines is located, wherein the connection line layer comprises a first conductive layer at which a first bridge line is located, a second conductive layer at which a second bridge line is located, and an interlayer insulating layer between the first conductive layer and the second conductive layer, and wherein at least some of the plurality of sub-pixels are electrically connected to the first bridge line, and other ones of the plurality of sub-pixels adjacent to the sub-pixels connected to the first bridge line are electrically connected to the second bridge line.

According to another aspect of the present disclosure, there is provided a display device.

According to still another aspect of the present disclosure, there is provided a head mounted display device.

The display device according to one embodiment may include two different single crystal semiconductor substrates, and a process of manufacturing the single crystal semiconductor substrate disposed below allows the manufacturing of a large number of single crystal semiconductor substrates per unit wafer substrate, thereby improving manufacturing yield.

The display device according to one embodiment may include an efficient layout design in which the connection wirings connecting the two different single crystal semiconductor substrates do not interfere with each other even on a single crystal semiconductor substrate with a relatively small area.

BRIEF DESCRIPTION OF THE DRAWINGS

The above and other embodiments and features of the present disclosure will become more apparent by describing embodiments thereof with reference to the attached drawings, in which.

DETAILED DESCRIPTION

Figure 1:
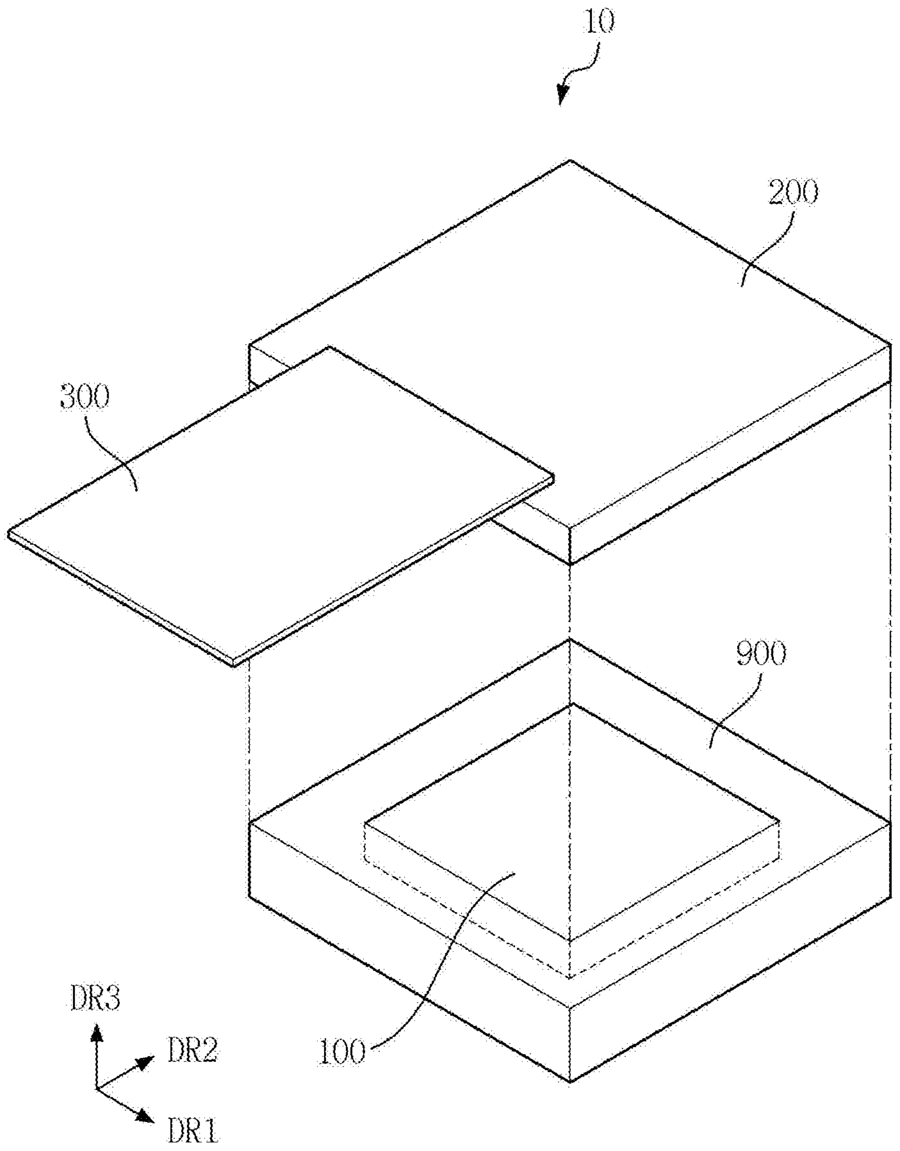
FIG. 1 is an exploded perspective view of the display device according to one or more embodiments.

Aspects and features of embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that the present disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the present disclosure. Thus, embodiments disclosed herein should not be construed as limited to the particular illustrated shapes of regions, but are to include deviations in shapes that result from, for instance, manufacturing.

For example, an implanted region illustrated as a rectangle may have rounded and/or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit and scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and/or the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements and/or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "in a plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of the present disclosure, expressions such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, XZ, YZ, and ZZ, or any variation thereof. Similarly, the expression such as "at least one of A and/or B" may include A, B, or A and B. As used herein, the term "and/or" includes any and all combinations of one or more of the associated listed items. For example, the expression such as "A and/or B" may include A, B, or A and B. Further, the use of "may" when describing embodiments of the present disclosure refers to "one or more embodiments of the present disclosure".

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (a) and 35 U.S.C. § 132 (a).

The electronic or electric devices and/or any other relevant devices or components according to one or more embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, and/or the like. Also, a person of skill in the art should recognize that the functionality of various computing devices may be combined or integrated into a single computing device, or the functionality of a particular computing device may be distributed across one or more other computing devices without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning for example consistent with their meaning in the context of the relevant art and/or the present specification, and should not be interpreted in an idealized or overly formal sense, unless expressly so defined herein.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

FIG. 1 is an exploded perspective view of the display device according to one or more embodiments.

Referring to FIG. 1, a display device 10 according to one or more embodiments is a device that displays a moving image and/or a still image. The display device 10 according to one or more embodiments may be applied to portable electronic devices such as a mobile phone, a smart phone, a tablet personal computer (PC), a mobile communication terminal, an electronic notebook, an electronic book, a portable multimedia player (PMP), navigation, and/or an ultra mobile PC (UMPC). For example, the display device 10 may be applied to a display part of a television, a laptop computer, a monitor, a billboard, or the Internet of Things (IoT). Alternatively, the display device 10 may be applied to a smart watch, a watch phone, and a head mounted display device (HMD) for implementing virtual reality and/or augmented reality.

The display device 10 according to one or more embodiments may include a driving part 100, a display part 200, and a circuit board 300. The display device 10 may further include a protective layer 900 disposed around the driving part 100.

The driving part 100 may have a planar shape similar to a quadrangle. For example, the driving part 100 may have a planar shape similar to a rectangle having one side in a first direction DR1 and the other side in a second direction DR2 intersecting the first direction DR1. The one side of the driving part 100 in the first direction DR1 and the other side thereof in the second direction DR2 may have different lengths. In the driving part 100, a corner where the one side in the first direction DR1 and the other side in the second direction DR2 meet may be rounded to have a suitable curvature (e.g., a predetermined curvature) or may be formed at a right angle. The planar shape of the driving part 100 is not limited to the quadrangle, and may be formed similarly to other polygons, circles, and/or ovals.

The display part 200 may be disposed on the driving part 100. In the display device 10, the driving part 100 and the display part 200 may be bonded to each other. Unlike the driving part 100, the display part 200 may have a shape similar to a square. For example, the driving part 100 may have a planar shape similar to a square having one side in the first direction DR1 and the other side in the second direction DR2 intersecting the first direction DR1. The planar shape of the display part 200 is not limited to the quadrangle, and may be formed similarly to other polygons, circles, and/or ovals. A planar shape of the display device 10 may follow the planar shape of the display part 200, but is not limited thereto.

According to one or more embodiments, the display device 10 may have a planar area of the display part 200 that is greater than a planar area of the driving part 100. The display device 10 includes the driving part 100 and the display part 200 that include different substrates, and the driving part 100 and the display part 200 may have different areas. An element formed in the driving part 100 and an element formed in the display part 200 may be different from each other, and the elements may be individually formed on different substrates. The display device 10 may be manufactured by forming a plurality of elements with different sizes, line widths, and/or manufacturing processes on different substrates and then bonding the substrates, and has an advantage of improving performance and manufacturing yield of a product.

The circuit board 300 may be electrically connected to a plurality of pads of a pad area of the display part 200 by using a conductive adhesive member such as an anisotropic conductive film. The circuit board 300 may be a flexible printed circuit board (FPCB) or flexible film made of a flexible material. It is illustrated in FIG. 1 that the circuit board 300 is unfolded, but the circuit board 300 may be bent. In this case, one end of the circuit board 300 may be disposed on a lower surface of the driving part 100. The other end of the circuit board 300 may be connected to the plurality of pads in the pad area of the display part 200 using a conductive adhesive member. In one or more embodiments, the circuit board 300 may also be attached to the lower surface of the driving part 100.

The protective layer 900 may be around (e.g., may surround) the driving part 100 and may be disposed on a lower surface of the display part 200. The protective layer 900 may reduce a level difference caused by a difference in area between the driving part 100 and the display part 200, and may also protect the driving part 100 and the display part 200.

Figure 2:
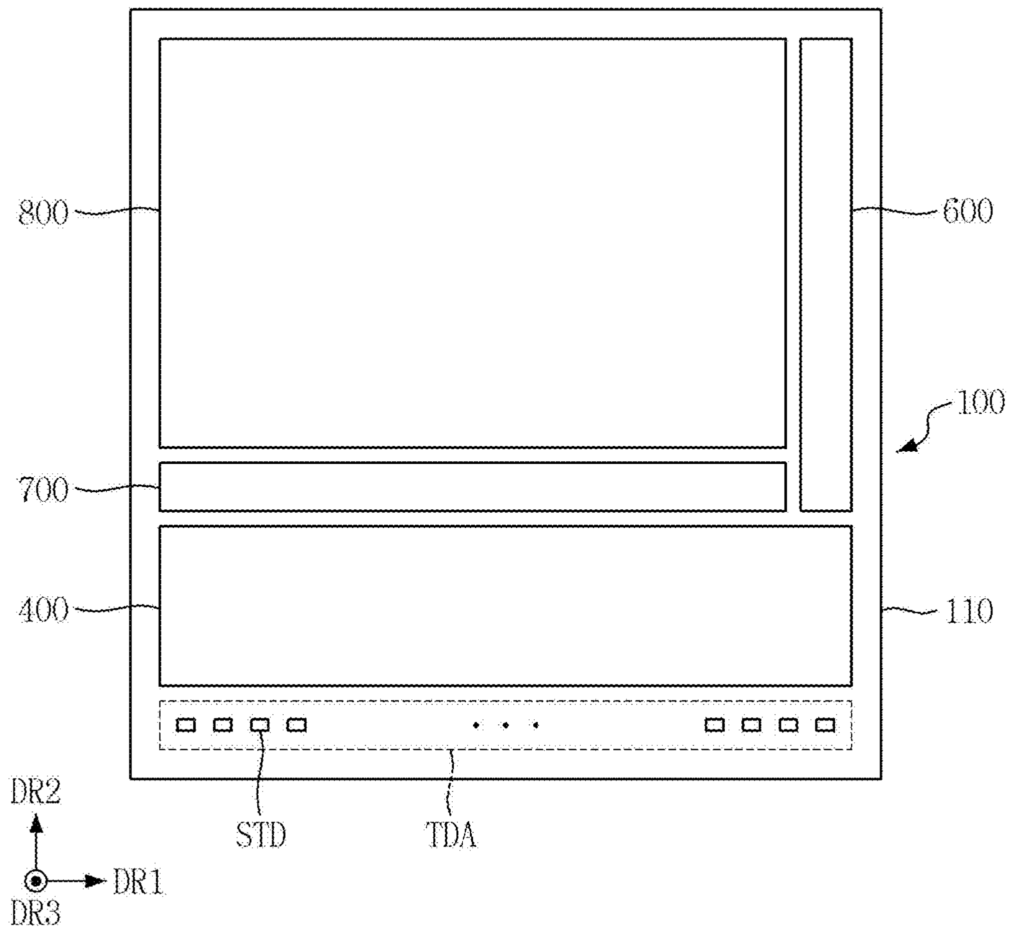
FIG. 2 is a plan view illustrating an example of a driving part illustrated in FIG. 1.
Figure 3:
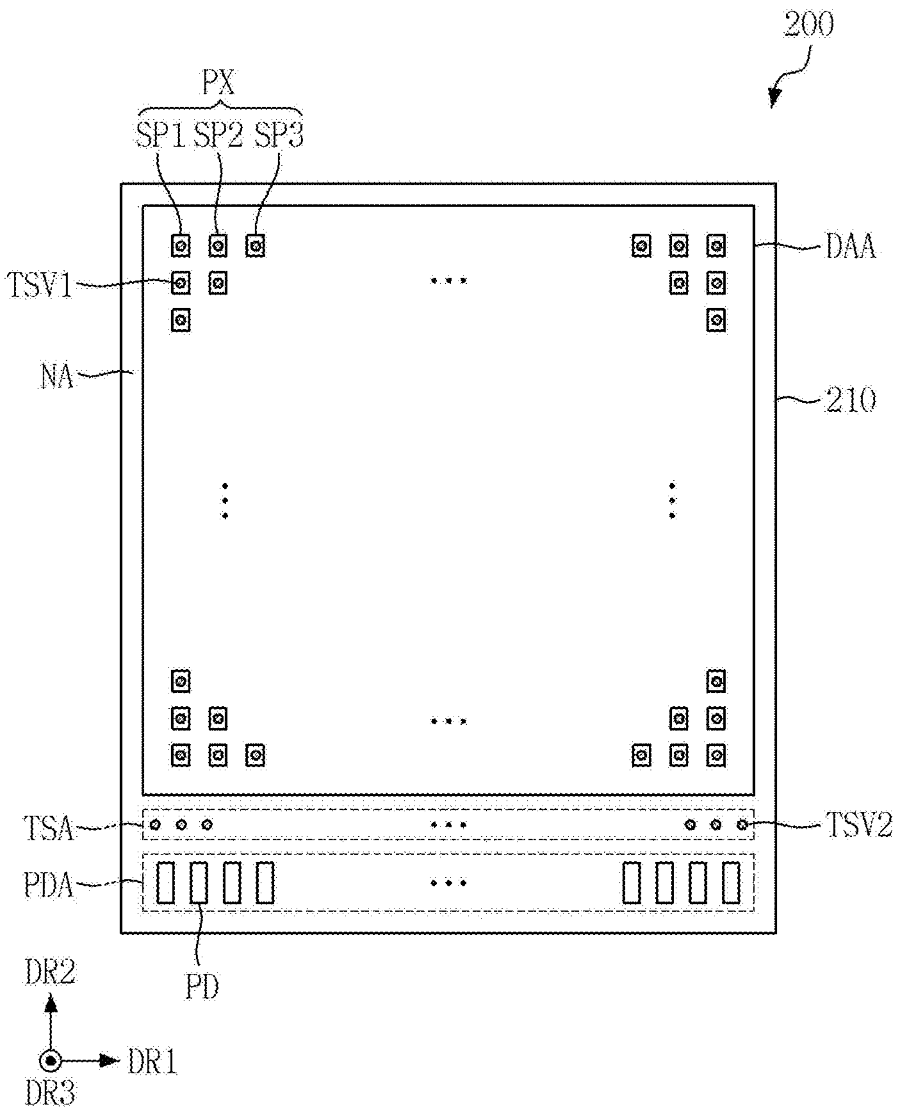
FIG. 3 is a plan view illustrating an example of a display part illustrated in FIG. 1.

FIG. 2 is a plan view illustrating an example of a driving part illustrated in FIG. 1. FIG. 3 is a plan view illustrating an example of a display part illustrated in FIG. 1.

Referring to FIGS. 2 and 3, the driving part 100 of the display device 10 may include driving circuit elements of the display device 10. The driving part 100 may include a first single crystal semiconductor substrate 110 and a driving circuit part 400, a gate driver 600, a data driver 700, and a pixel circuit part 800 formed on the first single crystal semiconductor substrate 110.

The first single crystal semiconductor substrate 110 may be a silicon substrate, a germanium substrate, and/or a silicon-germanium substrate. A plurality of first transistors are formed on the first single crystal semiconductor substrate 110, and the plurality of first transistors may be electrically connected to each other to form the driving circuit part 400, the gate driver 600, the data driver 700, and the pixel circuit part 800. The first transistors may be formed through a semiconductor process. For example, the plurality of transistors may be formed as complementary metal oxide semiconductor (CMOS) transistors.

It is illustrated in the drawing that the pixel circuit part 800 is disposed on an upper side of the driving part 100, the data driver 700, the driving circuit part 400, and a signal terminal area TDA are disposed on a lower side thereof, and the gate driver 600 is disposed on a right side, which is one side of the pixel circuit part 800 in the first direction DR1. However, the present disclosure is not limited thereto. In the driving part 100, the positions of the driving circuit part 400, the gate driver 600, the data driver 700, and the pixel circuit part 800 may be modified in various ways depending on the design structure of the plurality of circuit elements formed on the first single crystal semiconductor substrate 110.

A plurality of signal terminals STD arranged along the first direction DR1 may be disposed in the signal terminal area TDA. The plurality of signal terminals STD may be electrically connected to the display part 200 and may be electrically connected to the circuit board 300 through the display part 200. The signal terminals STD may transmit electrical signals applied from the circuit board 300 to the driving circuit part 400, the gate driver 600, the data driver 700, and the pixel circuit part 800.

The display part 200 may include a second single crystal semiconductor substrate 210 and a plurality of pixels PX formed on the second single crystal semiconductor substrate 210. The display part 200 may include a display area DAA where the plurality of pixels PX are disposed and a non-display area NA around the display area DAA along an edge or a periphery of the display area DAA. A through hole area TSA and a pad area PDA may be disposed in the non-display area NA.

The second single crystal semiconductor substrate 210 may be a silicon substrate, a germanium substrate, and/or a silicon-germanium substrate. Unlike the first single crystal semiconductor substrate 110, the transistors may not be formed in the second single crystal semiconductor substrate 210. A display layer (e.g., '230' in FIG. 6) in which a plurality of light emitting elements are disposed may be disposed on the second single crystal semiconductor substrate 210, and the plurality of light emitting elements included in the display layer may be electrically connected to the pixel circuit part 800 formed on the first single crystal semiconductor substrate 110.

A plurality of pixels PX including light emitting elements may be disposed in the display area DAA. Each of the plurality of pixels PX may include three sub-pixels, for example, a first sub-pixel SP1, a second sub-pixel SP2, and a third sub-pixel SP3. The three sub-pixels SP1, SP2, and SP3 may form one pixel PX and may display a color. However, the present disclosure is not limited thereto, and one pixel PX may include three or more sub-pixels. The plurality of sub-pixels SP may be arranged in a matrix form along the first direction DR1 and the second direction DR2. Each of the plurality of sub-pixels SP1, SP2, and SP3 may be electrically connected to a pixel circuit (a pixel circuit in FIG. 5) of the pixel circuit part 800 formed on the first single crystal semiconductor substrate 110. Each of the sub-pixels SP1, SP2, and SP3 may include light emitting elements, and the light emitting elements may emit light according to an electrical signal applied from a pixel circuit disposed in the display area DAA.

Some of the sub-pixels SP1, SP2, and SP3 disposed in the display area DAA of the display part 200 may overlap the driving part 100 in a thickness direction (e.g., a third direction DR3), and others may not overlap the driving part 100. The driving part 100 may have a smaller area than the display part 200 and may be disposed adjacent to one side of the display part 200. Accordingly, only some of the plurality of sub-pixels SP1, SP2, and SP3 may overlap the driving part 100 in the thickness direction (e.g., the third direction DR3).

According to one or more embodiments, the display part 200 of the display device 10 may include a plurality of first through holes TSV1 that overlap the display area DAA. The first through holes TSV1 may be formed to penetrate through the second single crystal semiconductor substrate 210 of the display part 200. The first through-holes TSV1 may form a connection path between the pixel circuit part 800 of the driving part 100 and each of the sub-pixels SP1, SP2, and SP3 of the display part 200. The plurality of first through holes TSV1 may be formed to correspond to each of the sub-pixels SP1, SP2, and SP3 of the display part 200. In one or more embodiments, the number of first through holes TSV1 may be the same as the number of sub-pixels SP1, SP2, and SP3, and the first through holes TSV1 may be formed to overlap the sub-pixels SP1, SP2, and SP3, respectively. However, the present disclosure is not limited thereto. The plurality of first through holes TSV1 may each correspond to the sub-pixels SP1, SP2, and SP3, but may not necessarily be formed to overlap the sub-pixels SP1, SP2, and SP3. As will be described later, the plurality of sub-pixels SP1, SP2, and SP3 may be electrically connected to the pixel circuit of the pixel circuit part 800 through a connection wiring disposed in the first through hole TSV1.

The non-display area NA may be disposed to be around (e.g., to surround) the display area DAA. The non-display area NA may be an area where no light is emitted because the pixels PX are not disposed. A through hole area TSA and a pad area PDA may be disposed in the non-display area NA.

The pad area PDA may be disposed on a lower side, which is one side of the display area DAA in the second direction DR2. A plurality of pads PD arranged along the first direction DR1 may be disposed in the pad area PDA. The circuit board 300 may be attached onto the plurality of pads PD. The pads PD may be electrically connected to the circuit board 300 and may transmit the electrical signals applied from the circuit board 300 to the driving part 100.

The through hole area TSA may be disposed between the pad area PDA and the display area DAA. A plurality of second through holes TSV2 may be formed in the through hole area TSA. The second through-holes TSV2 may be connection paths of signal connection wirings that electrically connect the signal terminals STD of the driving part 100 and the circuit board 300. The plurality of second through holes TSV2 may be formed to correspond to the signal terminals STD of the driving part 100, respectively. In one or more embodiments, the number of second through holes TSV2 may be the same as the number of signal terminals STD, and each of the second through holes TSV2 may be formed to overlap the signal terminal STD. However, the present disclosure is not limited thereto. The circuit board 300 may be electrically connected to the signal terminals STD of the driving part 100 through the plurality of pads PD and the signal connection wirings disposed in the second through holes TSV2.

Figure 4:
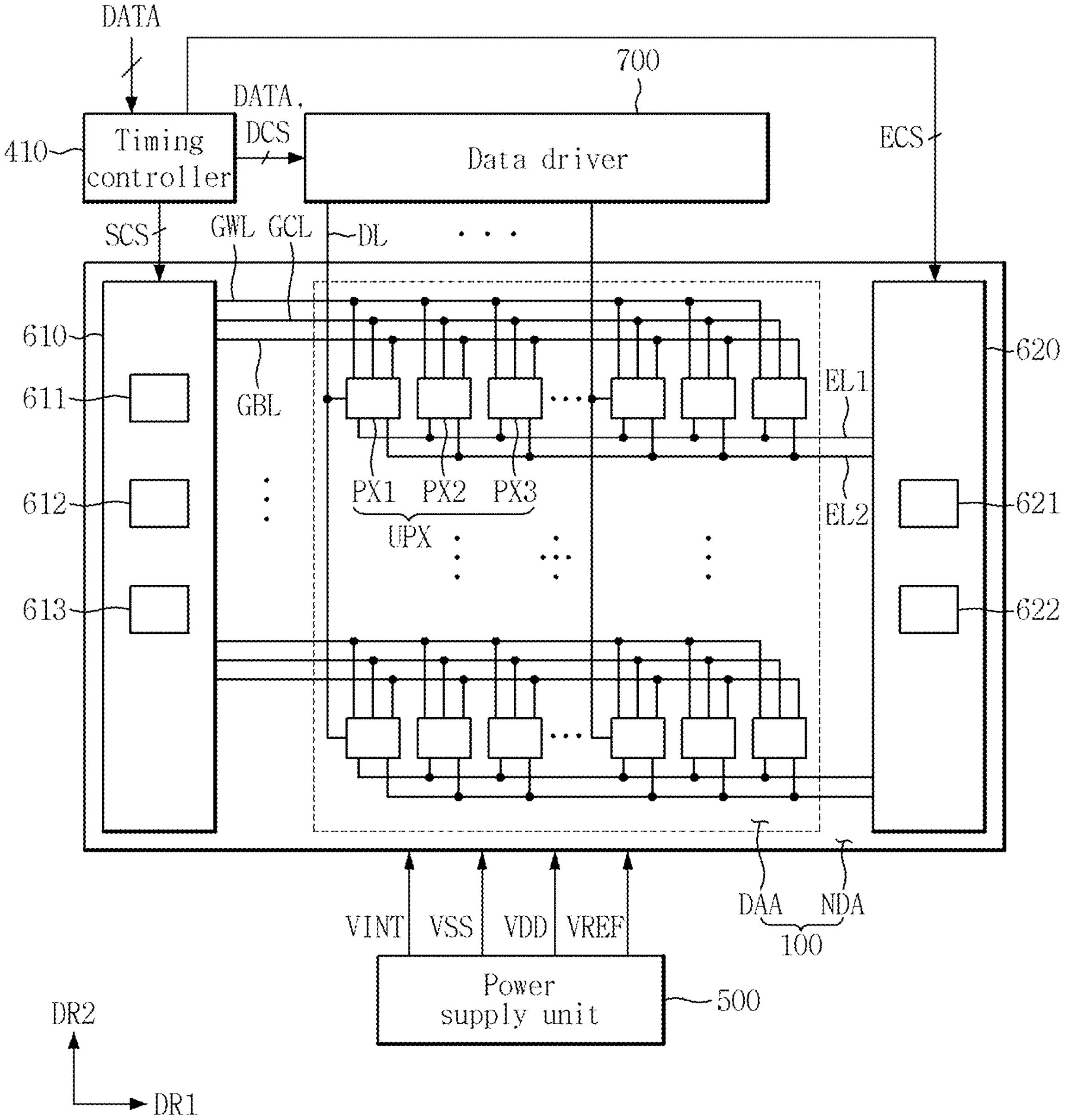
FIG. 4 is a block diagram illustrating a display device according to one or more embodiments.

FIG. 4 is a block diagram illustrating a display device according to one or more embodiments.

Referring to FIG. 4, the driving circuit part 400 may include a timing controller 410 (e.g., a timing control circuit). In addition, the driving circuit part 400 may further include various circuits involved in driving the display device 10, such as a gamma circuit and a logic circuit. The driving circuit part 400 may include driving circuit transistors formed on the first single crystal semiconductor substrate 110.

The timing controller 410 may receive digital video data DATA and timing signals from the outside. The timing controller 410 may generate a scan timing control signal SCS, an emission timing control signal ECS, and a data timing control signal DCS for controlling the display part 200 according to the timing signals. The timing controller 410 may output the scan timing control signal SCS to a scan driver 610 of the gate driver 600 and output the emission timing control signal ECS to a light emitting driver 620 of the gate driver 600. The timing controller 410 may output the digital video data DATA and the data timing control signal DCS to the data driver 700.

The power supply unit 500 (or the power supply circuit) may generate a plurality of panel driving voltages according to a power voltage from the outside. For example, the power supply unit 500 may generate a first driving voltage VSS, a second driving voltage VDD, a reference voltage VREF, and an initialization voltage VINT and supply the voltages to the plurality of pixels PX.

The scan timing control signal SCS, the emission timing control signal ECS, the digital video data DATA, and the data timing control signal DCS from the timing controller 410 may be supplied to the plurality of pixels PX. The first driving voltage VSS, the second driving voltage VDD, the reference voltage VREF, and the initialization voltage VINT of the power supply unit 500 may also be supplied to the plurality of pixels PX.

The gate driver 600 may include a scan driver 610 and a light emitting driver 620. The scan driver 610 may include a plurality of scan transistors formed on the first single crystal semiconductor substrate 110, and the light emitting driver 620 may include a plurality of light emitting transistors formed on the first single crystal semiconductor substrate 110. The plurality of scan transistors and the plurality of light emitting transistors may be formed through a semiconductor process. For example, the plurality of scan transistors and the plurality of light emitting transistors may be formed of CMOS transistors.

The scan driver 610 may include a first scan signal output unit 611, a second scan signal output unit 612, and a third scan signal output unit 613. Each of the first scan signal output unit 611, the second scan signal output unit 612, and the third scan signal output unit 613 may receive a scan timing control signal SCS from the timing controller 410. The first scan signal output unit 611 may generate write scan signals according to the scan timing control signal SCS of the timing controller 410 and sequentially output the write scan signals to first scan lines GWL. The second scan signal output unit 612 may generate control scan signals according to the scan timing control signal SCS and sequentially output the control scan signals to second scan lines GCL. The third scan signal output unit 613 may generate bias scan signals according to the scan timing control signal SCS and sequentially output the bias scan signals to third scan lines GBL.

The light emitting driver 620 may include a first light emitting signal output unit 621 and a second light emitting signal output unit 622. Each of the first light emitting signal output unit 621 and the second light emitting signal output unit 622 may receive the emission timing control signal ECS from the timing controller 410. The light emitting driver 620 may generate emission control signals according to the emission timing control signal ECS and sequentially output the emission control signals to first and second emission control lines EL1 and EL2.

The data driver 700 may receive the digital video data DATA and the data timing control signal DCS from the timing controller 410. The data driver 700 converts the digital video data DATA into analog data voltages according to the data timing control signal DCS and outputs the converted analog data voltages to the data lines DL. In this case, the sub-pixels SP1, SP2, and SP3 may be selected by the write scan signals of the scan driver 610, and the data voltages may be supplied to the selected sub-pixels SP1, SP2, and SP3.

The pixel circuit part 800 includes a plurality of pixel transistors formed on the first single crystal semiconductor substrate 110. The plurality of pixel transistors may be formed through a semiconductor process. For example, the plurality of pixel transistors may be formed of CMOS transistors.

A plurality of data lines DL, a plurality of scan lines GWL, GCL, and GBL, and a plurality of emission control lines EL1 and EL2 may be disposed in the pixel circuit part 800. The plurality of scan lines GWL, GCL, and GBL and the plurality of emission control lines EL1 and EL2 may extend in the first direction DR1 and may be disposed to be spaced (e.g., spaced apart) from each other in the second direction DR2. The plurality of data lines DL may extend in the second direction DR2 and may be disposed to be spaced (e.g., spaced apart) from each other in the first direction DR1. The pixel circuit part 800 may be electrically connected to the pixels PX of the display part 200 and may transmit electrical signals necessary for the light emitting device to emit light. The plurality of data lines DL, the plurality of scan lines GWL, GCL, and GBL, and the plurality of emission control lines EL1 and EL2 may be connected to the plurality of pixels PX of the display part 200.

Figure 5:
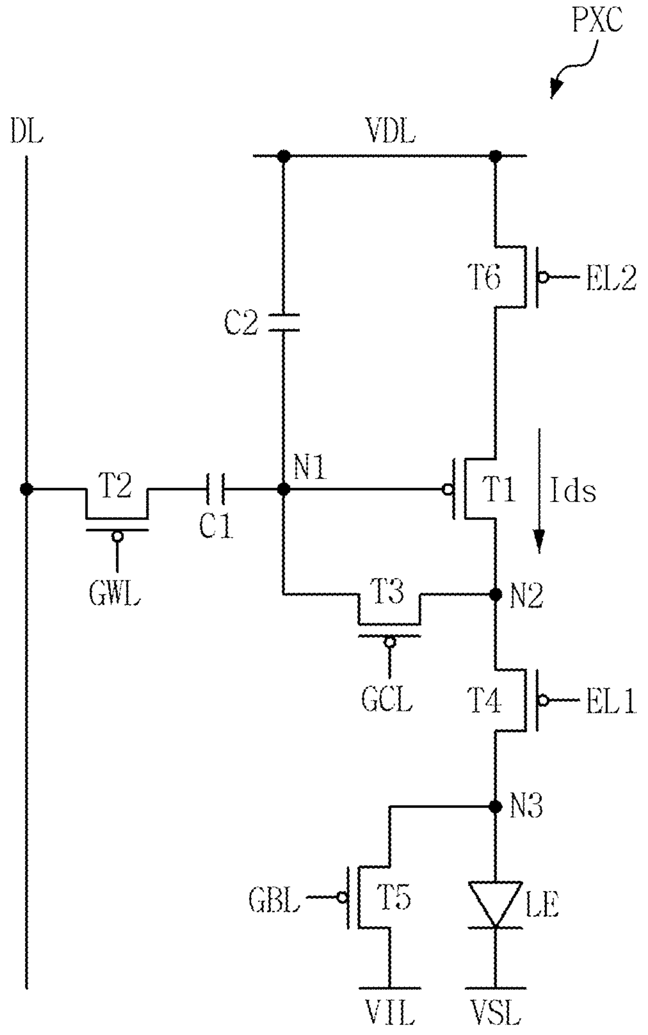
FIG. 5 is an equivalent circuit diagram of one pixel according to one or more embodiments.

FIG. 5 is an equivalent circuit diagram of one pixel according to one or more embodiments.

Referring to FIG. 5, a pixel circuit PXC of the sub-pixel may be connected to the first scan line GWL, the second scan line GCL, the third scan line GBL, the first emission control line EL1, the second emission control line EL2, and the data line DL. In addition, the pixel circuit PXC may be connected to a first driving voltage line VSL to which the first driving voltage VSS corresponding to a low potential voltage is applied, a second driving voltage line VDL to which the second driving voltage VDD corresponding to a high potential voltage is applied, and a third driving voltage line VIL to which the third driving voltage VINT corresponding to an initialization voltage is applied. That is, the first driving voltage line VSL may be a low potential voltage line, the second driving voltage line VDL may be a high potential voltage line, and the third driving voltage line VIL may be an initialization voltage line. In this case, the first driving voltage VSS may be a voltage lower than the third driving voltage VINT. The second driving voltage VDD may be a voltage higher than the third driving voltage VINT.

The pixel circuit PXC includes a plurality of transistors T1 to T6, a light emitting element LE, a first capacitor C1, and a second capacitor C2.

The light emitting element LE emits light according to a driving current Ids flowing through a channel of a first transistor T1. An amount of light emitted from the light emitting element LE may be proportional to the driving current Ids. The light emitting element LE may be disposed between a fourth transistor T4 and the first driving voltage line VSL. A first electrode of the light emitting element LE may be connected to a drain electrode of the fourth transistor T4, and a second electrode thereof may be connected to the first driving voltage line VSL. The first electrode of the light emitting element LE may be an anode electrode, and the second electrode of the light emitting element LE may be a cathode electrode. The light emitting element LE may be an organic light emitting diode (OLED) including a first electrode, a second electrode, and an organic light emitting layer disposed between the first electrode and the second electrode, but is not limited thereto. For example, the light emitting element LE may be an inorganic light emitting element including a first electrode, a second electrode, and an inorganic semiconductor disposed between the first electrode and the second electrode. In this case, the light emitting element LE may be a micro light emitting diode.

The first transistor T1 may be a driving transistor that controls a source-drain current (Ids, hereinafter, referred to as "driving current") flowing between a source electrode and a drain electrode according to a voltage applied to a gate electrode. The first transistor T1 includes a gate electrode connected to a first node N1, a source electrode connected to a drain electrode of a sixth transistor T6, and a drain electrode connected to a second node N2.

The second transistor T2 may be disposed between one electrode of the first capacitor C1 and the data line DL. The second transistor T2 is turned on by the write scan signal of the first scan line GWL and connects one electrode of the first capacitor C1 to the data line DL. Accordingly, the data voltage of the data line DL may be applied to one electrode of the first capacitor C1. The second transistor T2 includes a gate electrode connected to the first scan line GWL, a source electrode connected to the data line DL, and a drain electrode connected to one electrode of the first capacitor C1.

A third transistor T3 may be disposed between the first node N1 and the second node N2. The third transistor T3 is turned on by the write control signal of the second scan line GCL and connects the first node N1 to the second node N2. Accordingly, because the gate electrode and the source electrode of the first transistor T1 are connected, the first transistor T1 may operate like a diode (e.g., the first transistor T1 may be diode-connected). The third transistor T3 includes a gate electrode connected to the second scan line GCL, a source electrode connected to the second node N2, and a drain electrode connected to the first node N1.

A fourth transistor T4 may be disposed between the second node N2 and a third node N3. The fourth transistor T4 is turned on by the first emission control signal of the first emission control line EL1 and connects the second node N2 to the third node N3. Accordingly, the driving current of the first transistor T1 may be supplied to the light emitting element LE. The fourth transistor T4 includes a gate electrode connected to the first emission control line EL1, a source electrode connected to the second node N2, and a drain electrode connected to the third node N3.

A fifth transistor T5 may be disposed between the third node N3 and the third driving voltage line VIL. The fifth transistor T5 is turned on by the bias scan signal of the third scan line GBL and connects the third node N3 to the third driving voltage line VIL. Accordingly, the third driving voltage VINT of the third driving voltage line VIL may be applied to the first electrode of the light emitting element LE. The fifth transistor T5 includes a gate electrode connected to the third scan line GBL, a source electrode connected to the third node N3, and a drain electrode connected to the third driving voltage line VIL.

A sixth transistor T6 may be disposed between the source electrode of the first transistor T1 and the second driving voltage line VDL. The sixth transistor T6 is turned on by the second emission control signal of the second emission control line EL2 and connects the source electrode of the first transistor T1 to the second driving voltage line VDL. Accordingly, the second driving voltage VDD of the second driving voltage line VDL may be applied to the source electrode of the first transistor T1. The sixth transistor T6 includes a gate electrode connected to the second emission control line EL2, a source electrode connected to the second driving voltage line VDL, and a drain electrode connected to the source electrode of the first transistor T1.

The first capacitor C1 is formed between the first node N1 and the drain electrode of the second transistor T2. The first capacitor C1 includes one electrode connected to the drain electrode of the second transistor T2 and the other electrode connected to the first node N1.

The second capacitor C2 is formed between the gate electrode of the first transistor T1 (or the first node N1) and the second driving voltage line VDL. The second capacitor C2 includes one electrode connected to the gate electrode of the first transistor T1 (or the first node N1) and the other electrode connected to the second driving voltage line VDL.

The first node N1 is a contact point of the gate electrode of the first transistor T1, the drain electrode of the third transistor T3, the other electrode of the first capacitor C1, and one electrode of the second capacitor C2. The second node N2 is a contact point of the drain electrode of the first transistor T1, the source electrode of the third transistor T3, and the source electrode of the fourth transistor T4. The third node N3 is a contact point of the drain electrode of the fourth transistor T4, the source electrode of the fifth transistor T5, and the first electrode of the light emitting element LE.

Each of the first to sixth transistors T1 to T6 may be a metal-oxide-semiconductor field effect transistor (MOSFET). For example, each of the first to sixth transistors T1 to T6 may be a P-type MOSFET, but is not limited thereto. Each of the first to sixth transistors T1 to T6 may be an N-type MOSFET. Alternatively, each of some of the first to sixth transistors T1 to T6 may be a P-type MOSFET, and each of the remaining transistors may be an N-type MOSFET.

It is illustrated in FIG. 5 that the pixel circuit PXC includes the six transistors T1 to T6 and the two capacitors C1 and C2, but it should be noted that the equivalent circuit diagram of the pixel circuit PXC is not limited to that illustrated in FIG. 5. For example, the number of transistors and capacitors of the pixel circuit PXC is not limited to that illustrated in FIG. 5.

Figure 6:
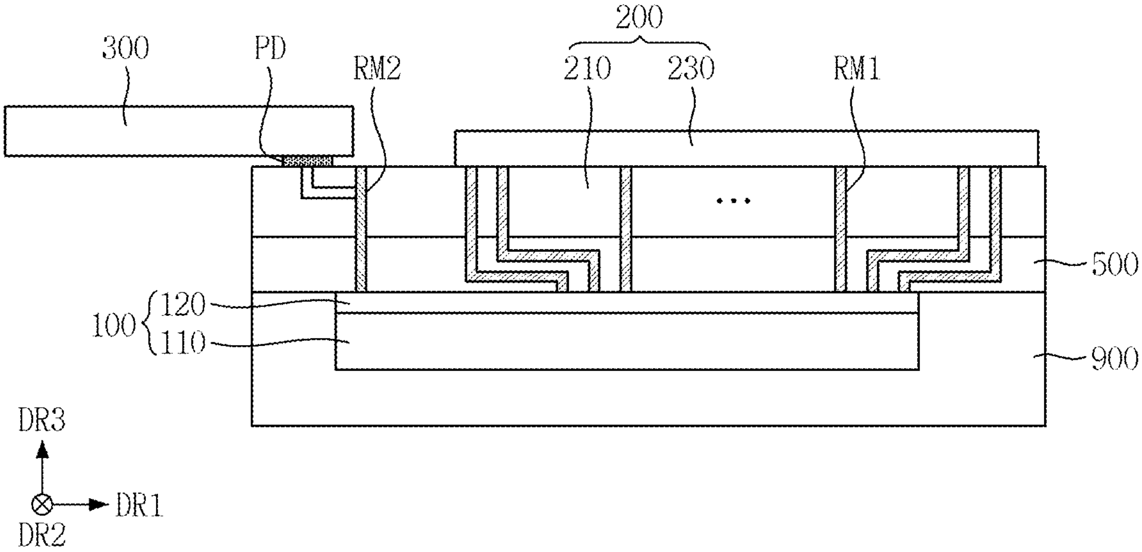
FIG. 6 is a schematic cross-sectional view of a display device according to one or more embodiments.
Figure 7:
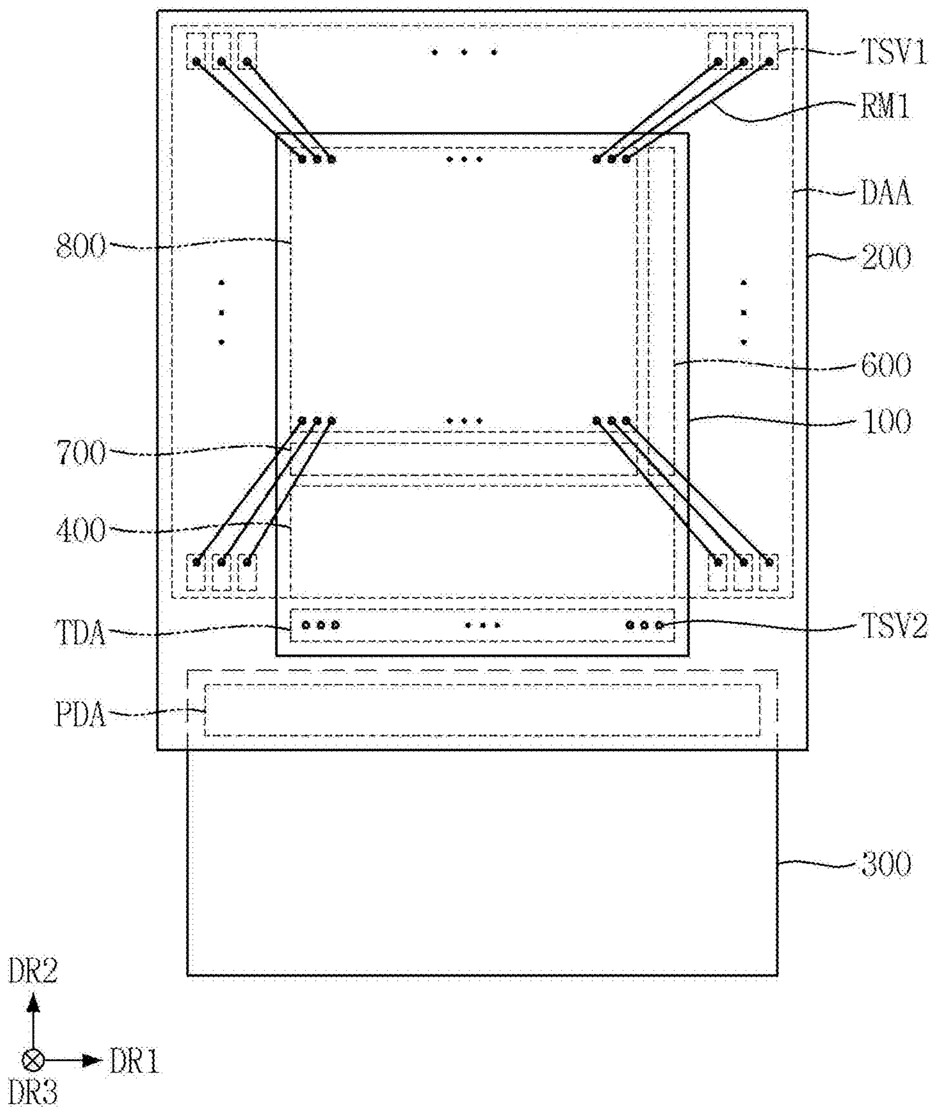
FIG. 7 is a schematic view illustrating a rear surface of a display device according to one or more embodiments.

FIG. 6 is a schematic cross-sectional view of a display device according to one or more embodiments. FIG. 7 is a schematic view illustrating a rear surface of a display device according to one or more embodiments. FIG. 6 illustrates a schematic connection relationship of routing wirings RM1 and RM2 that electrically connect the display part 200 and the driving part 100, and FIG. 7 illustrates an arrangement of the through holes TSV1 and TSV2 and the routing wirings RM1 and RM2 as viewed from a rear surface of the display device 10.

Referring to FIGS. 6 and 7 in conjunction with FIG. 4, the display device 10 according to one or more embodiments may include a driving part 100 including a first single crystal semiconductor substrate 110 and a driving circuit layer 120 disposed on the first single crystal semiconductor substrate 110, and a display part 200 including a second single crystal semiconductor substrate 210 and a display layer 230 disposed on the second single crystal semiconductor substrate 210. The display device 10 may include two different single crystal semiconductor substrates 110 and 210 that overlap in the third direction DR3, which is the thickness direction of the display device 10.

The driving part 100 may include circuit elements necessary for the light emitting elements included in the display layer 230 of the display part 200 to emit light. As described above, the driving circuit layer 120 of the driving part 100 may include the driving circuit part 400, the gate driver 600, the data driver 700, and the pixel circuit part 800, and the circuit elements that constitute include the driving circuit part 400, the gate driver 600, the data driver 700, and the pixel circuit part 800, such as transistors and capacitors, may be formed of CMOS on the first single crystal semiconductor substrate 110.

The display part 200 may include a plurality of light emitting elements that emit light to display an image of the display device 10. The light emitting elements may be electrically connected to the circuit elements formed in the driving part 100 and emit light.

According to one or more embodiments, the display device 10 may have a planar area of the driving part 100 or the first single crystal semiconductor substrate 110 that is smaller than the planar area of the display part 200 or the second single crystal semiconductor substrate 210. The plurality of transistors formed in the driving part 100 may be formed through a semiconductor micro process and may have very small sizes and/or line widths. In the driving part 100, a large number of circuit elements may be disposed with high integration, and power consumption is reduced due to miniaturization in sizes of the elements.

In addition, because the driving part 100 includes only the circuit elements formed of the CMOS on the first single crystal semiconductor substrate 110 and does not include the light emitting elements, it may be sufficient to secure just enough space to dispose the elements formed through the micro process. It is sufficient for the first single crystal semiconductor substrate 110 to have a smaller area than the second single crystal semiconductor substrate 210, and because a large number of drivers 100 may be manufactured on one wafer substrate on which a process of forming the driving circuit layer 120 is performed, manufacturing yield may be improved. In particular, because a high-cost semiconductor process is performed on the driving part 100, cost reduction may be achieved by improving the manufacturing yield of the driving part 100. In addition, in the display part 200, a large number of light emitting elements may be formed on the second single crystal semiconductor substrate 210 with a relatively large area, thereby making it possible to implement a high-resolution display device.

The display device 10 may include a connection line layer 500 disposed between the second single crystal semiconductor substrate 210 of the display part 200 and the driving circuit layer 120 of the driving part 100. The connection line layer 500 may be disposed on a lower surface of the second single crystal semiconductor substrate 210. A portion of the plurality of routing wirings RM1 and RM2 may be disposed in the connection line layer 500, and the routing wirings RM1 and RM2 may connect the display layer 230 of the display part 200 and the circuit board 300 with the driving part 100. The driving circuit layer 120 of the driving part 100 may be electrically connected to the display part 200 and the circuit board 300 through the routing wirings RM1 and RM2 and transmit electrical signals for light emission.

The first routing wiring RM1 may be connected to the sub-pixels SP1, SP2, and SP3 disposed on the display layer 230 of the display part 200 and the pixel circuit part 800 of the driving part 100. In one or more embodiments, the display device 10 may include a plurality of first through holes TSV1 disposed to correspond to the sub-pixels SP1, SP2, and SP3 of the display part 200, and the first routing wiring RM1 may each connect the first through holes TSV1 to the pixel circuit part 800. While the first through holes TSV1 are disposed throughout the display part 200 with a large area, the pixel circuit part 800 may have a relatively small area. The first routing wiring RM1 may include conductive vias (e.g., RVA in FIG. 12) disposed throughout the display part 200 with the large area and a connection wiring (e.g., RML in FIG. 12) connecting the conductive vias to the pixel circuit part 800 with the small area. A gap between the first routing wiring RM1 and another first routing wiring RM1 adjacent thereto in a plan view may be narrower in a portion overlapping the driving part 100 than in the display area DAA.

In one or more embodiments, some of the plurality of first through holes TSV1 may overlap the driving part 100 in the thickness direction (e.g., the third direction DR3), and other portions may not overlap the driving part 100 in the thickness direction (e.g., the third direction DR3). Some of the connection wirings (e.g., RML in FIG. 12) of the first routing wirings RM1 disposed in the first through holes TSV1 that do not overlap the driving part 100 may not overlap the driving part 100. However, the arrangement of the first through holes TSV1 may vary depending on a position of a layer where the connection wirings RML of the first routing wirings RM1 are disposed.

According to one or more embodiments, the number of first through holes TSV1 may be the same as the number of sub-pixels SP1, SP2, and SP3 disposed in the display area DAA. For example, the plurality of sub-pixels SP1, SP2, and SP3 may be arranged along the first direction DR1 and the second direction DR2 in the display area DAA, and the first through holes TSV1 may also be arranged along the first direction DR1 and the second direction DR2 and may correspond to each sub-pixel SP1, SP2, and SP3 in a one-to-one manner. The first through holes TSV1 may be formed to overlap each sub-pixel SP1, SP2, and SP3. The number of first routing wires RM1 may also be the same as the number of sub-pixels SP1, SP2, and SP3.

The plurality of second through holes TSV2 may be disposed in the through hole area TSA of the display part 200 and may be formed to overlap the signal terminal area TDA of the driving part 100. A second routing wiring RM2 connected to the signal terminal STD of the driving part 100 may be disposed in the second through holes TSV2. Unlike the first through hole TSV1, the second through hole TSV2 may be formed to overlap a corresponding signal terminal STD of the driving part 100. Accordingly, the second routing wiring RM2 may also be disposed to correspond to and overlap the signal terminal STD. The second routing wiring RM2 may be a wiring that transmits a signal applied from the circuit board 300 to the driving part 100.

Figure 8:
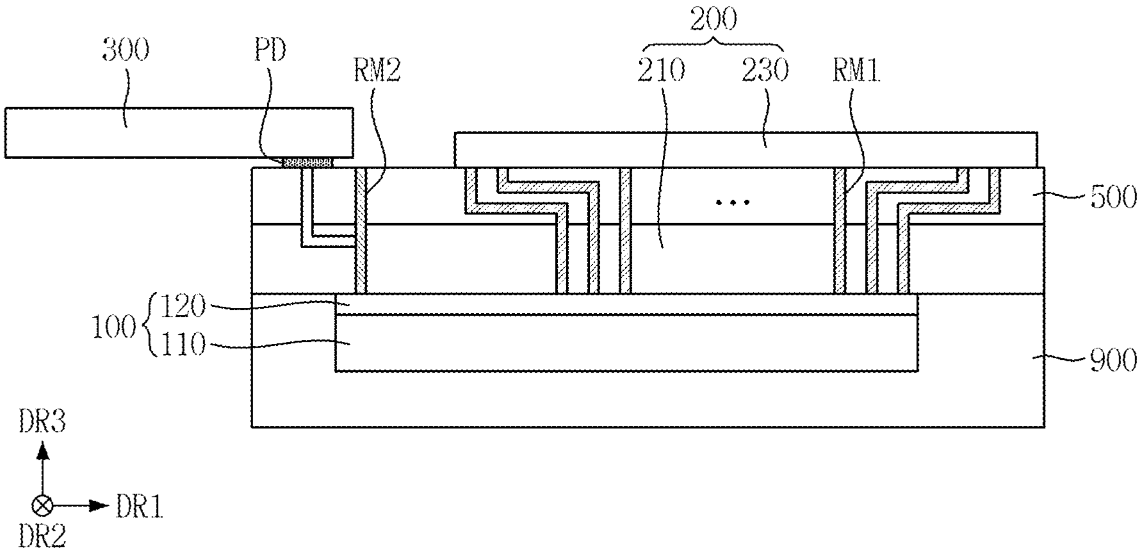
FIG. 8 is a schematic cross-sectional view illustrating a display device according to one or more embodiments.

FIG. 8 is a schematic cross-sectional view illustrating a display device according to one or more embodiments.

Referring to FIG. 8, in a display device 10 according to one or more embodiments, the connection line layer 500 may be disposed between the display layer 230 and the second single crystal semiconductor substrate 210. The embodiment is different from the embodiment of FIGS. 6 and 7 in that as the connection line layer 500 is disposed on an upper surface rather than the lower surface of the second single crystal semiconductor substrate 210, the positions of the connection wirings RML, the conductive vias RVA, and the first through holes TSV1 are different.

The connection line layer 500 may be disposed on an upper surface of the second single crystal semiconductor substrate 210. An interlayer insulating layer RINS (e.g., see FIG. 12) of the connection line layer 500 may be disposed on the upper surface of the second single crystal semiconductor substrate 210.

According to one or more embodiments, the plurality of first through holes TSV1 may overlap the driving part 100 in the thickness direction (e.g., the third direction DR3), and the first routing wirings RM1 may be electrically connected to the sub-pixels SP1, SP2, and SP3 disposed throughout the display area DAA and may connect the first through hole TSV1 and the sub-pixels SP1, SP2, and SP3 that overlap the driving part 100. For example, the connection wirings RML of the first routing wirings RM1 may be concentrated in an area where the first through holes TSV1 are disposed, and may connect a terminal connected to each of the sub-pixels SP1, SP2, and SP3 and the conductive via RVA disposed in the first through hole TSV1. In the display device 10, the plurality of first through holes TSV1 and the conductive vias RVA may each overlap the first single crystal semiconductor substrate 110 in the thickness direction (e.g., the third direction DR3). On the other hand, at least a portion of the connection wirings RML may not overlap the first single crystal semiconductor substrate 110 in the thickness direction (e.g., the third direction DR3).

As described above, the planar area of the first single crystal semiconductor substrate 110 may be smaller than the planar area of the second single crystal semiconductor substrate 210, and only some of the connection wirings RML disposed throughout the second single crystal semiconductor substrate 210 may overlap the first single crystal semiconductor substrate 110 in the thickness direction (e.g., the third direction DR3). Accordingly, the connection wirings RML may be disposed throughout the second single crystal semiconductor substrate 210, and ends of the connection wiring RML including multiple layers may overlap the first single crystal semiconductor substrate 110 in the thickness direction (e.g., the third direction DR3) and may be connected to the plurality of through holes TSV1 and the conductive vias RVA. The connection wiring RML may form a path that electrically connects the light emitting elements disposed on the entire surface of the display area DAA with a larger area to the pixel circuit part 800 with a relatively small area.

Hereinafter, structures of the driving circuit layer 120 of the driving part 100 and the display layer 230 of the display part 200 will be described in detail with further reference to other drawings.

Figure 9:
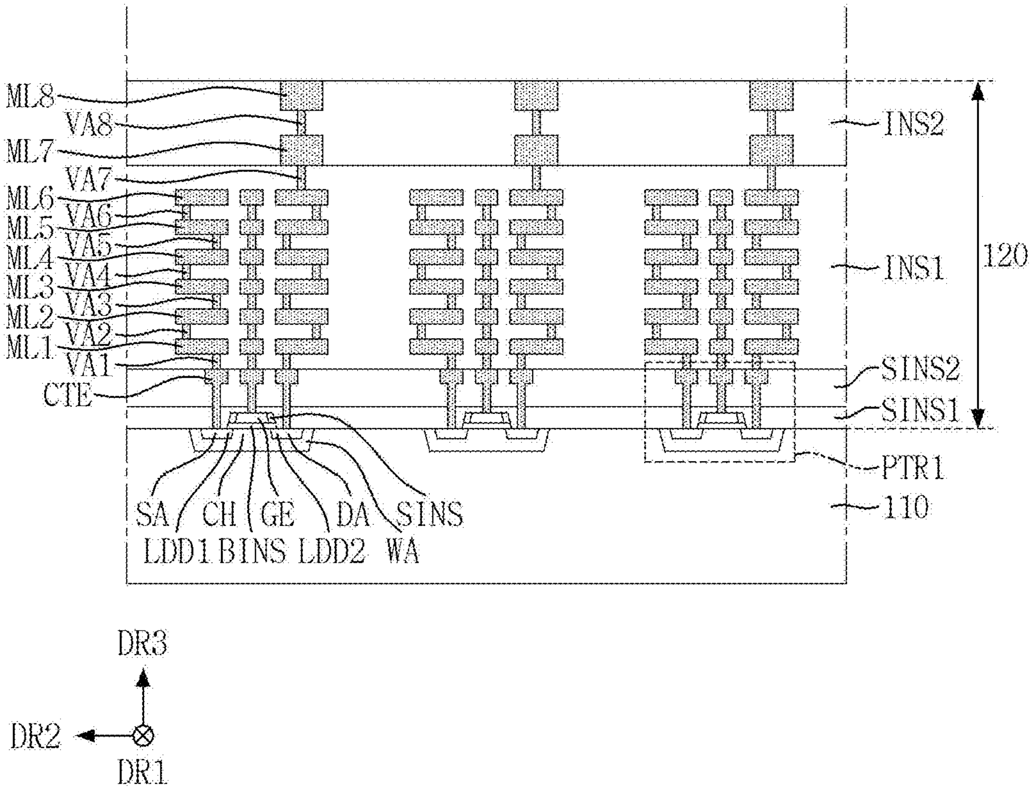
FIG. 9 is a schematic cross-sectional view of a driving part according to one or more embodiments.

FIG. 9 is a schematic cross-sectional view of a driving part according to one or more embodiments.

Referring to FIG. 9, the driving part 100 may include a first single crystal semiconductor substrate 110 and a driving circuit layer 120 disposed thereon.

The first single crystal semiconductor substrate 110 may be a silicon substrate, a germanium substrate, and/or a silicon-germanium substrate. The first single crystal semiconductor substrate 110 may be a substrate doped with first-type impurities. A plurality of well areas WA may be disposed on an upper surface of the first single crystal semiconductor substrate 110. The plurality of well areas WA may be areas doped with second-type impurities. The second-type impurity may be different from the first-type impurity described above. For example, when the first-type impurity is a p-type impurity, the second-type impurity may be an n-type impurity. Alternatively, when the first-type impurity is an n-type impurity, the second-type impurity may be a p-type impurity.

Each of the plurality of well areas WA includes a source area SA corresponding to a source electrode of a first transistor PTR1, a drain area DA corresponding to a drain electrode thereof, and a channel area CH disposed between the source area SA and the drain area DA.

A lower insulating film BINS may be disposed between the gate electrode GE and the well area WA. A side insulating film SINS may be disposed on a side surface of the gate electrode GE. The side insulating film SINS may be disposed on the lower insulating film BINS.

Each of the source area SA and the drain area DA may be an area doped with first-type impurities. The gate electrode GE of the first transistor PTR1 may overlap the well area WA in the third direction DR3. The channel area CH may overlap the gate electrode GE in the third direction DR3. The source area SA may be disposed on one side of the gate electrode GE, and the drain area DA may be disposed on the other side of the gate electrode GE.

Each of the plurality of well areas WA further includes a first low-concentration impurity area LDD1 disposed between the channel area CH and the source area SA and a second low-concentration impurity area LDD2 disposed between the channel area CH and the drain area DA. The first low-concentration impurity area LDD1 may be an area having an impurity concentration lower than that of the source area SA due to the lower insulating film BINS. The second low-concentration impurity area LDD2 may be an area having an impurity concentration lower than that of the drain area DA due to the lower insulating film BINS. A distance between the source area SA and the drain area DA may be increased by the first low-concentration impurity area LDD1 and the second low-concentration impurity area LDD2. Therefore, because a length of the channel area CH of each of the first transistors PTR1 may increase, punch-through and hot carrier phenomena caused by a short channel may be prevented.

The first single crystal semiconductor substrate 110 may include a plurality of first transistors PTR1 that constitute a plurality of circuit elements of the driving part 100. The first transistors PTR1 formed in the first single crystal semiconductor substrate 110 may constitute the driving circuit part 400, the gate driver 600, the data driver 700, or the pixel circuit part 800.

A process of reducing a thickness of the first single crystal semiconductor substrate 110 may be performed when the driving circuit layer 120 is formed on the silicon wafer substrate. The first single crystal semiconductor substrate 110 may have a thickness that is less than a thickness of the wafer substrate on which a semiconductor process for forming the driving circuit layer 120 is performed. In one or more embodiments, the thickness of the first single crystal semiconductor substrate 110 may be 100 μm or less, for example, in the range of 80 μm to 100 μm.

The driving circuit layer 120 may include a first semiconductor insulating layer SINS1, a second semiconductor insulating layer SINS2, a plurality of contact electrodes CTE, a first interlayer insulating layer INS1, a second interlayer insulating layer INS2, a plurality of conductive layers ML1 to ML8, and a plurality of vias VA1 to VA8. The driving circuit layer 120 may include wirings electrically connected to the plurality of first transistors PTR1 included in the first single crystal semiconductor substrate 110.

The first semiconductor insulating layer SINS1 and the second semiconductor insulating layer SINS2 may be disposed on the first single crystal semiconductor substrate 110. The first semiconductor insulating layer SINS1 may be an insulating layer disposed on the gate electrode GE of the first transistor PTR1 and the first single crystal semiconductor substrate 110, and the second semiconductor insulating layer SINS2 may be an insulating layer disposed on the gate electrode GE of the first transistor PTR1 and the first semiconductor insulating layer SINS1. The first semiconductor insulating layer SINS1 and the second semiconductor insulating layer SINS2 may be formed of a silicon carbon nitride (SiCN) or silicon oxide ($SiO_x$)-based inorganic film, but are not limited thereto. It is illustrated in the drawing that the first semiconductor insulating layer SINS1 and the second semiconductor insulating layer SINS2 are each formed as a single layer with a suitable thickness (e.g., a predetermined thickness), but the present disclosure is not limited thereto. The first semiconductor insulating layer SINS1 and the second semiconductor insulating layer SINS2 may have a structure in which at least one or more layers are stacked on each other.

The plurality of contact electrodes CTE may be disposed on the first single crystal semiconductor substrate 110. The plurality of contact electrodes CTE may be connected to one of the gate electrode GE, the source area SA, or the drain area DA of each of the first transistors PTR1 formed in the first single crystal semiconductor substrate 110 through holes penetrating through the first and second semiconductor insulating layers SINS1 and SINS2. The plurality of contact electrodes CTE may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. The plurality of contact electrodes CTE may have upper surfaces exposed without being covered by the first and second semiconductor insulating layers SINS1 and SINS2.

The first interlayer insulating layer INS1 may be disposed on the plurality of contact electrodes CTE and the first and second semiconductor insulating layers SINS1 and SINS2. The second interlayer insulating layer INS2 may be disposed on the first interlayer insulating layer INS1. The first interlayer insulating layer INS1 and the second interlayer insulating layer INS2 may be formed of a silicon carbon nitride (SiCN) and/or silicon oxide ($SiO_x$)-based inorganic film, but are not limited thereto. It is illustrated in the drawing that the first interlayer insulating layer INS1 and the second interlayer insulating layer INS2 are each formed as a single layer, but the present disclosure is not limited thereto. The first interlayer insulating layer INS1 and the second interlayer insulating layer INS2 may also have a structure in which at least one or more layers are stacked on each other, and may be disposed between a plurality of first to eighth conductive layers ML1 to ML8, which will be described later.

The first to eighth conductive layers ML1 to ML8 and the first to eighth vias VA1 to VA8 may be electrically connected to the plurality of contact electrodes CTE and may form the driving circuit part 400 or the data driver 700 of the driving part 100. The plurality of first transistors PTR1 formed in the first single crystal semiconductor substrate 110 may be electrically connected to each other through first to eighth conductive layers ML1 to ML8 and the first to eighth vias VA1 to VA8, and may form the driving circuit part 400 and the data driver 700 of the driving part 100.

The first conductive layer ML1 may be connected to the contact electrode CTE through the first via VA1. The first conductive layer ML1 may be disposed on the contact electrode CTE, and the first via VA1 may be disposed between the first conductive layer ML1 and the contact electrode CTE and may be in contact with the first conductive layer ML1 and the contact electrode CTE, respectively. The second conductive layer ML2 may be connected to the first conductive layer ML1 through the second via VA2. The second conductive layer ML2 may be disposed on the first conductive layer ML1, and the second via VA2 may be disposed between the first conductive layer ML1 and the second conductive layer ML2 and may be in contact with the first conductive layer ML1 and the second conductive layer ML2, respectively.

The third conductive layer ML3 may be connected to the second conductive layer ML2 through the third via VA3. The fourth conductive layer ML4 may be connected to the third conductive layer ML3 through the fourth via VA4, the fifth conductive layer ML5 may be connected to the fourth conductive layer ML4 through the fifth via VA5, and the sixth conductive layer ML6 may be connected to the fifth conductive layer ML5 through the sixth via VA6. The third conductive layer ML3, the fourth conductive layer ML4, the fifth conductive layer ML5, and the sixth conductive layer ML6 may be sequentially disposed on the second conductive layer ML2, and the third via VA3, the fourth via VA4, the fifth via VA5, and the sixth via VA6 may be disposed between the second conductive layer ML2, the third conductive layer ML3, the fourth conductive layer ML4, the fifth conductive layer ML5, and the sixth conductive layer ML6. The third to sixth vias VA3 to VA6 may be in contact with different metal layers disposed above and below the third to sixth vias VA3 to VA6, respectively. The seventh via VA7 may be disposed on the sixth conductive layer ML6. The seventh via VA7 may be in contact with the seventh conductive layer ML7 and the sixth conductive layer ML6 disposed thereon, respectively.

The first to sixth conductive layers ML1 to ML6 and the first to seventh vias VA1 to VA7 may be disposed in the first interlayer insulating layer INS1. The first to sixth conductive layers ML1 to ML6 and the first to seventh vias VA1 to VA7 may constitute a first driving circuit layer of the driving circuit layer 120 disposed in the first interlayer insulating layer INS1.

The seventh conductive layer ML7 may be connected to the sixth conductive layer ML6 through the seventh via VA7. The seventh conductive layer ML7 may be disposed on the first interlayer insulating layer INS1 and the sixth conductive layer ML6, and the seventh via VA7 may be disposed between the sixth conductive layer ML6 and the seventh conductive layer ML7 and may be in contact with the sixth conductive layer ML6 and the seventh conductive layer ML7, respectively. The eighth conductive layer ML8 may be connected to the seventh conductive layer ML7 through the eighth via VA8. The eighth conductive layer ML8 may be disposed on the seventh conductive layer ML7, and the eighth via VA8 may be disposed between the seventh conductive layer ML7 and the eighth conductive layer ML8 and may be in contact with the seventh conductive layer ML7 and the eighth conductive layer ML8, respectively. The eighth conductive layer ML8 may have an upper surface exposed without being covered by the second interlayer insulating layer INS2, and may be electrically connected to the routing wiring RM (e.g., RM1, RM2) disposed in the display part 200 described above.

The seventh conductive layer ML7, the eighth via VA8, and the eighth conductive layer ML8 may be disposed in the second interlayer insulating layer INS2. The seventh conductive layer ML7, the eighth via VA8, and the eighth conductive layer ML8 may constitute a second driving circuit layer of the driving circuit layer 120 disposed in the second interlayer insulating layer INS2.

It is illustrated in the drawing that the first to eighth conductive layers ML1 to ML8 and the first to eighth vias VA1 to VA8 have a structure in which the first to eighth conductive layers ML1 to ML8 and the first to eighth vias VA1 to VA8 are stacked on each other, but the arrangement and connection thereof may be variously modified depending on the circuits of the driving circuit part 400 and the data driver 700 of the driving part 100. The connection structure illustrated in the drawing is only an example, and the connection of the driving circuit layer 120 disposed in the driving part 100 of the display device 10 is not limited thereto. In addition, the driving circuit layer 120 may not necessarily include the first to eighth conductive layers ML1 to ML8 and the first to eighth vias VA1 to VA8, and some of these layers may be omitted or a larger number of layers may be disposed.

The first to eighth conductive layers ML1 to ML8 and the first to eighth vias VA1 to VA8 may be formed of substantially the same material. For example, the first to eighth conductive layers ML1 to ML8 and the first to eighth vias VA1 to VA8 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof.

Each of a thickness of the first conductive layer ML1, a thickness of the second conductive layer ML2, a thickness of the third conductive layer ML3, a thickness of the fourth conductive layer ML4, a thickness of the fifth conductive layer ML5, and a thickness of the sixth conductive layer ML6 may be greater than each of a thickness of the first via VA1, a thickness of the second via VA2, a thickness of the third via VA3, a thickness of the fourth via VA4, a thickness of the fifth via VA5, and a thickness of the sixth via VA6. Each of the thickness of the second conductive layer ML2, the thickness of the third conductive layer ML3, the thickness of the fourth conductive layer ML4, the thickness of the fifth conductive layer ML5, and the thickness of the sixth conductive layer ML6 may be greater than the thickness of the first conductive layer ML1. The thickness of the second conductive layer ML2, the thickness of the third conductive layer ML3, the thickness of the fourth conductive layer ML4, the thickness of the fifth conductive layer ML5, and the thickness of the sixth conductive layer ML6 may be substantially the same. For example, the thickness of the first conductive layer ML1 may be approximately 1360 Å, each of the thickness of the second conductive layer ML2, the thickness of the third conductive layer ML3, the thickness of the fourth conductive layer ML4, the thickness of the fifth conductive layer ML5, and the thickness of the sixth conductive layer ML6 may be approximately 1440 Å, and each of the thickness of the first via VA1, the thickness of the second via VA2, the thickness of the third via VA3, the thickness of the fourth via VA4, the thickness of the fifth via VA5, and the thickness of the sixth via VA6 may be 1150 Å.

Each of a thickness of the seventh conductive layer ML7 and a thickness of the eighth conductive layer ML8 may be greater than each of the thickness of the first conductive layer ML1, the thickness of the second conductive layer ML2, the thickness of the third conductive layer ML3, the thickness of the fourth conductive layer ML4, the thickness of the fifth conductive layer ML5, and the thickness of the sixth conductive layer ML6. Each of the thickness of the seventh conductive layer ML7 and the thickness of the eighth conductive layer ML8 may be greater than each of a thickness of the seventh via VA7 and a thickness of the eighth via VA8. Each of the thickness of the seventh via VA7 and the thickness of the eighth via VA8 may be greater than each of the thickness of the first via VA1, the thickness of the second via VA2, the thickness of the third via VA3, the thickness of the fourth via VA4, the thickness of the fifth via VA5, and the thickness of the sixth via VA6. The thickness of the seventh conductive layer ML7 and the thickness of the eighth conductive layer ML8 may be substantially the same. For example, each of the thickness of the seventh conductive layer ML7 and the thickness of the eighth conductive layer ML8 may be approximately 9000 Å. Each of the thicknesses of the seventh via VA7 and the eighth via VA8 may be approximately 6000 Å.

Figure 10:
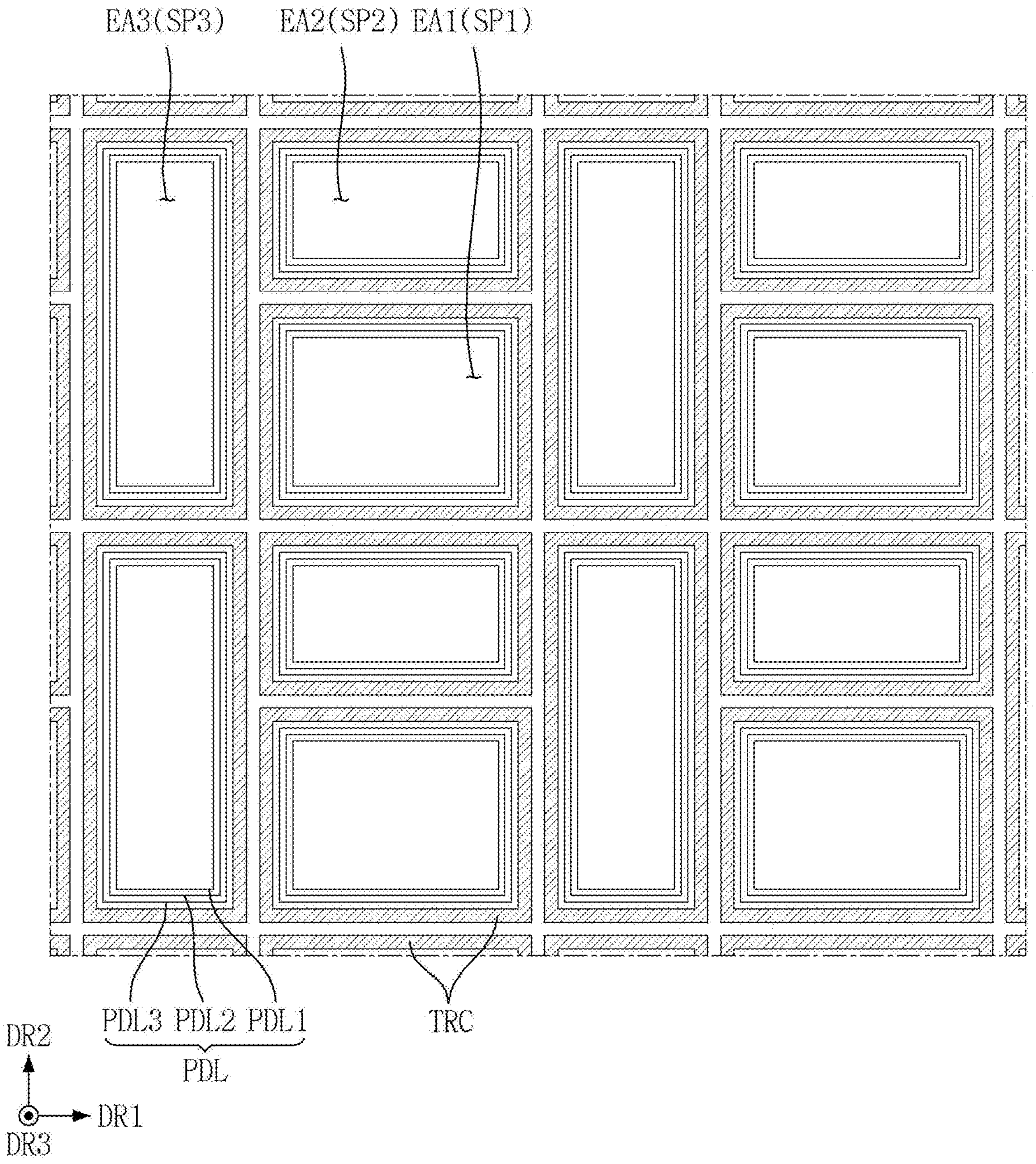
FIG. 10 is a plan view illustrating first electrodes, light emitting areas, and a pixel defining film of a plurality of sub-pixels disposed in a display area of a display part according to one or more embodiments.

FIG. 10 is a plan view illustrating first electrodes, light emitting areas and a pixel defining film of a plurality of sub-pixels disposed in a display area of a display part according to one or more embodiments.

Referring to FIG. 10, each of a plurality of pixels PX may include a first sub-pixel SP1, a second sub-pixel SP2, and a third sub-pixel SP3. The first to third sub-pixels SP1, SP2, and SP3 may include light emitting areas EA1, EA2, and EA3, respectively. For example, the first sub-pixel SP1 may include a first light emitting area EA1, the second sub-pixel SP2 may include a second light emitting area EA2, and the third sub-pixel SP3 may include a third light emitting area EA3.

Each of the first light emitting area EA1, the second light emitting area EA2, and the third light emitting area EA3 may have a quadrangular planar shape such as a rectangle, a square, and/or a rhombus. For example, the third light emitting area EA3 may have a rectangular planar shape having a short side in the first direction DR1 and a long side in the second direction DR2. In addition, each of the second light emitting area EA2 and the first light emitting area EA1 may have a rectangular planar shape having a long side in the first direction DR1 and a short side in the second direction DR2.

Each of the first light emitting area EA1, the second light emitting area EA2, and the third light emitting area EA3 may be an area defined by the pixel defining film PDL. For example, each of the first light emitting area EA1, the second light emitting area EA2, and the third light emitting area EA3 may be an area defined by a first pixel defining film PDL1.

A length of the third light emitting area EA3 in the first direction DR1 may be smaller than a length of the first light emitting area EA1 in the first direction DR1, and may be smaller than a length of the second light emitting area EA2 in the first direction DR1. The length of the first light emitting area EA1 in the first direction DR1 and the length of the second light emitting area EA2 in the first direction DR1 may be substantially the same.

In each of the plurality of pixels PX, the first light emitting area EA1 and the second light emitting area EA2 may be adjacent to each other in the second direction DR2. In addition, the first light emitting area EA1 and the third light emitting area EA3 may be adjacent to each other in the first direction DR1. In addition, the second light emitting area EA2 and the third light emitting area EA3 may be adjacent to each other in the first direction DR1. An area of the first light emitting area EA1, an area of the second light emitting area EA2, and an area of the third light emitting area EA3 may be different.

It is illustrated in the drawing that each of the first light emitting area EA1, the second light emitting area EA2, and the third light emitting area EA3 has a quadrangular planar shape, but the present disclosure is not limited thereto. For example, each of the first light emitting area EA1, the second light emitting area EA2, and the third light emitting area EA3 may have a polygonal, circular, and/or elliptical planar shape other than the quadrangular shape.

The first light emitting area EA1 emits light of a first color, the second light emitting area EA2 emits light of a second color, and the third light emitting area EA3 emits light of a third color. Here, the light of the first color may be light in a red wavelength band, the light of the second color may be light in a green wavelength band, and the light of the third color may be light in a blue wavelength band. For example, the blue wavelength band may indicate that a main peak wavelength of light is included in a wavelength band of approximately 370 nm to 460 nm, the green wavelength band may indicate that a main peak wavelength of light is included in a wavelength band of approximately 480 nm to 560 nm, and the red wavelength band may indicate that a main peak wavelength of light is included in a wavelength band of approximately 600 nm to 750 nm.

A first electrode AND (e.g., see FIG. 12) of the light emitting element may have a rectangular planar shape. The planar shape of the first electrode AND of the light emitting element may be different in the first sub-pixel SP1, the second sub-pixel SP2, and the third sub-pixel SP3. For example, the first electrode AND of the first sub-pixel SP1 and the first electrode AND of the second sub-pixel SP2 may have a rectangular planar shape having a long side in the first direction DR1 and a short side in the second direction DR2. The first electrode AND of the third sub-pixel SP3 may have a rectangular planar shape having a short side in the first direction DR1 and a long side in the second direction DR2. A length of the first electrode AND of the third sub-pixel SP3 in the first direction DR1 may be shorter than a length of the first electrode AND of each of the first sub-pixel SP1 and the second sub-pixel SP2 in the second direction DR2. The length of the first electrode AND of the first sub-pixel SP1 in the second direction DR2 may be longer than the length of the first electrode AND of the second sub-pixel SP2 in the second direction DR2.

The first electrode AND of the light emitting element may be connected to a reflective electrode layer (e.g., RL in FIG. 12) through an electrode via VAP. The electrode via VAP may overlap the first pixel defining film PDL1, the second pixel defining film PDL2, and the third pixel defining film PDL3 in the third direction DR3.

At least one trench TRC (e.g., see FIG. 12) may be a structure for disconnecting at least one charge generation layer of a light emitting stack IL (e.g., see FIG. 12) between the light emitting areas EA1, EA2, and EA3 adjacent to each other. At least one trench TRC may be disposed between the first light emitting area EA1 and the second light emitting area EA2, between the first light emitting area EA1 and the third light emitting area EA3, and between the second light emitting area EA2 and the third light emitting area EA3. More specifically, at least one trench TRC may be disposed between the first electrode AND of the first sub-pixel SP1 and the first electrode AND of the second sub-pixel SP2, between the first electrode AND of the first sub-pixel SP1 and the first electrode AND of the third sub-pixel SP3, and between the first electrode AND of the second sub-pixel SP2 and the first electrode AND of the third sub-pixel SP3.

Figure 11:
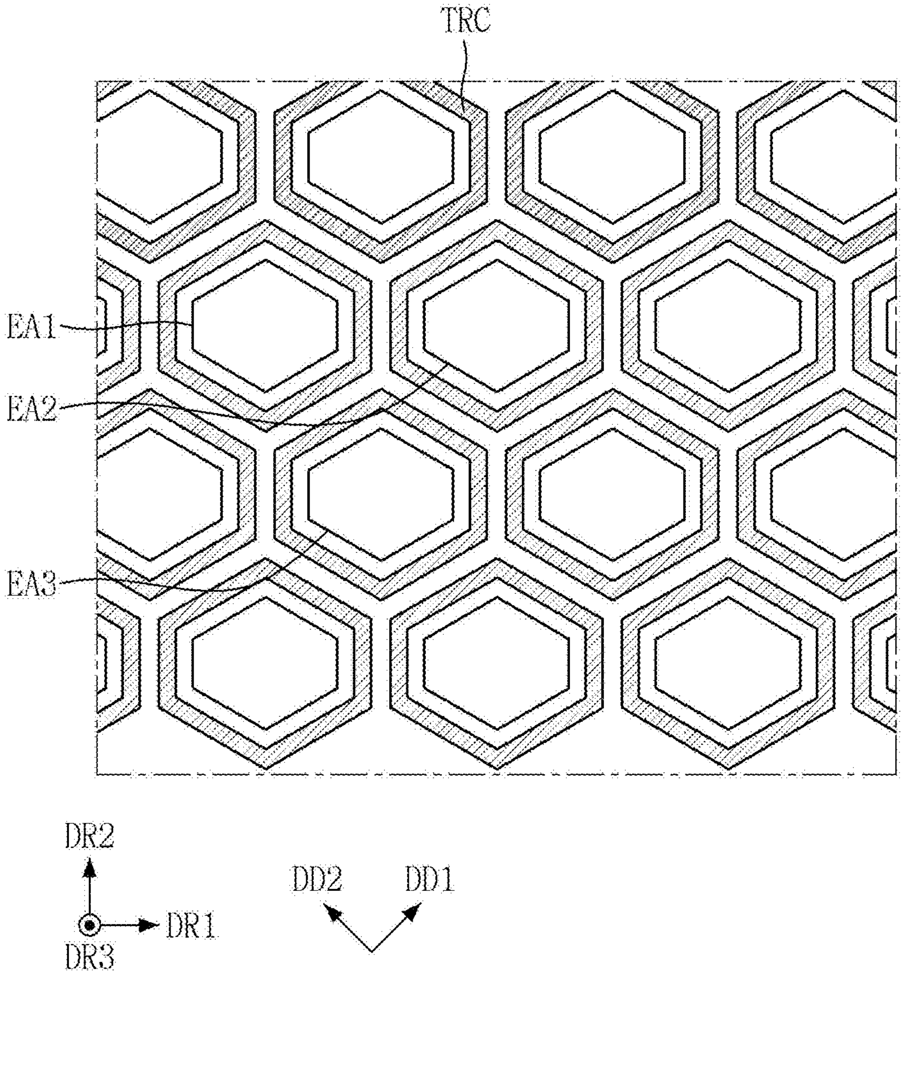
FIG. 11 is a plan view illustrating first electrodes, light emitting areas, and a pixel defining film of a plurality of sub-pixels disposed in a display area of a display part according to one or more embodiments.

FIG. 11 is a plan view illustrating first electrodes, light emitting areas and a pixel defining film of a plurality of sub-pixels disposed in a display area of a display part according to one or more embodiments.

Referring to FIG. 11, because one embodiment of FIG. 11 is substantially the same as the embodiment of FIG. 10, except that the planar shape of the first light emitting area EA1, the second light emitting area EA2, and the third light emitting area EA3 is different from the embodiment of FIG. 10, the descriptions duplicated with the embodiment of FIG. 10 will be omitted.

The first light emitting area EA1, the second light emitting area EA2, and the third light emitting area EA3 may be disposed in a hexagonal structure having a hexagonal planar shape. In this case, the first light emitting area EA1 and the second light emitting area EA2 are adjacent to each other in the first direction DR1, but the second light emitting area EA2 and the third light emitting area EA3 may be adjacent to each other in a first diagonal direction DD1, and the first light emitting area EA1 and the third light emitting area EA3 may be adjacent to each other in a second diagonal direction DD2. The first diagonal direction DD1, which is a direction between the first direction DR1 and the second direction DR2, may indicate a direction inclined by 45 degrees compared to the first direction DR1 and the second direction DR2, and the second diagonal direction DD2 may be a direction perpendicular to the first diagonal direction DD1.

It is illustrated in FIGS. 10 and 11 that each of the plurality of pixels PX includes three light emitting areas EA1, EA2, and EA3, but the present disclosure is not limited thereto. That is, each of the plurality of pixels PX may also include four light emitting areas.

In addition, the arrangement of the light emitting areas of the plurality of pixels PX is not limited to that illustrated in the drawings. For example, the light emitting areas of the plurality of pixels PX may be disposed in a stripe structure in which the light emitting areas are arranged along the first direction DR1, a PENTILE® structure in which the light emitting areas have a diamond arrangement, and/or a hexagonal structure in which light emitting areas having a hexagonal planar shape are arranged. This PENTILE® arrangement structure may be referred to as an RGBG matrix structure (e.g., a PENTILE® matrix structure or an RGBG structure (e.g., a PENTILE® structure)). PENTILER is a registered trademark of Samsung Display Co., Ltd., Republic of Korea.

Figure 12:
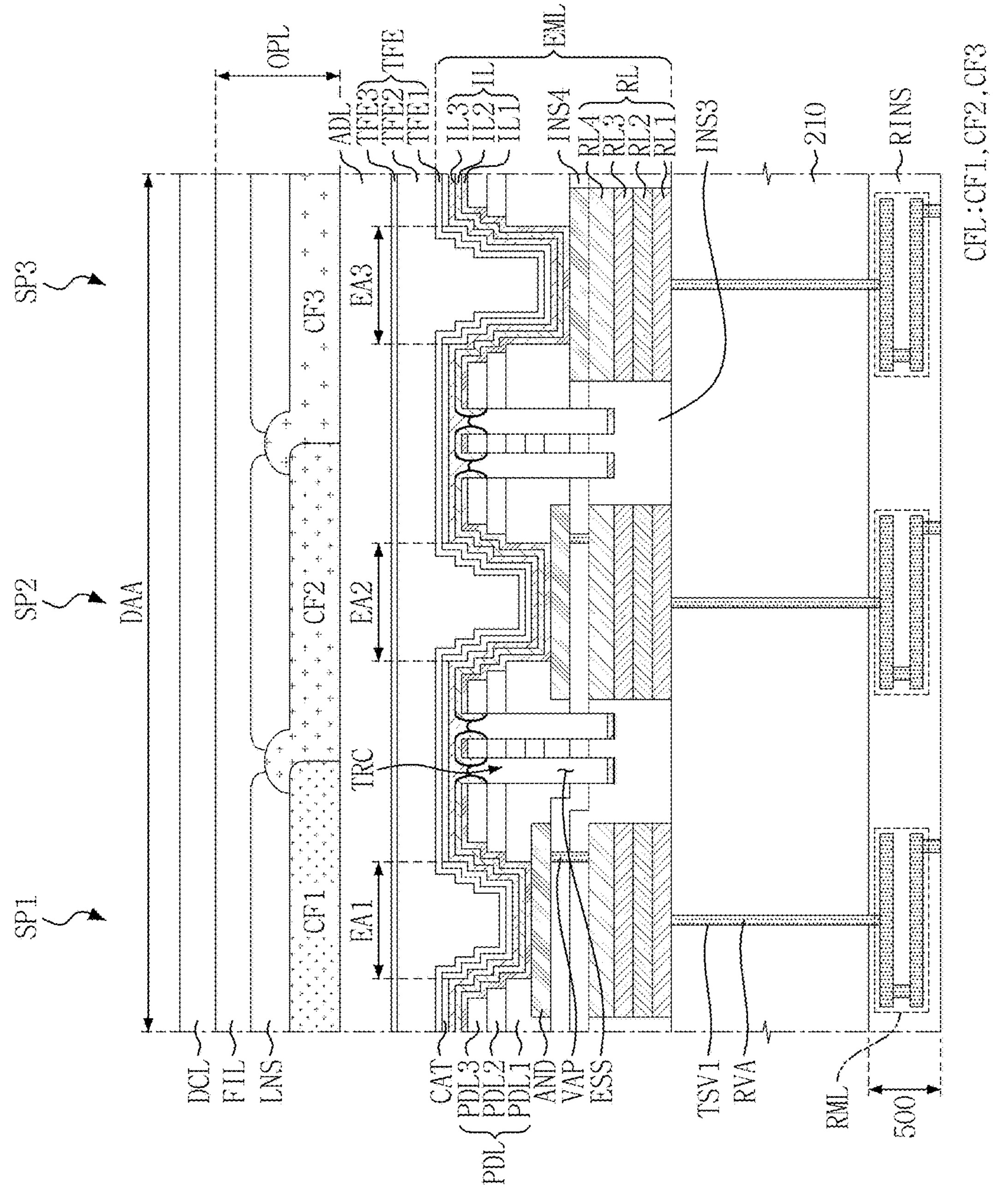
FIG. 12 is a cross-section view illustrating a portion of a display part according to one or more embodiments.

FIG. 12 is a cross-section view illustrating a portion of the display part according to one or more embodiments. FIG. 12 illustrates a partial cross section of the display area DAA of the display part 200.

Referring to FIG. 12, the display part 200 may include a second single crystal semiconductor substrate 210, a display element layer EML, an encapsulation layer TFE, an adhesive layer ADL, a color filter layer CFL, a lens LNS, a filling layer FIL, and a cover layer DCL. The display element layer EML, the encapsulation layer TFE, the adhesive layer ADL, the color filter layer CFL, the lens LNS, the filling layer FIL, and the cover layer DCL of the display part 200 may constitute the display layer 230. In one or more embodiments, the display part 200 may further include a polarizing plate disposed on the cover layer DCL. The connection line layer 500 may be disposed on the second single crystal semiconductor substrate 210 and the first single crystal semiconductor substrate 110. Alternatively, the connection line layer 500 may be disposed between the display element layer EML and the second single crystal semiconductor substrate 210. In one or more other embodiments, the connection line layer 500 may be disposed between the display element layer EML and the first single crystal semiconductor substrate 110.

The second single crystal semiconductor substrate 210 may be a silicon substrate, a germanium substrate, and/or a silicon-germanium substrate. The second single crystal semiconductor substrate 210 may be a substrate doped with impurities. Unlike the first single crystal semiconductor substrate 110, transistors may not be formed in the second single crystal semiconductor substrate 210. The second single crystal semiconductor substrate 210 may serve as a lower substrate on which the display element layer EML is disposed, and may form a connection path on which the routing wiring RM1 that electrically connects the light emitting element of the display element layer EML and the pixel circuit part 800 of the driving part 100 is disposed.

As described above, the first single crystal semiconductor substrate 110 of the driving part 100 may have a smaller planar area than the second single crystal semiconductor substrate 210 of the display part 200, and may have small-sized elements disposed with a high degree of integration, thereby reducing power consumption and improving manufacturing yield. On the other hand, a process having a larger planar area and a relatively larger line width than the first single crystal semiconductor substrate 110 may be performed on the second single crystal semiconductor substrate 210 of the display part 200. Unlike the circuit elements formed on the first single crystal semiconductor substrate 110, the elements of the display layer 230 formed on the second single crystal semiconductor substrate 210 may not require a high degree of integration. Accordingly, a semiconductor process performed on the first wafer substrate may be performed as a high-cost process with a small line width, and a semiconductor process performed on the second wafer substrate may be performed as a low-cost process with a relatively large line width.

The second single crystal semiconductor substrate 210 may include a plurality of first through holes TSV1 spaced (e.g., spaced apart) from each other. The first through hole TSV1 may penetrate from an upper surface to a lower surface of the second single crystal semiconductor substrate 210. The conductive vias RVA of the first routing wiring RM1 may be disposed in the first through holes TSV1. The first through hole TSV1 may form a connection path for the first routing wirings RM1 that electrically connect the pixel circuit part 800 of the driving part 100 and the light emitting element of the display part 200.

In one or more embodiments, the second single crystal semiconductor substrate 210 may include a plurality of second through holes TSV2 formed in the non-display area NA, and conductive vias of the second routing wiring RM2 may be each disposed in the second through holes TSV2. The circuit board 300 and the signal terminal STD of the driving part 100 may be electrically connected to each other through the second routing wiring RM2.

In one or more embodiments, the first through hole TSV1 of the second single crystal semiconductor substrate 210 may be formed through a through silicon via (TSV) process that forms a hole penetrating through the wafer substrate. The display layer 230 and the driving part 100 may be electrically connected to each other without a separate wire through the through hole TSV1 and the routing wiring RM1 formed in the second single crystal semiconductor substrate 210.

A process of reducing a thickness of the second single crystal semiconductor substrate 210 may be performed after the driving part 100 is formed on the silicon wafer substrate. The second single crystal semiconductor substrate 210 may have a thickness that is less than a thickness of the wafer substrate on which a process for forming the conductive layers is performed. In one or more embodiments, the thickness of the second single crystal semiconductor substrate 210 may be 100 μm or less, for example, in the range of 80 μm to 100 μm.

The connection line layer 500 may be disposed on a lower surface of the second single crystal semiconductor substrate 210. The connection line layer 500 may include an interlayer insulating layer RINS and a plurality of connection wirings RML.

The interlayer insulating layer RINS may be disposed on the lower surface of the second single crystal semiconductor substrate 210. The interlayer insulating layer RINS may be formed of a silicon carbon nitride (SiCN) and/or silicon oxide ($SiO_x$)-based inorganic film, but is not limited thereto. It is illustrated in the drawing that the interlayer insulating layer RINS is each formed of one layer, but is not limited thereto and the interlayer insulating layer RINS may have a structure in which at least one or more layers are stacked on each other, and these may be disposed between the connection wirings RML.

The connection wirings RML may form the routing wiring RM1 and RM2 together with the conductive via RVA. The connection wiring RML may include at least one or more conductive layers and one or more vias connecting the conductive layers to each other. The connection and structure of the connection wirings RML may be the same as the description of the plurality of conductive layers ML1 to ML8 and vias VA1 to VA8 described above (e.g., FIG. 9). The connection wiring RML may be connected to the light emitting elements of the sub-pixels SP1, SP2, and SP3 or the circuit board 300 through the conductive vias RVA disposed in the through holes TSV1 and TSV2 of the second single crystal semiconductor substrate 210, and may each electrically connect the light emitting elements or the circuit board 300 to the driving circuit layer 120 of the driving part 100.

The conductive via RVA of the first routing wiring RM1 may be disposed in the first through hole TSV1. The conductive via RVA of the first routing wiring RM1 may be disposed in the first through hole TSV1 from the lower surface of the reflective electrode layer RL, which will be described later, to the lower surface of the second single crystal semiconductor substrate 210. The conductive via RVA may be electrically connected to the first electrode AND disposed in each of the sub-pixels SP1, SP2, and SP3 through the reflective electrode layer RL and/or the electrode via VAP. The conductive via RVA may be connected to the reflective electrode layer RL and the connection wiring RML, respectively, and the connection wiring RML may be connected to the pixel circuit part 800. The connection wiring RML may be a wiring illustrated on the rear surface of the display part 200 in FIG. 7. The first routing wiring RM1 may connect the light emitting element of each of the sub-pixels SP1, SP2, and SP3 to the pixel circuit part 800 of the driving part 100.

The display layer 230 may be disposed on the second single crystal semiconductor substrate 210. The display layer 230 may include the display element layer EML, the encapsulation layer TFE, the adhesive layer ADL, an optical layer OPL (including the color filter layer CFL, the lens LNS, and the filling layer FIL), and the cover layer DCL. The display layer 230 may include light emitting elements electrically connected to the driving part 100 and emit light.

The display element layer EML may be disposed on the second single crystal semiconductor substrate 210. The display element layer EML may include light emitting elements each including a reflective electrode layer RL, interlayer insulating layer INS3 and INS4, an electrode via VAP, a first electrode AND, a light emitting stack IL, and a second electrode CAT, a pixel defining film PDL, and a plurality of trenches TRC.

The reflective electrode layer RL may be disposed on the second single crystal semiconductor substrate 210. The reflective electrode layer RL may include at least one or more reflective electrodes RL1, RL2, RL3, and RL4. For example, the reflective electrode layer RL may include first to fourth reflective electrodes RL1, RL2, RL3, and RL4 as illustrated in FIG. 12.

Each of the first reflective electrodes RL1 may be disposed on the second single crystal semiconductor substrate 210 and may be connected to the conductive via RVA disposed in the first through hole TSV1. The first reflective electrodes RL1 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. For example, the first reflective electrodes RL1 may include titanium nitride (TiN).

Each of second reflective electrodes RL2 may be disposed on the first reflective electrode RL1. The second reflective electrodes RL2 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. For example, the second reflective electrode RL2 may include aluminum (Al).

Each of third reflective electrodes RL3 may be disposed on the second reflective electrode RL2. The third reflective electrodes RL3 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. For example, the third reflective electrodes RL3 may include titanium nitride (TiN).

Each of fourth reflective electrodes RL4 may be disposed on the third reflective electrode RL3. The fourth reflective electrodes RL4 may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. For example, the fourth reflective electrode RL4 may include titanium (Ti).

In one or more embodiments, the second reflective electrode RL2 may be an electrode that substantially reflects light from the light emitting elements, and in one or more embodiments, a thickness of the second reflective electrode RL2 may be greater than a thickness of the first reflective electrode RL1, a thickness of the third reflective electrode RL3, and a thickness of the fourth reflective electrode RL4. For example, the thickness of the first reflective electrode RL1, the thickness of the third reflective electrode RL3, and the thickness of fourth reflective electrode RL4 are approximately 100 Å, and the thickness of the second reflective electrode RL2 may be approximately 850 Å. However, in one or more other embodiments, a thickness of the second reflective electrode RL2 may be substantially the same as a thickness of the first reflective electrode RL1, a thickness of the third reflective electrode RL3, and a thickness of the fourth reflective electrode RL4.

The third interlayer insulating layer INS3 may be disposed on the second single crystal semiconductor substrate 210. The third interlayer insulating layer INS3 may be disposed between the reflective electrode layers RL adjacent to each other. The third interlayer insulating layer INS3 may be disposed on the reflective electrode layer RL in the first sub-pixel SP1. The third interlayer insulating layer INS3 may be formed of a silicon oxide ($SiO_x$)-based inorganic film, but is not limited thereto.

The fourth interlayer insulating layer INS4 may be disposed on the third interlayer insulating layer INS3 and the reflective electrode layer RL. The fourth interlayer insulating layer INS4 may be formed of a silicon oxide ($SiO_x$)-based inorganic film, but is not limited thereto.

In at least one sub-pixel from among the first sub-pixel SP1, the second sub-pixel SP2, and the third sub-pixel SP3, considering a resonance distance of light emitted from the light emitting elements, the third interlayer insulating layer INS3 and the fourth interlayer insulating layer INS4 may not be disposed below the first electrode AND.

For example, the first electrode AND of the third sub-pixel SP3 may be directly disposed on the fourth reflective electrode RL4, and the first electrode AND of the third sub-pixel SP3 may not overlap the third interlayer insulating layer INS3 and the fourth interlayer insulating layer INS4. The first electrode AND of the second sub-pixel SP2 may be disposed on the fourth interlayer insulating layer INS4, and the fourth interlayer insulating layer INS4 may be directly disposed on the fourth reflective electrode RL4. That is, the first electrode AND of the second sub-pixel SP2 may not overlap the third interlayer insulating layer INS3. The first electrode AND of the first sub-pixel SP1 may be disposed on the fourth interlayer insulating layer INS4 and may overlap the third interlayer insulating layer INS3.

In one or more embodiments, a distance between the first electrode AND and the reflective electrode layer RL may be different in each of the first sub-pixel SP1, the second sub-pixel SP2, and the third sub-pixel SP3. In order to adjust a distance from the reflective electrode layer RL to the second electrode CAT according to a main wavelength of light emitted from each of the first sub-pixel SP1, the second sub-pixel SP2, and the third sub-pixel SP3, the presence or absence of the third interlayer insulating layer INS3 and the fourth interlayer insulating layer INS4 may be set in each of the first sub-pixel SP1, the second sub-pixel SP2, and the third sub-pixel SP3. For example, in FIG. 12, a distance between the first electrode AND and the reflective electrode layer RL in the first sub-pixel SP1 may be greater than a distance between the first electrode AND and the reflective electrode layer RL in the second sub-pixel SP2 and a distance between the first electrode AND and the reflective electrode layer RL in the third sub-pixel SP3, and the distance between the first electrode AND and the reflective electrode layer RL in the second sub-pixel SP2 may be greater than a distance between the first electrode AND and the reflective electrode layer RL in the third sub-pixel SP3. However, the present disclosure is not limited thereto. In each of the sub-pixels SP1, SP2, and SP3, the distance between the first electrode AND and the reflective electrode layer RL may be modified and designed in various ways.

Each of the electrode vias VAP may be connected to the fourth reflective electrode RL4 exposed by penetrating through the third interlayer insulating layer INS3 and/or the fourth interlayer insulating layer INS4 in the first sub-pixel SP1 and the second sub-pixel SP2. The electrode vias VAP may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. A thickness of the electrode via VAP in the second sub-pixel SP2 may be smaller than a thickness of the electrode via VAP in the first sub-pixel SP1.

The first electrode AND of each of the light emitting element may be disposed on the fourth interlayer insulating layer INS4 or the reflective electrode layer RL and may be connected to the electrode via VAP. The first electrode AND of each of the light emitting elements LE may be connected to the pixel circuit part 800 through the electrode via VAP, the first to fourth reflective electrodes RL1 to RL4, and the first routing wiring RM1. (e.g., the conductive via RVA and the connection wirings RML) The first electrode AND of each of the light emitting elements may be formed of copper (Cu), aluminum (Al), tungsten (W), molybdenum (Mo), chromium (Cr), gold (Au), titanium (Ti), nickel (Ni), and/or neodymium (Nd), and/or an alloy including one or more thereof. For example, the first electrode AND of each of the light emitting elements may be formed of titanium nitride (TiN).

The pixel defining film PDL may be disposed on a partial area of the first electrode AND of each of the light emitting elements. The pixel defining film PDL may cover an edge of the first electrode AND of each of the light emitting elements. The pixel defining film PDL serves to partition the first light emitting areas EA1, the second light emitting areas EA2, and the third light emitting areas EA3.

The first light emitting area EA1 may be defined as an area in which the first electrode AND, the light emitting stack IL, and the second electrode CAT are sequentially stacked in the first sub-pixel SP1 to emit light. The second light emitting area EA2 may be defined as an area in which the first electrode AND, the light emitting stack IL, and the second electrode CAT are sequentially stacked in the second sub-pixel SP2 to emit light. The third light emitting area EA3 may be defined as an area in which the first electrode AND, the light emitting stack IL, and the second electrode CAT are sequentially stacked in the third sub-pixel SP3 to emit light.

The pixel defining film PDL may include first to third pixel defining films PDL1, PDL2, and PDL3. The first pixel defining film PDL1 may be disposed on the edge of the first electrode AND of each of the light emitting elements LE, the second pixel defining film PDL2 may be disposed on the first pixel defining film PDL1, and the third pixel defining film PDL3 may be disposed on the second pixel defining film PDL2. The first pixel defining film PDL1, the second pixel defining film PDL2, and the third pixel defining film PDL3 may be formed of a silicon oxide ($SiO_x$)-based inorganic film, but is not limited thereto. Each of a thickness of the first pixel defining film PDL1, a thickness of the second pixel defining film PDL2, and a thickness of the third pixel defining film PDL3 may be approximately 500 Å.

When the first pixel defining film PDL1, the second pixel defining film PDL2, and the third pixel defining film PDL3 are formed as one pixel defining film, a first inorganic encapsulation layer TFE1 may be disconnected due to step coverage because a height of the one pixel defining film increases. The step coverage refers to a ratio of the extent to which a thin film is applied to an inclined portion relative to the extent to which a thin film is applied to a flat portion. As the step coverage is low, the possibility of the thin film disconnected at the inclined portion may increase.

In order to prevent the first inorganic encapsulation layer TFE1 from being disconnected due to the step coverage, the first pixel defining film PDL1, the second pixel defining film PDL2, and the third pixel defining film PDL3 may have a cross-sectional structure with a step-shaped level difference. For example, a width of the first pixel defining film PDL1 may be greater than a width of the second pixel defining film PDL2 and a width of the third pixel defining film PDL3, and the width of the second pixel defining film PDL2 may be greater than the width of third pixel defining film PDL3. The width of the first pixel defining film PDL1 refers to a horizontal length of the first pixel defining film PDL1 defined by the first direction DR1 and the second direction DR2.

Each of the plurality of trenches TRC may penetrate through the first pixel defining film PDL1, the second pixel defining film PDL2, and the third pixel defining film PDL3. In each of the plurality of trenches TRC, a portion of the third interlayer insulating layer INS3 may be dug and the fourth interlayer insulating layer INS4 may be penetrated.

At least one trench TRC may be disposed between the sub-pixels SP1, SP2, and SP3 adjacent to each other. It is illustrated in FIG. 12 that two trenches TRC are disposed between the sub-pixels SP1, SP2, and SP3 adjacent to each other, but the present disclosure is not limited thereto.

The light emitting stack IL may include a plurality of light emitting stacks IL1, IL2, and IL3. It is illustrated in the drawing that the light emitting stack IL has a three-tandem structure including a first light emitting stack IL1, a second light emitting stack IL2, and a third light emitting stack IL3, but the present disclosure is not limited thereto. For example, the light emitting stack IL may have a two-tandem structure including two stacks.

In the three-tandem structure, the light emitting stack IL may have a tandem structure including a plurality of light emitting stacks IL1, IL2, and IL3 that emit different lights. For example, the light emitting stack IL may include a first light emitting stack IL1 emitting light of a first color, a second light emitting stack IL2 emitting light of a third color, and a third light emitting stack IL3 emitting light of a second color. The first light emitting stack IL1, the second light emitting stack IL2, and the third light emitting stack IL3 may be sequentially stacked.

The first light emitting stack IL1 may have a structure in which a first hole transporting layer, a first organic light emitting layer emitting light of a first color, and a first electron transporting layer are sequentially stacked. The second light emitting stack IL2 may have a structure in which a second hole transporting layer, a second organic light emitting layer emitting light of a third color, and a second electron transporting layer are sequentially stacked. The third light emitting stack IL3 may have a structure in which a third hole transporting layer, a third organic light emitting layer emitting light of a second color, and a third electron transporting layer are sequentially stacked.

A first charge generation layer for supplying charges to the second light emitting stack IL2 and supplying electrons to the first light emitting stack IL1 may be disposed between the first light emitting stack IL1 and the second light emitting stack IL2. The first charge generation layer may include an N-type charge generation layer that supplies electrons to the first light emitting stack IL1 and a P-type charge generation layer that supplies holes to the second light emitting stack IL2. The N-type charge generation layer may include a dopant of a metallic material.

A second charge generation layer for supplying charges to the third light emitting stack IL3 and supplying electrons to the second light emitting stack IL2 may be disposed between the second light emitting stack IL2 and the third light emitting stack IL3. The second charge generation layer may include an N-type charge generation layer that supplies electrons to the second light emitting stack IL2 and a P-type charge generation layer that supplies holes to the third light emitting stack IL3.

The first light emitting stack IL1 may be disposed on the first electrodes AND and the pixel defining film PDL, and may be disposed on a bottom surface of each of the trenches TRC. Due to the trench TRC, the first light emitting stack IL1 may be disconnected between the sub-pixels SP1, SP2, and SP3 adjacent to each other. The second light emitting stack IL2 may be disposed on the first light emitting stack IL1. Due to the trench TRC, the second light emitting stack IL2 may be disconnected between the sub-pixels SP1, SP2, and SP3 adjacent to each other. A cavity or an empty space ESS may be disposed between the first light emitting stack IL1 and the second light emitting stack IL2. The third light emitting stack IL3 may be disposed on the second light emitting stack IL2. The third light emitting stack IL3 may not be disconnected by the trench TRC and may be disposed to cover the second light emitting stack IL2 in each of the trenches TRC. That is, in the three-tandem structure, each of the plurality of trenches TRC may be a structure for disconnecting the first and second light emitting stacks IL1 and IL2, the first charge generation layer, and the second charge generation layer of the display element layer EML between the sub-pixels SP1, SP2, and SP3 adjacent to each other. In addition, in the two-tandem structure, each of the plurality of trenches TRC may be a structure for disconnecting the charge generation layer disposed between a lower intermediate layer and an upper intermediate layer and the lower intermediate layer.

In order to stably disconnect the first and second light emitting stacks IL1 and IL2 of the display element layer EML between the sub-pixels SP1, SP2, and SP3 adjacent to each other, a height of each of the plurality of trenches TRC may be greater than a height of the pixel defining film PDL. The height of each of the plurality of trenches TRC indicates a length of each of the plurality of trenches TRC in the third direction DR3. The height of the pixel defining film PDL indicates a length of the pixel defining film PDL in the third direction DR3. In order to disconnect the first to third light emitting stacks IL1, IL2, and IL3 of the display element layer EML between the sub-pixels SP1, SP2, and SP3 adjacent to each other, other structures may be present instead of the trench TRC. For example, instead of the trench TRC, a partition wall having a reverse tapered shape may be disposed on the pixel defining film PDL.

The number of light emitting stacks IL1, IL2, and IL3 emitting different light is not limited to that illustrated in the drawing. For example, the light emitting stack IL may include two intermediate layers. In this case, one of the two intermediate layers may be substantially the same as the first light emitting stack IL1, and the other thereof may include a second hole transporting layer, a second organic light emitting layer, a third organic light emitting layer, and a second electron transporting layer. In this case, a charge generation layer for supplying electrons to one intermediate layer and supplying charges to the other intermediate layer may be disposed between the two intermediate layers.

In addition, it is illustrated in FIG. 12 that the first to third light emitting stacks IL1, IL2, and IL3 are all disposed in the first light emitting area EA1, the second light emitting area EA2, and the third light emitting area EA3, but the present disclosure is not limited thereto. For example, the first light emitting stack IL1 may be disposed in the first light emitting area EA1 and may not be disposed in the second light emitting area EA2 and the third light emitting area EA3. In addition, the second light emitting stack IL2 may be disposed in the second light emitting area EA2 and may not be disposed in the first light emitting area EA1 and the third light emitting area EA3. In addition, the third light emitting stack IL3 may be disposed in the third light emitting area EA3 and may not be disposed in the first light emitting area EA1 and the second light emitting area EA2. In this case, first to third color filters CF1, CF2, and CF3 of the optical layer OPL may be omitted.

The second electrode CAT may be disposed on the third light emitting stack IL3. The second electrode CAT may be disposed on the third light emitting stack IL3 in each of the plurality of trenches TRC. The second electrode CAT may be formed of a transparent conductive material (TCO) such as ITO and/or IZO capable of transmitting light, or a semi-transmissive conductive material such as magnesium (Mg), silver (Ag), and/or an alloy of magnesium (Mg) and silver (Ag). When the second electrode CAT is formed of a semi-transmissive conductive material, light emission efficiency may be increased in each of the first to third sub-pixels SP1, SP2, and SP3 by micro cavities.

The encapsulation layer TFE may be disposed on the display element layer EML. The encapsulation layer TFE may include one or more inorganic encapsulation layers TFE1 and TFE3 to prevent oxygen and/or moisture from permeating into the display element layer EML. In addition, the encapsulation layer TFE may include at least one organic film to protect the display element layer EML from foreign substances such as dust. For example, the encapsulation layer TFE may include a first inorganic encapsulation layer TFE1, an organic encapsulation layer TFE2, and a second inorganic encapsulation layer TFE3.

The first inorganic encapsulation layer TFE1 may be disposed on the second electrode CAT, the organic encapsulation layer TFE2 may be disposed on the first inorganic encapsulation layer TFE1, and the second inorganic encapsulation layer TFE3 may be disposed on the organic encapsulation layer TFE2. The first inorganic encapsulation layer TFE1 and the second inorganic encapsulation layer TFE3 may be formed as a multi-film in which one or more inorganic films of a silicon nitride layer ($SiN_x$), a silicon oxynitride layer (SiON), a silicon oxide layer ($SiO_x$), a titanium oxide layer ($TiO_x$), and/or an aluminum oxide layer ($AlO_x$) are alternately stacked. The organic encapsulation layer TFE2 may be a monomer. Alternatively, the organic encapsulation layer TFE2 may be an organic film made of an acrylic resin, an epoxy resin, a phenolic resin, a polyamide resin, and/or a polyimide resin.

The adhesive layer ADL may be disposed on the encapsulation layer TFE. The adhesive layer ADL may be a layer for adhering the encapsulation layer TFE and a layer disposed thereon. The adhesive layer ADL may be a double-sided adhesive member. In addition, the adhesive layer ADL may be a transparent adhesive member such as a transparent adhesive and/or a transparent adhesive resin.

The optical layer OPL may include the color filter layer CFL, the plurality of lenses LNS, and the filling layer FIL. The color filter layer CFL may include first to third color filters CF1, CF2, and CF3. The first to third color filters CF1, CF2, and CF3 may be disposed on the adhesive layer ADL.

The first color filter CF1 may overlap the first light emitting area EA1. The first color filter CF1 may transmit light of a first color, that is, light in a red wavelength band. The red wavelength band may be approximately 600 nm to 750 nm. The first color filter CF1 may transmit light of a first color from among light emitted from the first light emitting area EA1.

The second color filter CF2 may overlap the second light emitting area EA2. The second color filter CF2 may transmit light of a second color, that is, light in a green wavelength band. The green wavelength band may be approximately 480 nm to 560 nm. The second color filter CF2 may transmit light of a second color from among light emitted from the second light emitting area EA2.

The third color filter CF3 may overlap the third light emitting area EA3. The third color filter CF3 may transmit light of a third color, that is, light in a blue wavelength band. The blue wavelength band may be approximately 370 nm to 460 nm. The third color filter CF3 may transmit light of a third color from among light emitted from the third light emitting area EA3.

Each of the plurality of lenses LNS may be disposed on each of the first color filter CF1, the second color filter CF2, and the third color filter CF3. Each of the plurality of lenses LNS may be a structure for increasing a ratio of light directed to the front of the display device 10. Each of the plurality of lenses LNS may have a cross-sectional shape that is convex in an upward direction.

The filling layer FIL may be disposed on the plurality of lenses LNS. The filling layer FIL may have a suitable refractive index (e.g., a predetermined refractive index) so that light travels in the third direction DR3 at an interface between the plurality of lenses LNS and the filling layer FIL. In addition, the filling layer FIL may be a planarization layer. The filling layer FIL may be an organic film made of an acryl resin, an epoxy resin, a phenolic resin, a polyamide resin, and/or a polyimide resin.

The cover layer DCL may be disposed on the filling layer FIL. The cover layer DCL may be a glass substrate and/or a polymer resin such as resin. When the cover layer DCL is a glass substrate, the cover layer DCL may be attached onto the filling layer FIL. In this case, the filling layer FIL may serve to adhere the cover layer DCL. When the cover layer DCL is a glass substrate, the cover layer DCL may serve as an encapsulation substrate. When the cover layer DCL is a polymer resin such as resin, the cover layer DCL may be directly applied on the filling layer FIL.

In one or more embodiments, the display part 200 may further include a polarizing plate disposed on the cover layer DCL. The polarizing plate may be disposed on one surface of the cover layer DCL. The polarizing plate may be a structure for preventing deterioration in visibility due to reflection of external light. The polarizing plate may include a linear polarizing plate and/or a phase retardation film. For example, the phase retardation film may be a $\lambda/4$ (quarter-wave) plate, but is not limited thereto. However, when deterioration in visibility due to reflection of external light is sufficiently improved by the first to third color filters CF1, CF2, and CF3, the polarizing plate may also be omitted.

Figure 13:
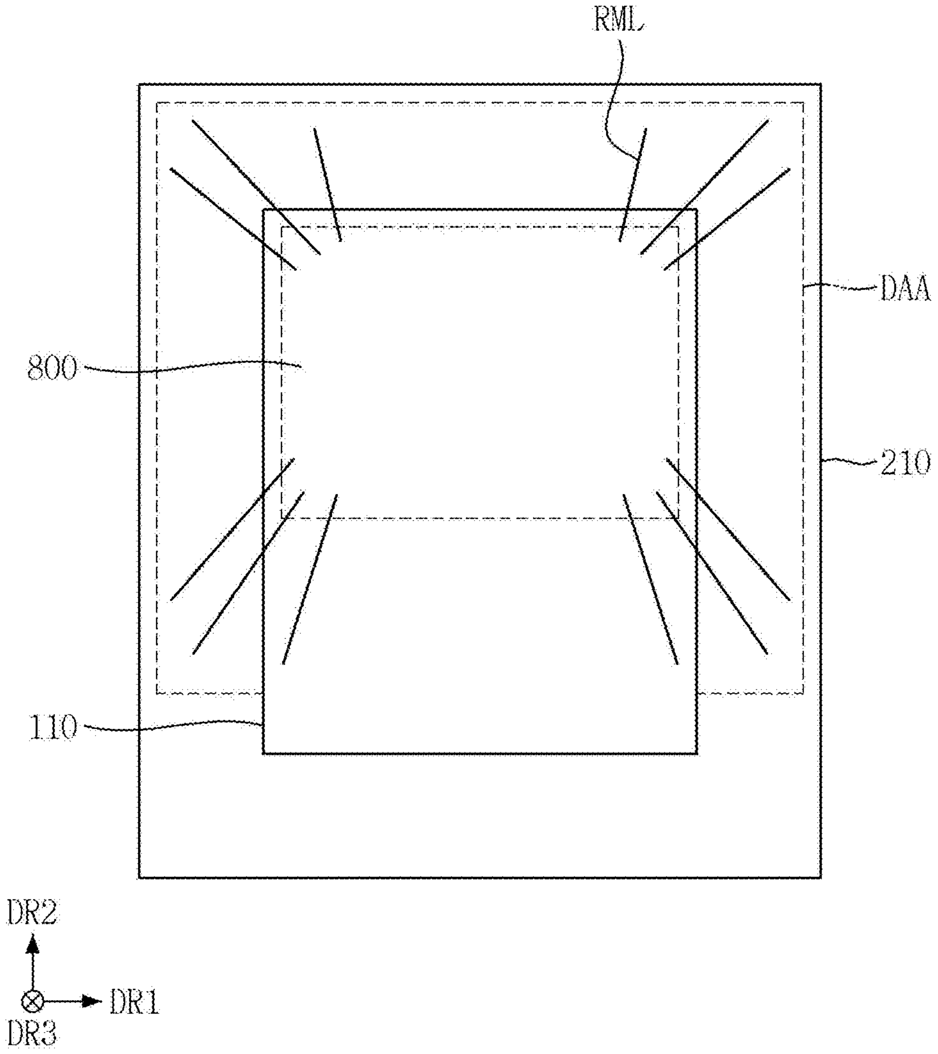
FIG. 13 is a view illustrating a schematic arrangement of connection wirings connecting a pixel circuit part of a display device and sub-pixels of a display area, according to one or more embodiments.

FIG. 13 is a view illustrating a schematic arrangement of connection wirings connecting a pixel circuit part of the display device and the sub-pixels of the display area according to one or more embodiments. FIG. 13 illustrates a relative arrangement of the connection wirings RML connecting the pixel circuit part 800 included in the driving part 100 of the display device 10 and the display area DAA of the display part 200.

Referring to FIG. 13, in the display device 10 according to one or more embodiments, the driving part 100 and the display part 200 may have different areas, and the pixel circuit part 800 and the display area DAA may also have different areas. However, the plurality of pixel circuits (PXC in FIG. 5) of the pixel circuit part 800 may each correspond to the plurality of sub-pixels (SP1, SP2, and SP3 in FIG. 3) of the display area DAA, and the plurality of pixel circuits and the plurality of sub-pixels may be connected to each other by the connection wirings RML. In one or more embodiments, the number of pixel circuits PXC disposed in the driving part 100 of the display device 10 may be the same as the number of sub-pixels SP1, SP2, and SP3 of the display part 200, and the number of each of pixel circuits PXC and the sub-pixels SP1, SP2, and SP3, respectively may be the same as the number of connection wirings RML and the first through holes TSV1 formed in the second single crystal semiconductor substrate 210.

The connection wirings RML of the connection line layer 500 may connect the pixel circuit PXC and the sub-pixels SP1, SP2, and SP3 to correspond to each other. The plurality of connection wirings RML may be disposed so that the pixel circuits PXC disposed in the pixel circuit parts 800 having a small area correspond to the sub-pixels SP1, SP2, and SP3 disposed in the display area DAA having a large area. In addition, some of the sub-pixels SP1, SP2, and SP3 of the display area DAA may overlap the pixel circuit part 800, and others may not overlap the pixel circuit part 800. Accordingly, some of the connection wirings RML may be disposed to extend from the pixel circuit part 800 to the display area DAA that does not overlap the pixel circuit part 800, and others may be disposed in an area overlapping the pixel circuit part 800 within the pixel circuit part 800. In the area of the display area DAA that does not overlap the pixel circuit part 800, a gap between the connection wirings RML is wide, but as the connection wirings RML are concentrated in the area of the display area DAA that overlaps the pixel circuit part 800, the gap between the connection wirings RML may be narrow. According to one or more embodiments, the connection wirings RML may include a plurality of bridge lines RBL1, RBL2, and RBL3 and bridge contacts RCT1, RCT2, and RCT3 disposed on different layers (e.g., see FIG. 15), and the bridge lines RBL1, RBL2, and RBL3 may be disposed on different layers even if the bridge lines RBL1, RBL2, and RBL3 are disposed adjacent to each other in a plan view, thereby preventing electrical interference.

Hereinafter, a more detailed structure of the connection wiring RML will be described with reference to other drawings.

Figure 14:
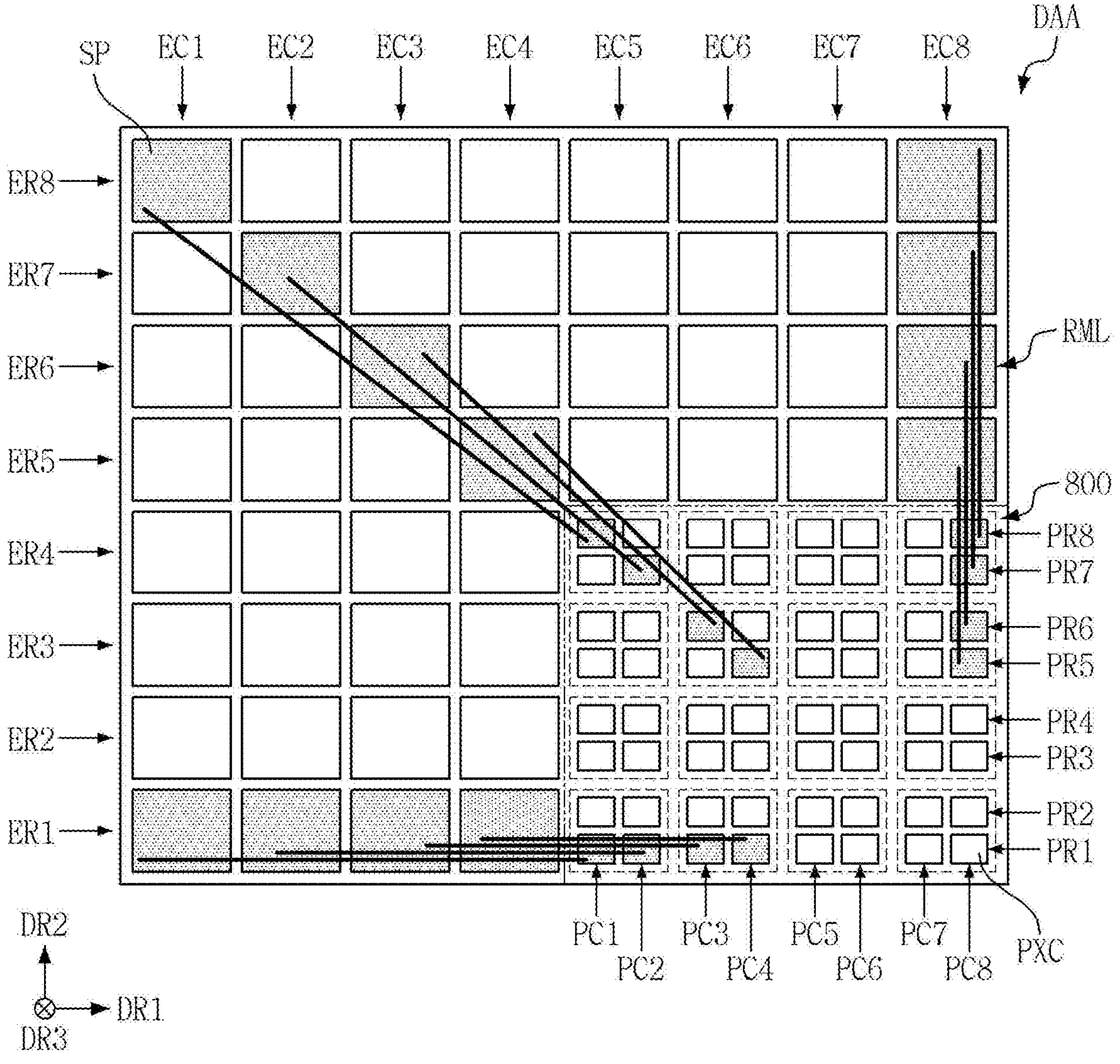
FIG. 14 is a schematic view illustrating a connection between sub-pixels and pixel circuits through connection wirings of a display device according to one or more embodiments.

FIG. 14 is a schematic view illustrating a connection between sub-pixels and pixel circuits through the connection wirings of the display device according to one or more embodiments. FIG. 14 schematically illustrates a relative arrangement of the sub-pixels SPX of the display area DAA and the pixel circuits PXC of the pixel circuit part 800 and an arrangement design of the connection wirings RML corresponding thereto.

Referring to FIG. 14, the pixel circuit part 800 may include a plurality of pixel circuits PXC, which may be arranged along the first direction DR1 and the second direction DR2. The pixel circuits PXC may include first to eighth circuit columns PC1, PC2, PC3, PC4, PC5, PC6, PC7, and PC8 arranged along the first direction DR1 and first to eighth circuit rows PR1, PR2, PR3, PR4, PR5, PR6, PR7, and PR8 arranged along the second direction DR2. FIG. 14 illustrates an arrangement of a total of 64 pixel circuits PXC in 8 circuit columns and 8 circuit rows.

The display part 200 may include a plurality of sub-pixels SP disposed in the display area DAA, and the plurality of sub-pixels SP may also be arranged along the first direction DR1 and the second direction DR2. The pixel circuits PXC may include first to eighth circuit columns EC1, EC2, EC3, EC4, EC5, EC6, EC7, and EC8 arranged along the first direction DR1 and first to eighth circuit rows ER1, ER2, ER3, ER4, ER5, ER6, ER7, and ER8 arranged along the second direction DR2. FIG. 14 illustrates an arrangement of a total of 64 sub-pixels SP in 8 pixel columns and 8 pixel rows. 16 sub-pixels SP belonging to the first to fourth pixel rows ER1, ER2, ER3, and ER4 and the fifth to eighth pixel columns EC5, EC6, EC7, and EC8 from among the plurality of sub-pixels SP may overlap the pixel circuit part 800. Other sub-pixels SP may not overlap the pixel circuit part 800.

As described above, the 64 pixel circuits PXC of the pixel circuit part 800 may each correspond to the 64 sub-pixels SP of the display area DAA, and the 64 pixel circuits PXC and the 64 sub-pixels SP may be connected to each other through the connection wirings RML. The sub-pixels SP disposed in the first pixel row ER1 arranged along the first direction DR1 of the pixel circuit part 800 may be connected to the pixel circuits PXC through the connection wirings RML approximately extending in the first direction DR1. The sub-pixels SP disposed in the eighth pixel row ER8 arranged along the second direction DR2 of the pixel circuit part 800 may be connected to the pixel circuits PXC through the connection wirings RML approximately extending in the second direction DR2. The sub-pixels SP disposed in a diagonal direction between the first direction DR1 and the second direction DR2 of the pixel circuit part 800 may be connected to the pixel circuits PXC through the connection wirings RML approximately extending in the diagonal direction. In one or more embodiments, other sub-pixels SP may also be connected to the pixel circuits PXC through connection wirings RML.

Although the drawing illustrates the connection wirings RML connecting some sub-pixels SP and pixel circuits PXC, an equivalent number of connection wirings RML corresponding to the sub-pixels SP and the pixel circuits PXC may be disposed in the portion illustrated in FIG. 14. For example, as illustrated in FIG. 14 with 64 sub-pixels SP and 64 pixel circuits PXC, 64 connection wirings RML may be disposed in the corresponding area. In addition to the 12 connection wirings RML illustrated in the drawing, a total of 52 connection wirings RML may be disposed to correspond to each sub-pixel SP and pixel circuit PXC.

When the connection wirings RML are disposed according to random rules to connect the sub-pixels SP and the pixel circuits PXC, interference may occur between the connection wirings RML adjacent to each other. However, the interference between the connection wirings RML may be reduced or minimized by dividing the connection wiring RML with the bridge lines disposed on different layers and disposing the bridge lines on different layers or sequentially disposing the bridge lines according to distance.

Figure 15:
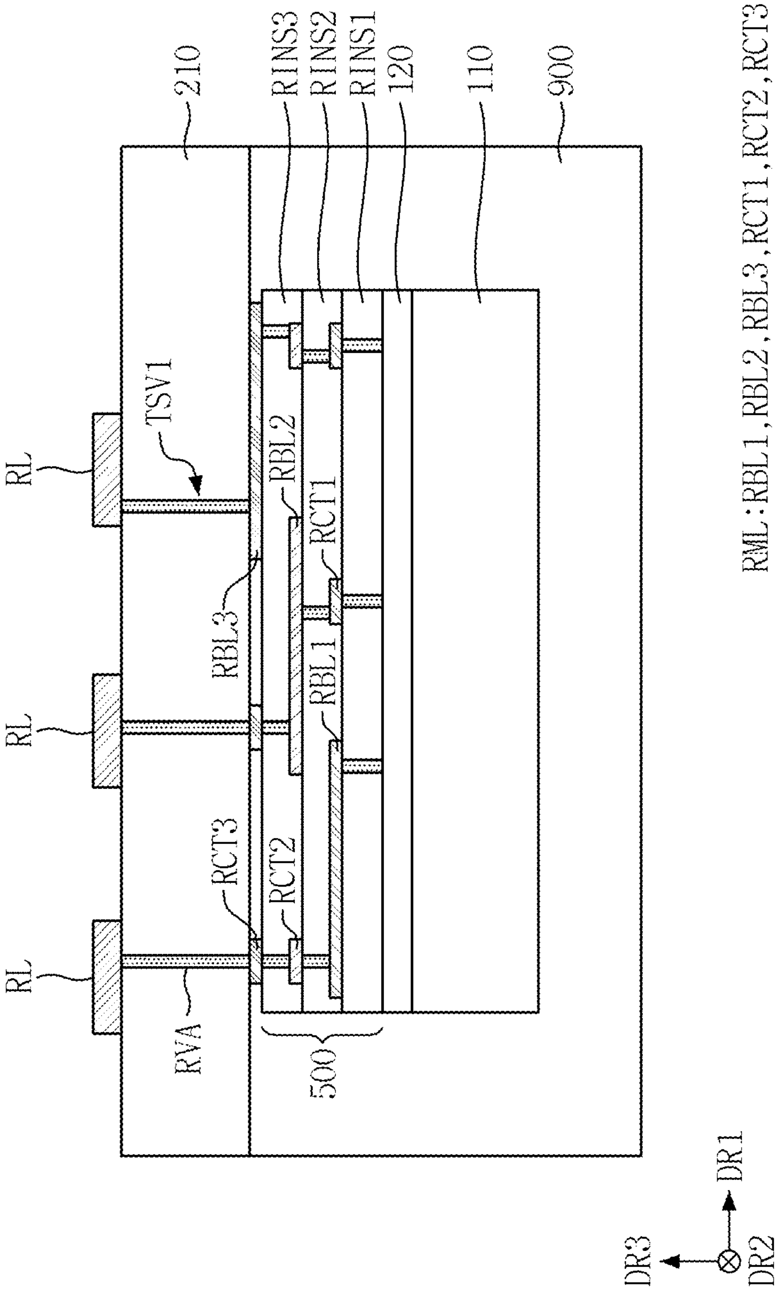
FIG. 15 is a schematic cross-sectional view illustrating an example of a connection line layer of a display device according to one or more embodiments.

FIG. 15 is a schematic cross-sectional view illustrating an example of a connection line layer of a display device according to one or more embodiments.

Referring to FIG. 15, the connection line layer 500 of the display device 10 may include a plurality of conductive layers and interlayer insulating layers RINS1, RINS2, and RINS3 therebetween. A first interlayer insulating layer RINS1 may be disposed on the driving circuit layer 120, and a second interlayer insulating layer RINS2 and a third interlayer insulating layer RINS3 may be sequentially disposed on the first interlayer insulating layer RINS1. The second single crystal semiconductor substrate 210 may be disposed on the third interlayer insulating layer RINS3. A first conductive layer of the connection line layer 500 may be disposed on the first interlayer insulating layer RINS1, a second conductive layer thereof may be disposed on the second interlayer insulating layer RINS2, and a third conductive layer thereof may be disposed on the third interlayer insulating layer RINS3.

The first conductive layer may include a first bridge line RBL1 and a plurality of first bridge contacts RCT1, the second conductive layer may include a second bridge line RBL2 and a plurality of second bridge contacts RCT2, and the third conductive layer may include a third bridge line RBL3 and a plurality of third bridge contacts RCT3. As the plurality of bridge lines RBL1, RBL2, and RBL3 include the interlayer insulating layers RINS1, RINS2, and RINS3 disposed therebetween, the plurality of bridge lines RBL1, RBL2, and RBL3 may be electrically insulated even though the plurality of bridge lines RBL1, RBL2, and RBL3 are disposed adjacent to each other.

In the display device 10, the connection wiring RML may include bridge lines RBL1, RBL2, and RBL3, bridge contacts RCT1, RCT2, and RCT3, and bridge vias therebetween. The connection wiring RML may be connected to the reflective electrode RL of the display layer 230 through the conductive via RVA disposed in the first through hole TSV1 of the second single crystal semiconductor substrate 210.

For example, one connection wiring RML may include one bridge line from among RBL1, RBL2, and RBL3 and two bridge contacts from among RCT1, RCT2, and RCT3. The first bridge line RBL1 may be connected to the conductive via RVA through the second bridge contact RCT2 and the third bridge contact RCT3. In addition, the first bridge line RBL1 may be connected to the driving circuit layer 120 through a bridge via. The second bridge line RBL2 may be connected to the driving circuit layer 120 through the first bridge contact RCT1 and may be connected to the conductive via RVA through the third bridge contact RCT3. The third bridge line RBL3 may be connected to the conductive via RVA and may be connected to the driving circuit layer 120 through the second bridge contact RCT2 and the first bridge contact RCT1.

One side of each of the plurality of bridge lines RBL1, RBL2, and RBL3 may overlap the sub-pixel SP or the reflective electrode RL of the display part 200, and the other side thereof may overlap the pixel circuit PXC of the driving circuit layer 120 of the driving part 100. One connection wiring RML may include one bridge line from among RBL1, RBL2, and RBL3 and one or more bridge contacts from among RCT1, RCT2, and RCT3 at both ends of the bridge line RBL1, RBL2, and RBL3. One bridge line from among RBL1, RBL2, and RBL3 may be disposed to extend between a pair of sub-pixel SP and pixel circuit PXC connected to each other, and may be electrically connected to the sub-pixel SP and the pixel circuit PXC through the bridge contacts RCT1, RCT2, and RCT3 at both ends of the corresponding bridge lines RBL1, RBL2, and RBL3.

Figure 16:
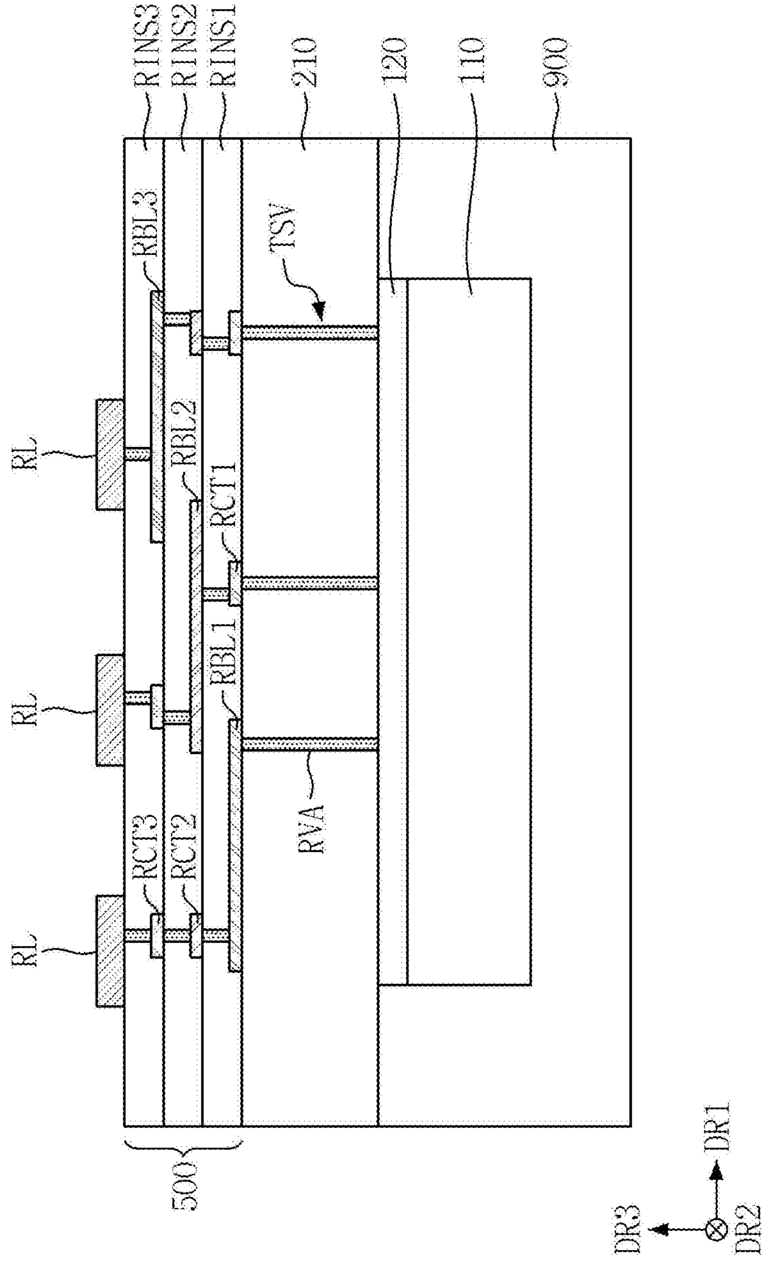
FIG. 16 is a schematic cross-sectional view illustrating an example of a connection line layer of a display device according to one or more embodiments.

FIG. 16 is a schematic cross-sectional view illustrating an example of a connection line layer of a display device according to one or more embodiments.

Referring to FIG. 16, in one or more embodiments in which the connection line layer 500 is disposed on the second single crystal semiconductor substrate 210, the first conductive layer of the connection line layer 500 may be disposed on the second single crystal semiconductor substrate 210. The reflective electrode RL of the display element layer EML may be disposed on the third interlayer insulating layer RINS3. The first conductive layer of the connection line layer 500 may be connected to the driving circuit layer 120 of the driving part 100 or the pixel circuit PXC through the conductive via RVA, and the third conductive layer may be connected to the reflective electrode RL through the bridge via.

Different connection wirings RML of the display device 10 may have different positions of the conductive layers where the bridge lines RBL1, RBL2, and RBL3 are disposed, and may also have different lengths and/or extension directions of the bridge lines RBL1, RBL2, and RBL3. In addition, the different connection wirings RML may also have different positions of the bridge contacts RCT1, RCT2, and RCT3 or the bridge vias connected to both ends of the bridge lines RBL1, RBL2, and RBL3. The display device 10 may prevent or reduce interference between the connection wirings RML adjacent to each other by differently designing the positions of the conductive layers on which the bridge lines RBL1, RBL2, and RBL3 of the connection wirings RML are disposed.

In addition, the display device 10 may have an arrangement design that ensures a sufficient space in a plan view so that the connection wirings RML are not disposed too close to each other when the connection wirings RML are concentrated and disposed in the pixel circuit part 800 having the small area.

Figure 17:
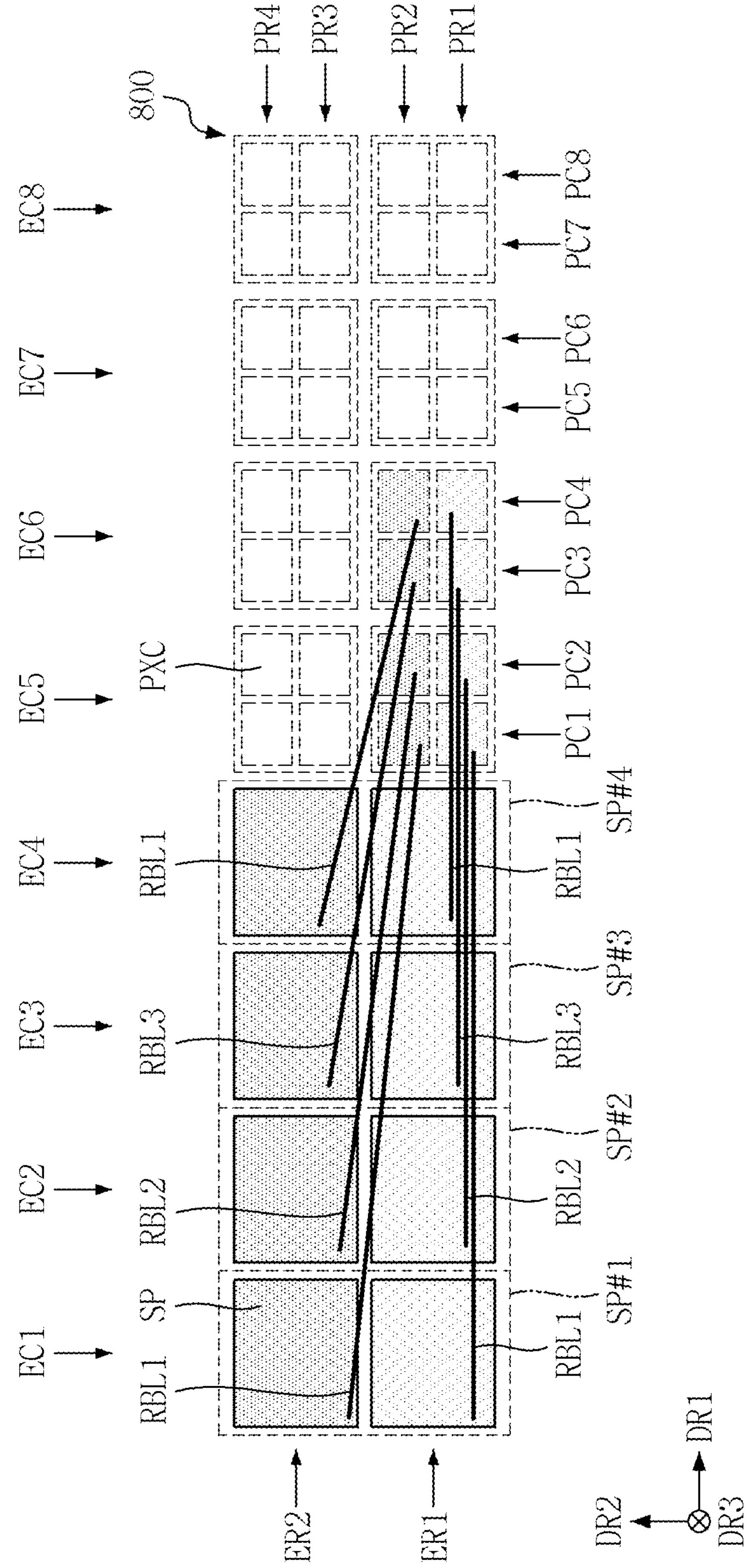
FIGS. 17 and 18 are schematic views illustrating a connection between the sub-pixels and the pixel circuits through the connection wirings in a first area of FIG. 14.
Figure 18:
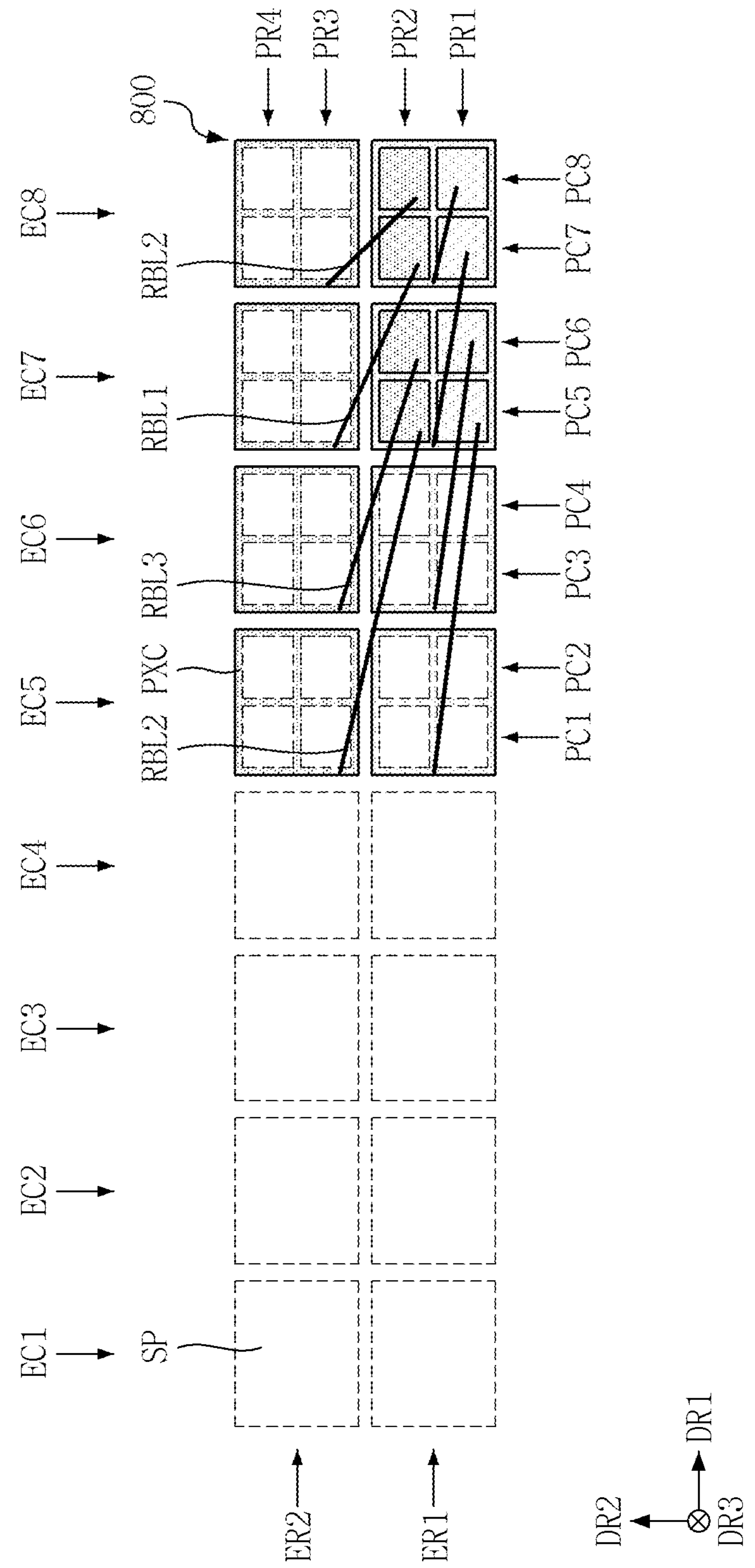

FIGS. 17 and 18 are schematic views illustrating a connection between the sub-pixels and the pixel circuits through the connection wirings in a first area of FIG. 14. FIGS. 17 and 18 illustrate an arrangement of the bridge lines RBL1, RBL2, and RBL3 of the connection wiring RML that connects the first pixel row ER1 and the second pixel row ER2 disposed along the first direction DR1 of the pixel circuit part 800 from among the sub-pixels SP disposed in the display area DAA to the pixel circuit PXC.

Referring to FIGS. 17 and 18, the sub-pixels SP that are furthest from the pixel circuit part 800 or the sub-pixels SP disposed at the outermost portion of the display area DAA, from among the sub-pixels SP may be connected to the pixel circuit PXC disposed at the outermost portion of the pixel circuit part 800. The sub-pixels SP sequentially disposed inside from the outermost sub-pixel SP may be respectively connected to the pixel circuits PXC sequentially disposed inside from the outermost pixel circuit PXC. For example, the sub-pixel SP disposed in the first pixel column EC1 of the first pixel row ER1 may be connected to the pixel circuit PXC of the first circuit row PR1 and the first circuit column PC1. Other sub-pixels SP of the first pixel row ER1 may be respectively connected to the pixel circuits PXC of the first circuit row PR1. The sub-pixel SP disposed in the first pixel column EC1 of the second pixel row ER2 may be connected to the pixel circuit PXC of the second circuit row PR2 and the first circuit column PC1. Other sub-pixels SP of the second pixel row ER2 may be respectively connected to the pixel circuits PXC of the second circuit row PR2.

Four sub-pixels SP that do not overlap the pixel circuit part 800 from among the sub-pixels SP disposed in the first pixel row ER1 may be disposed to extend so that the bridge lines RBL1, RBL2, and RBL3 of the connection lines RML deviate from the pixel circuit part 800. Among them, the outermost first sub-pixel SP #1 of the display area DAA may be connected to the pixel circuit PXC through the connection wiring including the first bridge line RBL1 disposed on the first conductive layer of the connection line layer 500. A second sub-pixel SP #2 adjacent to the first sub-pixel SP #1 in the first direction DR1 may be connected to the pixel circuit PXC through the connection wiring including the second bridge line RBL2 disposed on the second conductive layer of the connection line layer 500. A third sub-pixel SP #3 adjacent to the second sub-pixel SP #2 in the first direction DR1 may be connected to the pixel circuit PXC through the connection wiring including the third bridge line RBL3 disposed on the third conductive layer of the connection line layer 500. A fourth sub-pixel SP #4 adjacent to the third sub-pixel SP #3 in the first direction DR1 may be connected to the pixel circuit PXC through the connection wiring including the first bridge line RBL1 disposed on the first conductive layer of the connection line layer 500. The four sub-pixels SP may be respectively connected to the pixel circuit PXC through the connection wiring including the bridge lines RBL1, RBL2, and RBL3 disposed on different layers from other sub-pixels SP adjacent to each other.

In addition, the first bridge line RBL1 connected to the outermost first sub-pixel SP #1 of the display area DAA may be connected to the pixel circuit PXC of the pixel circuit part 800 via the second to fourth sub-pixels SP #2, SP #3, and SP #4. The second bridge line RBL2 connected to the second sub-pixel SP #2 is also connected to the pixel circuit PXC of the pixel circuit part 800 via the third and fourth sub-pixels SP #3 and SP #4. That is, it may be desirable to secure a space for at least four bridge lines RBL1, RBL2, and RBL3 to be disposed in the fourth sub-pixel SP #4. Considering this, the first bridge line RBL1 connected to the outermost first sub-pixel SP #1 from among the plurality of bridge lines RBL1, RBL2, and RBL3 may be disposed to be deviated from the center of the first sub-pixel SP #1 to a lower side, which is the other side in the second direction DR2. The second bridge line RBL2 and the third bridge line RBL3 may be sequentially disposed from the first bridge line RBL1 to an upper side, which is one side in the second direction DR2. That is, the bridge lines RBL1, RBL2, RBL3 connected to the sub-pixels SP disposed relatively on the outer portion may be disposed to be deviated to one side from the center of the sub-pixel SP compared to the bridge lines RBL1, RBL2, and RBL3 connected to the sub-pixels SP disposed inside the above-mentioned sub-pixels SP.

Accordingly, the positions of one end, which is a starting point of the bridge lines RBL1, RBL2, and RBL3, within the four sub-pixels SP of the first pixel row ER1 may be different from each other. For example, the position of the end of the first bridge line RBL1 in the outermost first sub-pixel SP #1 may be different from the position of the end of the second bridge line RBL2 in the second sub-pixel SP #2 adjacent to the first sub-pixel SP #1 in the first direction DR1, and the relative positions in each of the corresponding sub-pixels SP may also be different.

Four sub-pixels SP that do not overlap the pixel circuit part 800 from among the sub-pixels SP disposed in the second pixel row ER2 may also be disposed to extend so that the bridge lines RBL1, RBL2, and RBL3 of the connection lines RML deviate from the pixel circuit part 800. First to fourth sub-pixels SP #1, SP #2, SP #3, and SP #4 of the second pixel row ER2 may also be connected to the pixel circuits PXC of the second circuit row PR2 through the connection wirings RML including the first bridge line RBL1, the second bridge line RBL2, the third bridge line RBL3, and the first bridge line RBL1.

The sub-pixels SP of the first pixel row ER1 may be connected to the first circuit row PR1 parallel to (e.g., aligned in) the first direction DR1. On the other hand, the sub-pixels SP of the second pixel row ER2 may be connected to the second circuit row PR2 but may not be parallel to (e.g., aligned with) each other in the first direction DR1. Accordingly, the bridge lines RBL1, RBL2, and RBL3 connected to the second pixel row ER2 may extend in a diagonal direction. However, as the bridge lines RBL1, RBL2, and RBL3 connected to the first pixel row ER1 are disposed to be biased toward the lower side in the sub-pixel SP, it is possible to secure a sufficient space so that the bridge lines RBL1, RBL2, and RBL3 connected to the sub-pixel SP of the second pixel row ER2 are extended and disposed in the diagonal direction.

This may be equally applied to the sub-pixels SP that overlap the pixel circuit part 800 from among the first pixel row ER1 and the second pixel row ER2. For example, the sub-pixels SP of the fifth to eighth pixel columns EC5, EC6, EC7, and EC8 from among the first and second pixel rows ER1 and ER2 may be connected to the pixel circuit PXC through the connection wiring RML or bridge lines RBL1, RBL2, and RBL3 that overlap the pixel circuit part 800. As described above, other sub-pixels SP adjacent to each other may be connected to the pixel circuit PXC through the connection wiring RML including the bridge lines RBL1, RBL2, and RBL3 of different layers, and the bridge lines RBL1, RBL2, RBL3 connected to the sub-pixels SP disposed relatively on the outer portion may be disposed to be deviated to one side from the center of the sub-pixel SP compared to the bridge lines RBL1, RBL2, and RBL3 connected to the sub-pixels SP disposed inside the above-mentioned sub-pixels SP.

Figure 19:
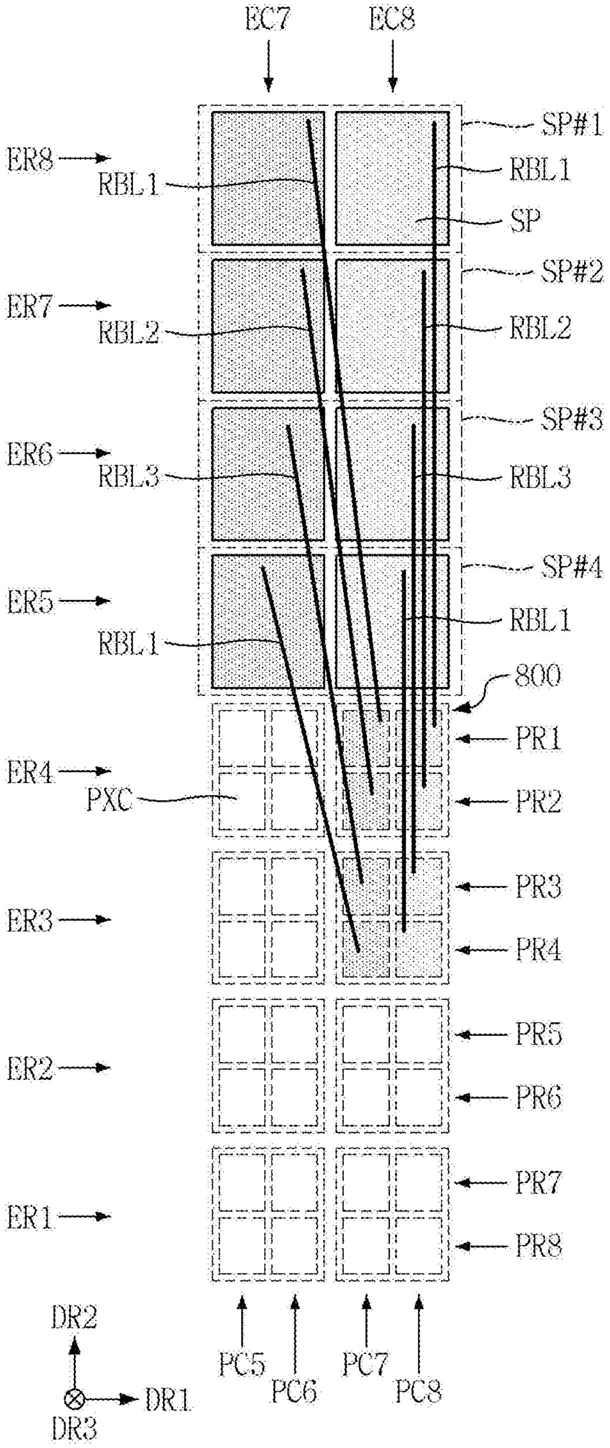
FIGS. 19 and 20 are schematic views illustrating a connection between the sub-pixels and the pixel circuits through the connection wirings in a second area of FIG. 14.
Figure 20:
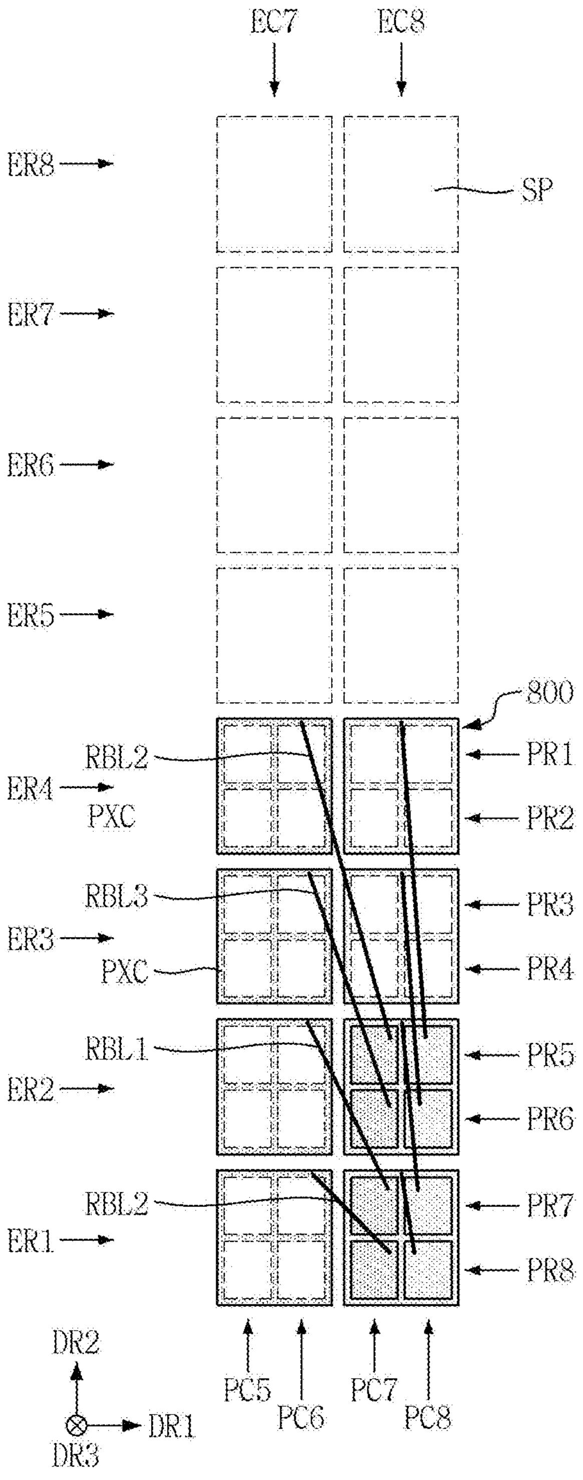

FIGS. 19 and 20 are schematic views illustrating a connection between the sub-pixels and the pixel circuits through the connection wirings in a second area of FIG. 14. FIGS. 19 and 20 illustrate an arrangement of the bridge lines RBL1, RBL2, and RBL3 of the connection wiring RML that connects the seventh pixel column EC7 and the eighth pixel column EC8 disposed along the second direction DR2 of the pixel circuit part 800 from among the sub-pixels SP disposed in the display area DAA to the pixel circuit PXC.

Referring to FIGS. 19 and 20, the sub-pixels SP sequentially disposed inside from the outermost sub-pixel SP may be respectively connected to the pixel circuits PXC sequentially disposed inside from the outermost pixel circuit PXC. For example, the sub-pixel SP disposed in the eighth pixel row ER8 of the eighth pixel column EC8 may be connected to the pixel circuit PXC of the eighth circuit column PC8 and the first circuit row PR1. Other sub-pixels SP of the eighth pixel column EC8 may be respectively connected to the pixel circuits PXC of the eighth circuit column PC8. The sub-pixel SP disposed in the eighth pixel row ER8 of the seventh pixel column EC7 may be connected to the pixel circuit PXC of the seventh circuit column PC7 and the first circuit row PR1. Other sub-pixels SP of the seventh pixel column EC7 may be respectively connected to the pixel circuits PXC of the seventh circuit column PC7.

Four sub-pixels SP that do not overlap the pixel circuit part 800 from among the sub-pixels SP disposed in the eighth pixel column EC8 may be disposed to extend so that the bridge lines RBL1, RBL2, and RBL3 of the connection lines RML deviate from the pixel circuit part 800. Among them, the outermost first sub-pixel SP #1 of the display area DAA may be connected to the pixel circuit PXC through the connection wiring including the first bridge line RBL1 of the connection line layer 500. A second sub-pixel SP #2 adjacent to the first sub-pixel SP #1 in the second direction DR2 may be connected to the pixel circuit PXC through the connection wiring including the second bridge line RBL2 of the connection line layer 500. A third sub-pixel SP #3 adjacent to the second sub-pixel SP #2 in the second direction DR2 may be connected to the pixel circuit PXC through the connection wiring including the third bridge line RBL3 of the connection line layer 500. A fourth sub-pixel SP #4 adjacent to the third sub-pixel SP #3 in the second direction DR2 may be connected to the pixel circuit PXC through the connection wiring including the first bridge line RBL1 of the connection line layer 500. The four sub-pixels SP may be respectively connected to the pixel circuit PXC through the connection wiring including the bridge lines RBL1, RBL2, and RBL3 disposed on different layers from other sub-pixels SP adjacent to each other.

In addition, the first bridge line RBL1 connected to the outermost first sub-pixel SP #1 of the display area DAA may be connected to the pixel circuit PXC of the pixel circuit part 800 via the second to fourth sub-pixels SP #2, SP #3, and SP #4. The second bridge line RBL2 connected to the second sub-pixel SP #2 is also connected to the pixel circuit PXC of the pixel circuit part 800 via the third and fourth sub-pixels SP #3 and SP #4. That is, it may be desirable to secure a space for at least four bridge lines RBL1, RBL2, and RBL3 to be disposed in the fourth sub-pixel SP #4. Considering this, the first bridge line RBL1 connected to the outermost first sub-pixel SP #1 from among the plurality of bridge lines RBL1, RBL2, and RBL3 may be disposed to be deviated from the center of the first sub-pixel SP #1 to a right side, which is one side in the first direction DR1. The second bridge line RBL2 and the third bridge line RBL3 may be sequentially disposed from the first bridge line RBL1 to a left side, which is the other side in the first direction DR1. That is, the bridge lines RBL1, RBL2, RBL3 connected to the sub-pixels SP disposed relatively on the outer portion may be disposed to be deviated to one side from the center of the sub-pixel SP compared to the bridge lines RBL1, RBL2, and RBL3 connected to the sub-pixels SP disposed inside the above-mentioned sub-pixels SP.

Accordingly, the positions of one end, which is a starting point of the bridge lines RBL1, RBL2, and RBL3, within the four sub-pixels SP of the eighth pixel column EC8 may be different from each other. For example, the position of the end of the first bridge line RBL1 in the outermost first sub-pixel SP #1 may be different from the position of the end of the second bridge line RBL2 in the second sub-pixel SP #2 adjacent to the first sub-pixel SP #1 in the second direction DR2, and the relative positions in each of the corresponding sub-pixels SP may also be different.

Four sub-pixels SP that do not overlap the pixel circuit part 800 from among the sub-pixels SP disposed in the seventh pixel column EC7 may also be disposed to extend so that the bridge lines RBL1, RBL2, and RBL3 of the connection lines RML deviate from the pixel circuit part 800. First to fourth sub-pixels SP #1, SP #2, SP #3, and SP

#4 of the seventh pixel column EC7 may also be connected to the pixel circuits PXC of the seventh circuit column PC7 through the connection wirings RML including the first bridge line RBL1, the second bridge line RBL2, the third bridge line RBL3, and the first bridge line RBL1.

The sub-pixels SP of the eighth pixel column EC8 may be connected to the eighth circuit column PC8 parallel to (e.g., aligned in) the second direction DR2. On the other hand, the sub-pixels SP of the seventh pixel column EC7 may be connected to the seventh circuit column PC7 but may not be parallel to (e.g., aligned with) each other in the second direction DR2. Accordingly, the bridge lines RBL1, RBL2, and RBL3 connected to the seventh pixel column EC7 may extend in a diagonal direction. However, as the bridge lines RBL1, RBL2, and RBL3 connected to the eighth pixel column EC8 are disposed to be biased toward the right side in the sub-pixel SP, it is possible to secure a sufficient space so that the bridge lines RBL1, RBL2, and RBL3 connected to the sub-pixel SP of the seventh pixel column EC7 are extended and disposed in the diagonal direction.

This may be equally applied to the sub-pixels SP that overlap the pixel circuit part 800 from among the eighth pixel column EC8 and the seventh pixel column EC7. For example, the sub-pixels SP of the first to fourth pixel rows ER1, ER2, ER3, and ER4 from among the eighth pixel column EC8 and the seventh pixel column EC7 may be connected to the pixel circuit PXC through the connection wiring RML or bridge lines RBL1, RBL2, and RBL3 that overlap the pixel circuit part 800.

Figure 21:
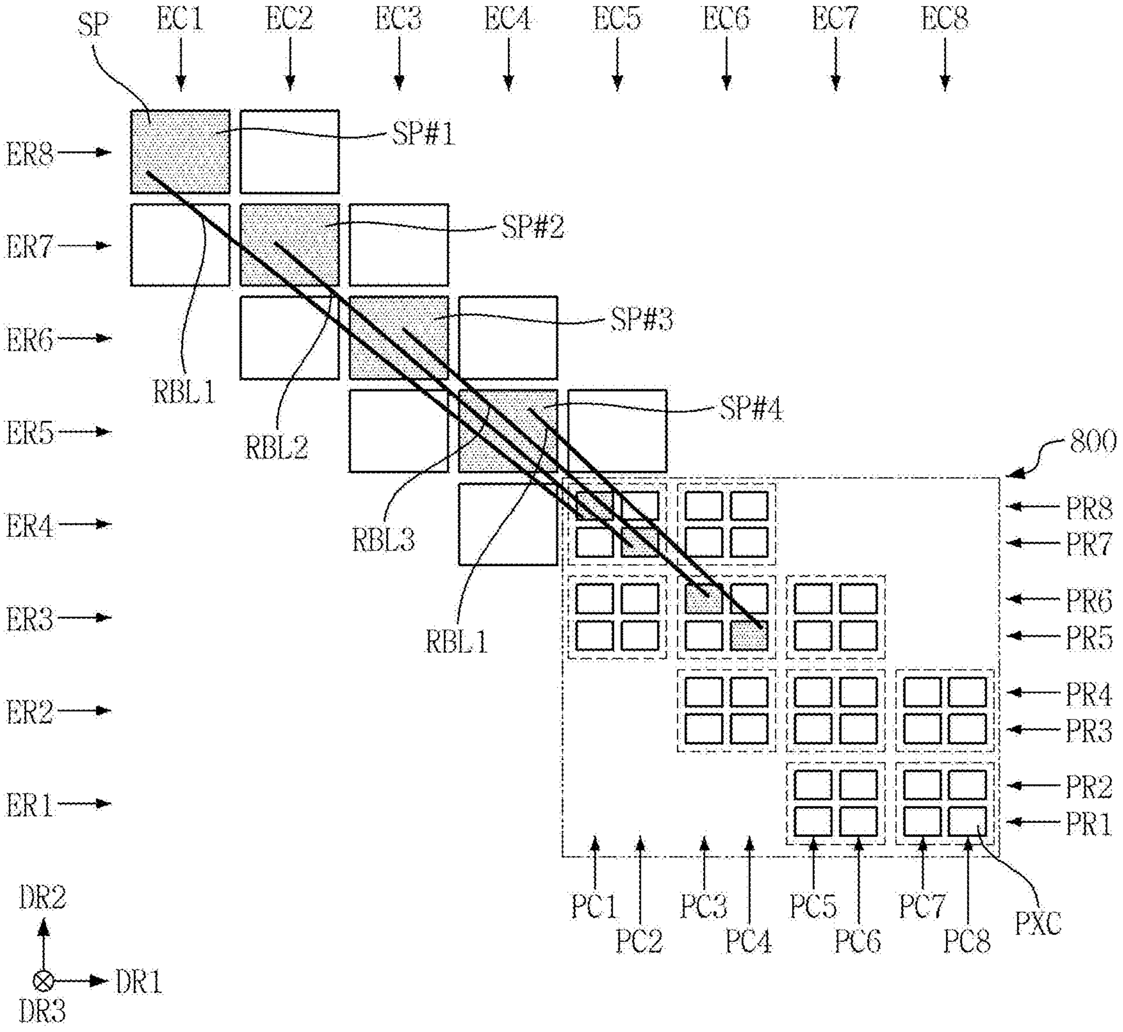
FIGS. 21-23 are schematic views illustrating a connection between the sub-pixels and the pixel circuits through the connection wirings in a third area of FIG. 14.
Figure 22:
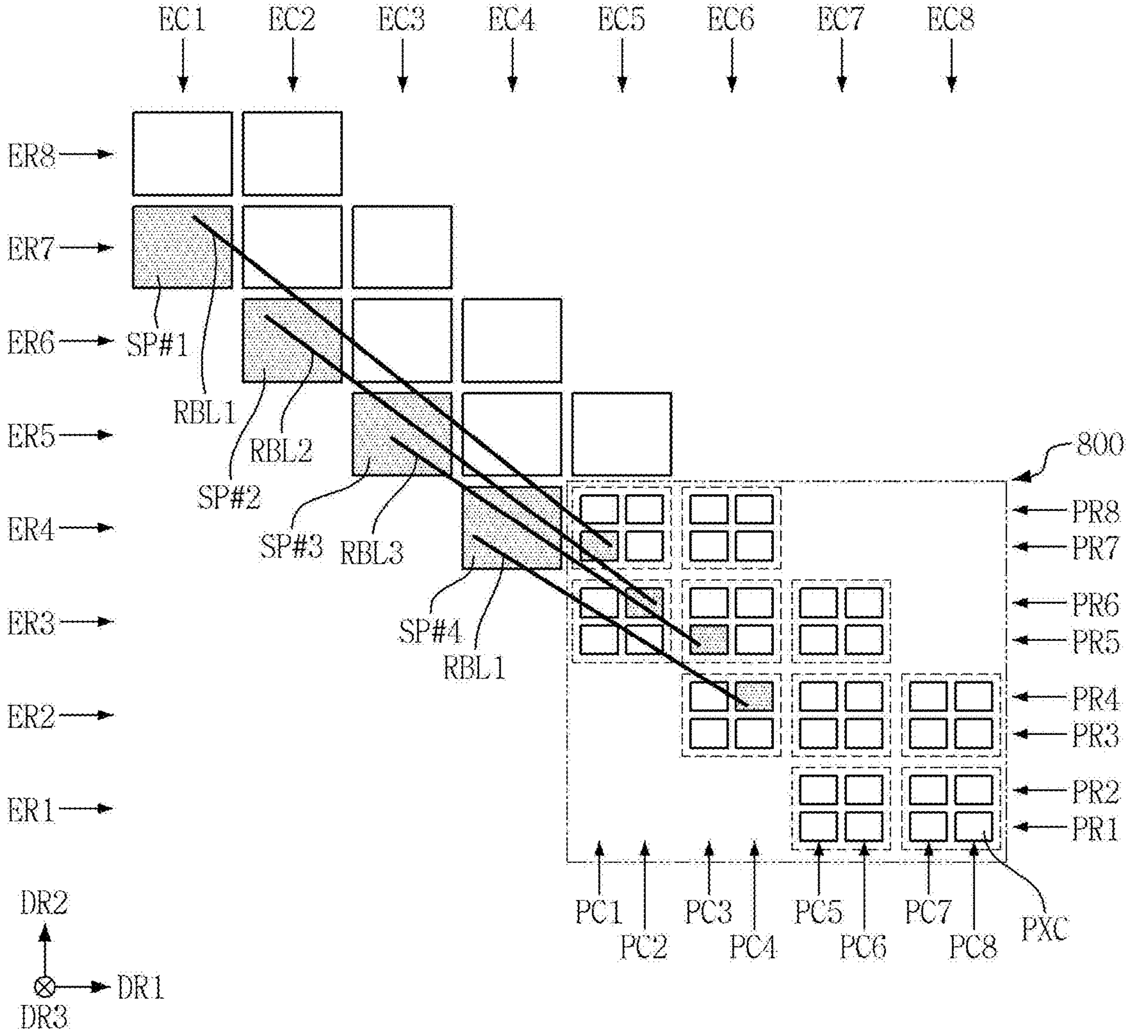
Figure 23:
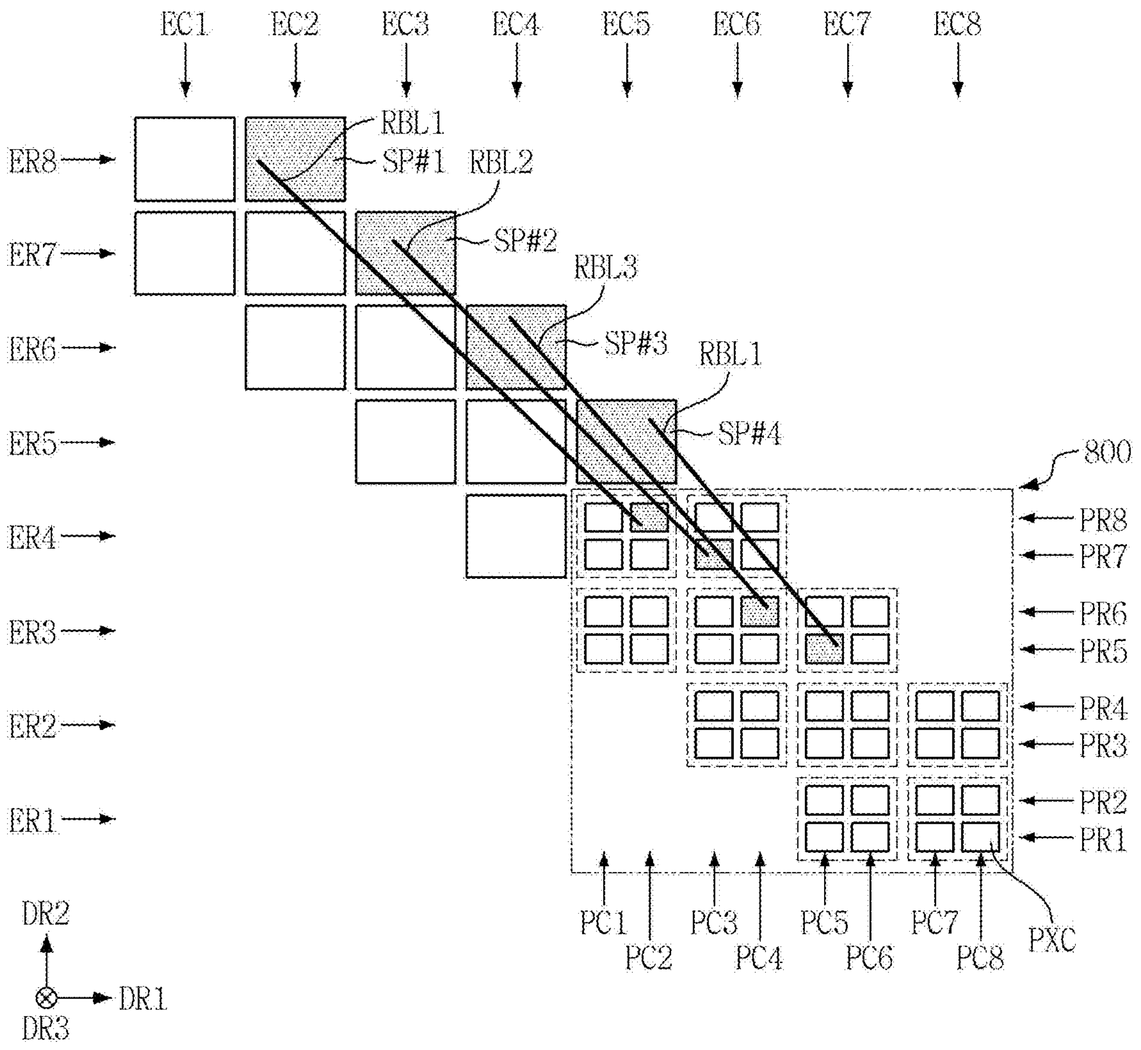

FIGS. 21-23 are schematic views illustrating a connection between the sub-pixels and the pixel circuits through the connection wirings in a third area of FIG. 14. FIGS. 21-23 illustrate arrangements of the bridge lines RBL1, RBL2, and RBL3 of the connection wiring RML that connects the sub-pixels SP disposed in a diagonal direction between the first direction DR1 and the second direction DR2 of the pixel circuit part 800 from among the sub-pixels SP disposed in the display area DAA to the pixel circuit PXC.

Referring to FIGS. 21-23, a plurality of first to fourth sub-pixels SP #1, SP #2, SP #3, and SP #4 sequentially arranged along a diagonal direction from among the plurality of sub-pixels SP in the display area DAA may be sequentially connected to the pixel circuits PXC of the pixel circuit part 800 sequentially arranged along the diagonal direction. For example, in FIG. 21, the first sub-pixel SP #1 disposed in the first pixel column EC1 and the eighth pixel row ER8 is the outermost sub-pixel in the diagonal direction, and may be connected to the pixel circuit PXC of the first circuit column PC1 and the eighth circuit row PR8 in the pixel circuit part 800. The second to fourth sub-pixels SP #2, SP #3, and SP #4 arranged along the diagonal direction from the first sub-pixel SP #1 in FIG. 21 may be respectively connected to the pixel circuits PXC arranged along the diagonal direction from the pixel circuit PXC connected to the first sub-pixel SP #1.

The first sub-pixel SP #1 of FIG. 21 may be connected to the pixel circuit PXC through the connection wiring RML including the first bridge line RBL1. The second to fourth sub-pixels SP #2, SP #3, and SP #4 of FIG. 21 may be connected to the pixel circuit PXC through the connection wiring RML including the second bridge line RBL2, the third bridge line RBL3, and the first bridge line RBL1, respectively. As described above, in the fourth sub-pixel SP #4 of FIG. 21, it may be desirable to secure a space in which the four bridge lines RBL1, RBL2, and RBL3 may be disposed, and the first bridge line RBL1 connected to the first sub-pixel SP #1 may be disposed to be biased from the center of the sub-pixel to one side, for example, to the lower left side in the diagonal direction. Other bridge lines connected to the second to fourth sub-pixels SP #2, SP #3, and SP #4 may be sequentially disposed on an upper right side from the first bridge line RBL1 connected to the first sub-pixel SP #1.

The first to fourth sub-pixels SP #1, SP #2, SP #3, and SP #4 of FIG. 22 may be sub-pixels adjacent to the first to fourth sub-pixels SP #1, SP #2, SP #3, and SP #4 of FIG. 21 in the second direction DR2, respectively. In addition, the pixel circuits PXC connected to the first to fourth sub-pixels SP #1, SP #2, SP #3, and SP #4 of FIG. 22 may also be pixel circuits adjacent to the pixel circuits PXC connected to the first to fourth sub-pixels SP #1, SP #2, SP #3, and SP #4 of FIG. 21 in the second direction DR2.

The first sub-pixel (SP #1), which is the outermost sub-pixel from among the first to fourth sub-pixels SP #1, SP #2, SP #3, and SP #4 of FIG. 22 may be connected to the pixel circuit PXC through the connection wiring RML including the first bridge line RBL1. The second to fourth sub-pixels SP #2, SP #3, and SP #4 of FIG. 22 may be connected to the pixel circuit PXC through the connection wiring RML including the second bridge line RBL2, the third bridge line RBL3, and the first bridge line RBL1, respectively. As described above, in the fourth sub-pixel SP #4 of FIG. 22, it may be desirable to secure a space in which the four bridge lines RBL1, RBL2, and RBL3 may be disposed. On the other hand, unlike the arrangement of the bridge lines RBL1, RBL2, and RBL3 of FIG. 21, the first bridge line RBL1 connected to the first sub-pixel SP #1 may be disposed to be biased from the center of the sub-pixel to one side, for example, the upper right side in the diagonal direction. Other bridge lines connected to the second to fourth sub-pixels SP #2, SP #3, and SP #4 may be sequentially disposed on a left lower side from the first bridge line RBL1 connected to the first sub-pixel SP #1.

The first to fourth sub-pixels SP #1, SP #2, SP #3, and SP #4 of FIG. 23 may be sub-pixels adjacent to the first to fourth sub-pixels SP #1, SP #2, SP #3, and SP #4 of FIG. 21 in the first direction DR1, respectively. In addition, the pixel circuits PXC connected to the first to fourth sub-pixels SP #1, SP #2, SP #3, and SP #4 of FIG. 23 may also be pixel circuits adjacent to the pixel circuits PXC connected to the first to fourth sub-pixels SP #1, SP #2, SP #3, and SP #4 of FIG. 21 in the first direction DR1.

The first sub-pixel (SP #1), which is the outermost sub-pixel from among the first to fourth sub-pixels SP #1, SP #2, SP #3, and SP #4 of FIG. 23 may be connected to the pixel circuit PXC through the connection wiring RML including the first bridge line RBL1. The second to fourth sub-pixels SP #2, SP #3, and SP #4 of FIG. 23 may be connected to the pixel circuit PXC through the connection wiring RML including the second bridge line RBL2, the third bridge line RBL3, and the first bridge line RBL1, respectively. As described above, in the fourth sub-pixel SP #4 of FIG. 23, it may be desirable to secure a space in which the four bridge lines RBL1, RBL2, and RBL3 may be disposed. Similarly to the arrangement of the bridge lines RBL1, RBL2, and RBL3 of FIG. 21, the first bridge line RBL1 connected to the first sub-pixel SP #1 may be disposed to be biased from the center of the sub-pixel to one side, for example, the lower left side in the diagonal direction. Other bridge lines connected to the second to fourth sub-pixels SP #2, SP #3, and SP #4 may be sequentially disposed on an upper right side from the first bridge line RBL1 connected to the first sub-pixel SP #1.

The first bridge line RBL1 connected to the first sub-pixel SP #1 of FIG. 22 may be disposed so as not to interfere with the first bridge line RBL1 connected to the first sub-pixel SP #1 of FIG. 21. In addition, the first bridge line RBL1 connected to the first sub-pixel SP #1 of FIG. 23 may be disposed so as not to interfere with the first bridge line RBL1 connected to the fourth sub-pixel SP #4 of FIG. 21. As described above with reference to FIGS. 17-20, as the bridge lines RBL1, RBL2, and RBL3 disposed in two areas (first area and second area) parallel to each other in the first direction DR1 or the second direction DR2 from the pixel circuit part 800 are disposed to be biased from the center of the sub-pixel SP to one side, a sufficient space in which the bridge lines RBL1, RBL2, and RBL3 disposed in an area (third area) parallel in the diagonal direction from the pixel circuit part 800 may be disposed may be secured. In addition, when two bridge lines RBL1, RBL2, and RBL3 adjacent to each other do not have enough space to separate each other or interfere with each other, the bridge lines RBL1, RBL2, and RBL3 adjacent to each other may be disposed on different conductive layers.

Figure 24:
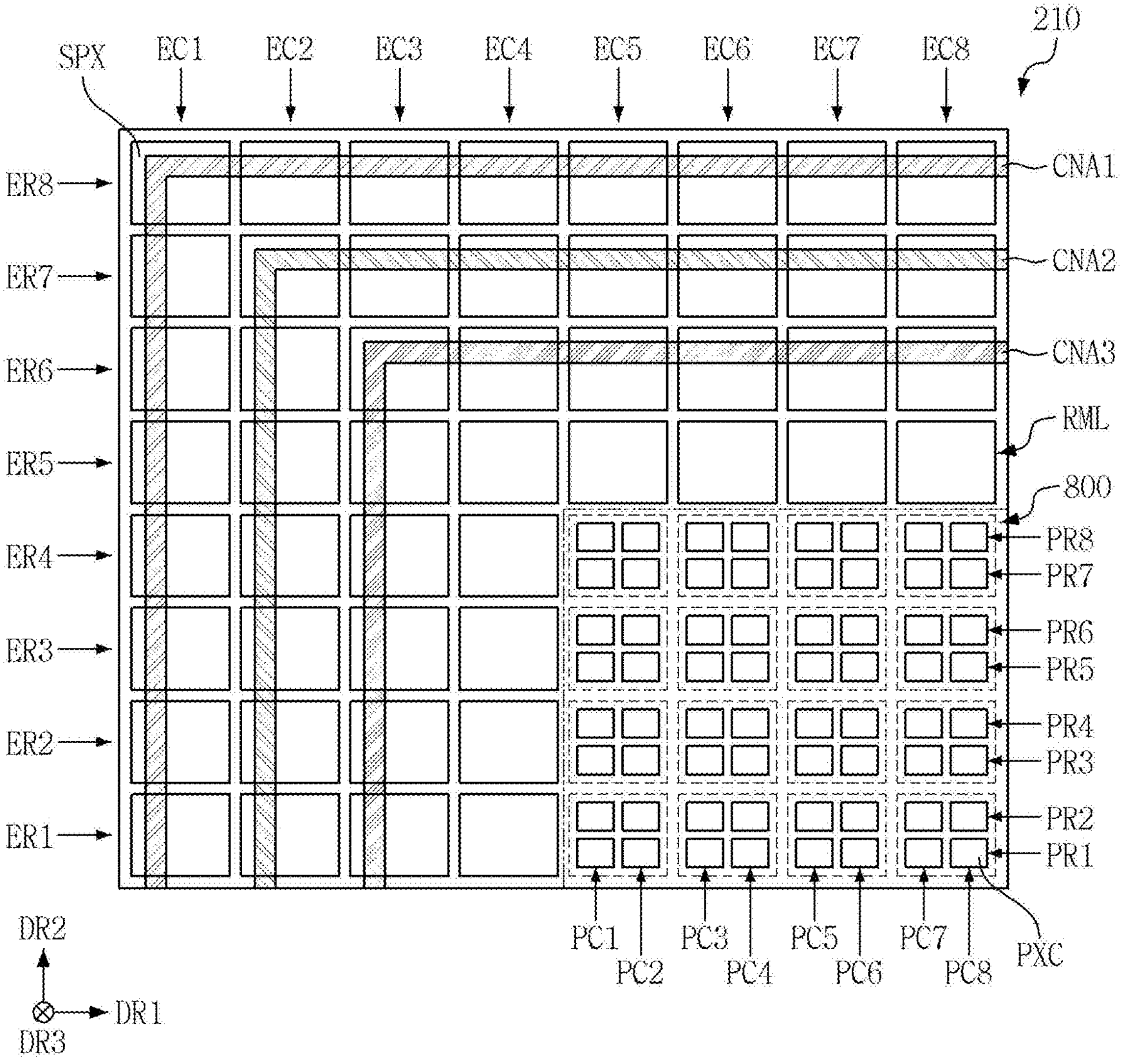
FIG. 24 is a schematic view schematically illustrating an arrangement of vias through which the sub-pixels and the connection wirings of a display device according to one or more embodiments are connected.

FIG. 24 is a schematic view schematically illustrating an arrangement of vias through which the sub-pixels and the connection wirings of a display device according to one or more embodiments are connected. FIG. 24 illustrates an area where vias through which the bridge lines RBL1, RBL2, and RBL3 of the connection wirings RML are connected to the sub-pixels SP, or one end of the bridge lines RBL1, RBL2, and RBL3 are positioned.

Referring to FIG. 24, the outermost sub-pixels SP of the display area DAA may be sub-pixels disposed in the first pixel column EC1 and the eighth pixel row ER8. The sub-pixels disposed in the first pixel column EC1 and the eighth pixel row ER8 may be connected to the pixel circuit PXC through the connection wirings RML including the first bridge line RBL1. Vias connected to the first bridge line RBL1, for example, a via between the first bridge line RBL1 and the second bridge contact RCT2 in FIG. 15 or the conductive via RVA disposed in the first through hole TSV1 may overlap the first pixel column EC1 and the eighth pixel row ER8. A first contact area CNA1 of FIG. 24 may be an area where bridge contacts, or vias or conductive vias RVA connected to the first bridge line RBL1 are disposed.

The sub-pixels disposed in the second pixel column EC2 and the seventh pixel row ER7 may be connected to the pixel circuit PXC through the connection wirings RML including the second bridge line RBL2. Vias connected to the second bridge line RBL2, for example, a via between the second bridge line RBL2 and the third bridge contact RCT3 in FIG. 15 or the conductive via RVA disposed in the first through hole TSV1 may overlap the second pixel column EC2 and the seventh pixel row ER7. A second contact area CNA2 of FIG. 24 may be an area where bridge contacts or vias connected to the second bridge line RBL2 are disposed.

The sub-pixels disposed in the third pixel column EC3 and the sixth pixel row ER6 may be connected to the pixel circuit PXC through the connection wirings RML including the third bridge line RBL3. Vias connected to the third bridge line RBL3, for example, the conductive via RVA connected to the third bridge line RBL3 of FIG. 15 may overlap the third pixel column EC3 and the sixth pixel row ER6. A third contact area CNA3 of FIG. 24 may be an area where the conductive vias connected to the third bridge line RBL3 are disposed.

As one end of the bridge lines RBL1, RBL2, and RBL3 disposed on (e.g., at) the same conductive layer, one end connected to the sub-pixel SP may be disposed in the same pixel row or pixel column. For example, one end of the first bridge lines RBL1 may be disposed in the first pixel column EC1 and the eighth pixel row ER8. In one or more embodiments, as opposite ends of the bridge lines RBL1, RBL2, and RBL3, the ends connected to the pixel circuit PXC of the pixel circuit part 800 may also be disposed in the same circuit row or circuit column. For example, the other ends of the first bridge lines RBL1 may be disposed in the first pixel column EC1 and the eighth pixel row ER8. Although FIGS. 17-24 illustrate only the arrangement of the connection wirings RML connected to the sub-pixels disposed on the upper left side of the pixel circuit part 800, the connection wirings RML connected to the sub-pixels SP disposed on the lower left side, upper right side, and lower right side of the pixel circuit part 800 may be disposed in a similar rule.

As the display device 10 includes the plurality of bridge lines RBL1, RBL2, and RBL3 disposed on (e.g., at) different conductive layers in the connection line layer 500, and the plurality of bridge lines RBL1, RBL2, and RBL3 are disposed in the above described rule, the plurality of connection wirings RML disposed in a narrow area may have an arrangement that does not electrically interfere with each other.

As illustrated in FIGS. 17-20, the bridge lines RBL1, RBL2, and RBL3 connected to the sub-pixel SP overlapping the pixel circuit part 800 from among the plurality of bridge lines RBL1, RBL2, and RBL3 may be shorter than the bridge lines RBL1, RBL2, and RBL3 connected to the sub-pixel SP that does not overlap the pixel circuit part 800. In this case, depending on the positions of the sub-pixels SP, the length and conductor resistance of the connection wirings RML connected to the pixel circuit part 800 may vary, and signal deviation may occur between the sub-pixels SP. Considering this, the bridge lines RBL1, RBL2, and RBL3 connected to the sub-pixel SP overlapping the pixel circuit part 800 may have different wiring routing from the bridge lines RBL1, RBL2, and RBL3 connected to the sub-pixel SP that does not overlap the pixel circuit part 800.

Figure 25:
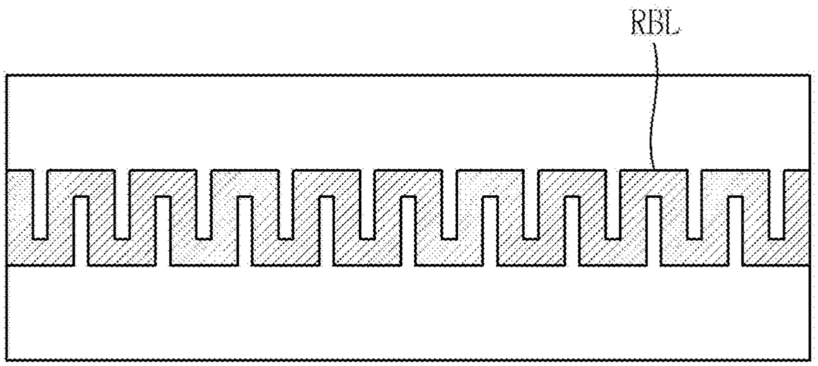
FIG. 25 is a view illustrating an example of a shape of a bridge line according to one or more embodiments.

FIG. 25 is a view illustrating an example of a shape of a bridge line according to one or more embodiments. FIG. 25 illustrates an example of the bridge lines RBL connected to the sub-pixel SP overlapping the pixel circuit part 800.

Referring to FIG. 25, the plurality of bridge lines RBL may generally have a linear shape as described above, but the bridge lines RBL connected to the sub-pixel SP overlapping the pixel circuit part 800 may have a partially bent shape to extend a wiring length. Because the sub-pixels SP overlapping the pixel circuit part 800 have a short planar distance from the pixel circuit PXC, a sufficient space in which the bridge lines RBL connecting the sub-pixels SP may be partially bent may be secured. Accordingly, the bridge lines RBL connected to the sub-pixel SP overlapping the pixel circuit part 800, or the bridge lines RBL completely overlapping the pixel circuit part 800 may have a zigzag shape so that the wiring length may be extended compared to the plane distance. Accordingly, wiring resistance of the wiring to which the signal is applied from the driving part 100 may be designed to be uniform, regardless of the positions of the sub-pixels SP.

Figure 26:
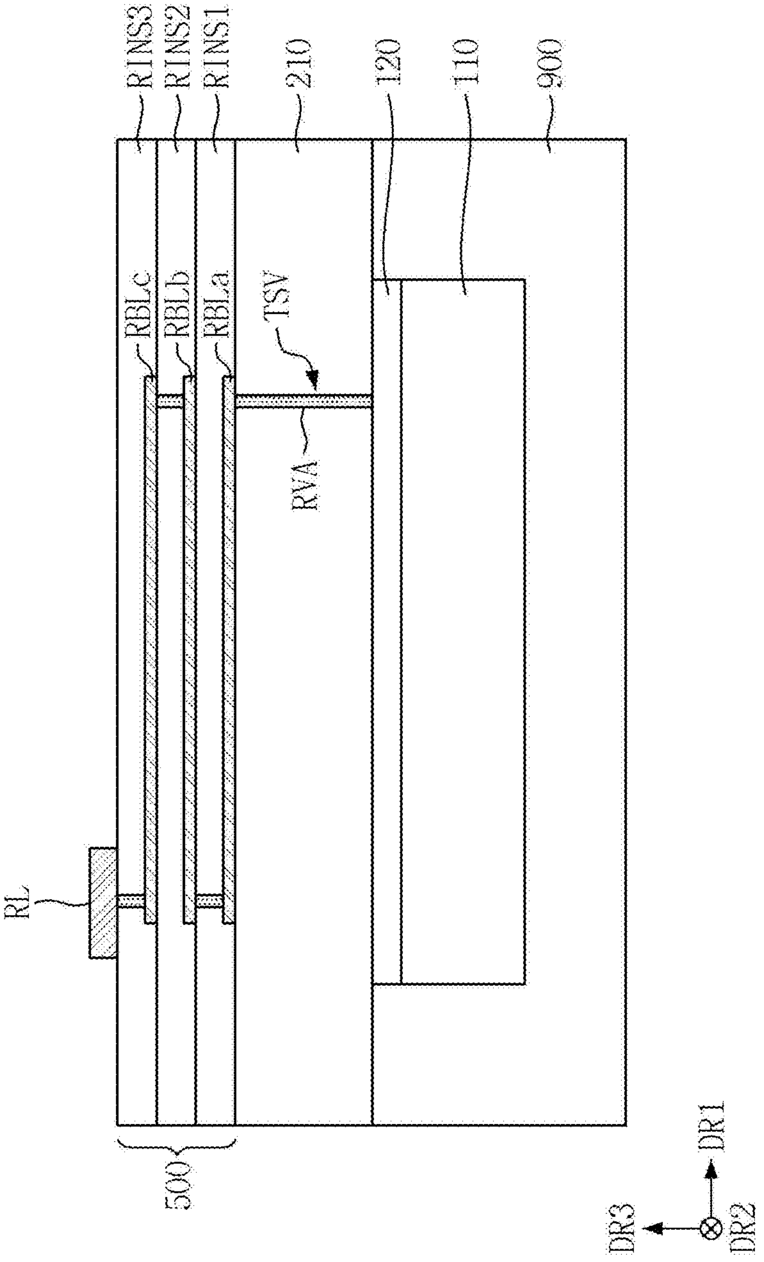
FIG. 26 is a view illustrating an example of a cross-sectional connection structure of a connection wiring according to one or more embodiments.

FIG. 26 is a view illustrating an example of a cross-sectional connection structure of a connection wiring according to one or more embodiments. FIG. 26 illustrates an example of bridge lines RBLa, RBLb, and RBLc connected to the sub-pixel SP overlapping the pixel circuit part 800.

Referring to FIG. 26, the plurality of connection wirings RML may include one bridge line RBL and two bridge contacts RCT as described above, but the bridge lines RBL connected to the sub-pixel SP overlapping the pixel circuit part 800 may include a plurality of bridge lines RBLa, RBLb, and RBLc to extend the wiring length. Because the sub-pixels SP overlapping the pixel circuit part 800 have a short planar distance from the pixel circuit PXC, a sufficient space in which the connection wirings connecting the sub-pixels SP are connected through the plurality of bridge lines RBLa, RBLb, and RBLc disposed on (e.g., at) different conductive layers may be secured. The bridge lines RBL connected to the sub-pixel SP overlapping the pixel circuit part 800, or the bridge lines RBL completely overlapping the pixel circuit part 800 may have an extended wiring length compared to the plane distance. For example, one connection wiring RML may include a first bridge line RBLa of the first conductive layer, a second bridge line RBLb of the second conductive layer, and a third bridge line RBLc of the third conductive layer. Accordingly, wiring resistance of the wiring to which the signal is applied from the driving part 100 may be designed to be uniform, regardless of the positions of the sub-pixels SP.

Hereinafter, various embodiments of the display device 10 will be described with reference to other drawings.

Figure 27:
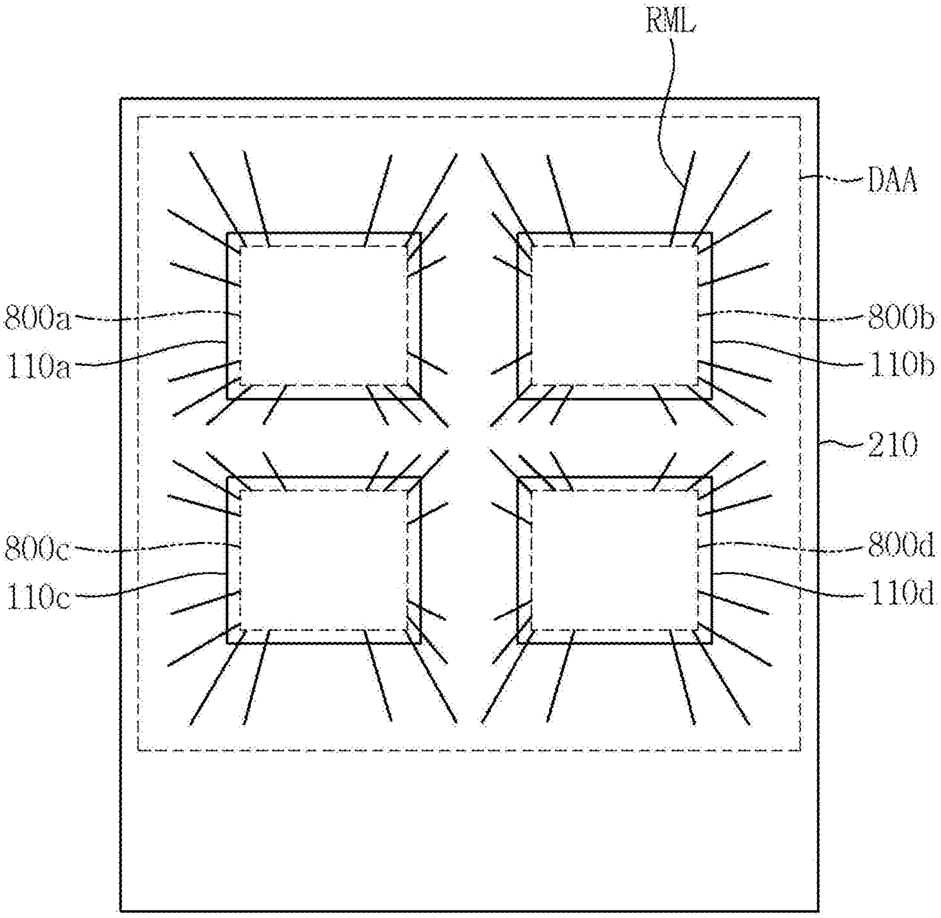
FIG. 27 is a view illustrating a schematic arrangement of connection wirings connecting a pixel circuit part of a display device and sub-pixels of a display area, according to one or more embodiments.

FIG. 27 is a view illustrating a schematic arrangement of connection wirings connecting a pixel circuit part of the display device and the sub-pixels of the display area, according to one or more embodiments.

Referring to FIG. 27, in the display device 10, the driving part 100 having a small area may include a plurality of first single crystal semiconductor substrates 110*a*, 110*b*, 110*c*, and 110*d*, and a plurality of pixel circuit parts 800*a*, 800*b*, 800*c*, and 800*d* disposed in each of the plurality of first single crystal semiconductor substrates 110*a*, 110*b*, 110*c*, and 110*d* may be connected to the sub-pixels SP of the display area DAA. When one pixel circuit part 800 is connected to the sub-pixels SP disposed in the display area DAA having a large area, there may not be enough space for the connection wirings RML to be disposed. On the other hand, when the driving part 100 is made of the plurality of first single crystal semiconductor substrates 110*a*, 110*b*, 110*c*, and 110*d* and includes the plurality of pixel circuit parts 800*a*, 800*b*, 800*c*, and 800*d*, it may be desirable to secure a space in which the connection wirings RML are disposed because the plurality of pixel circuit parts 800*a*, 800*b*, 800*c*, and 800*d* partially cover the sub-pixels SP of the display area DAA.

Figure 28:
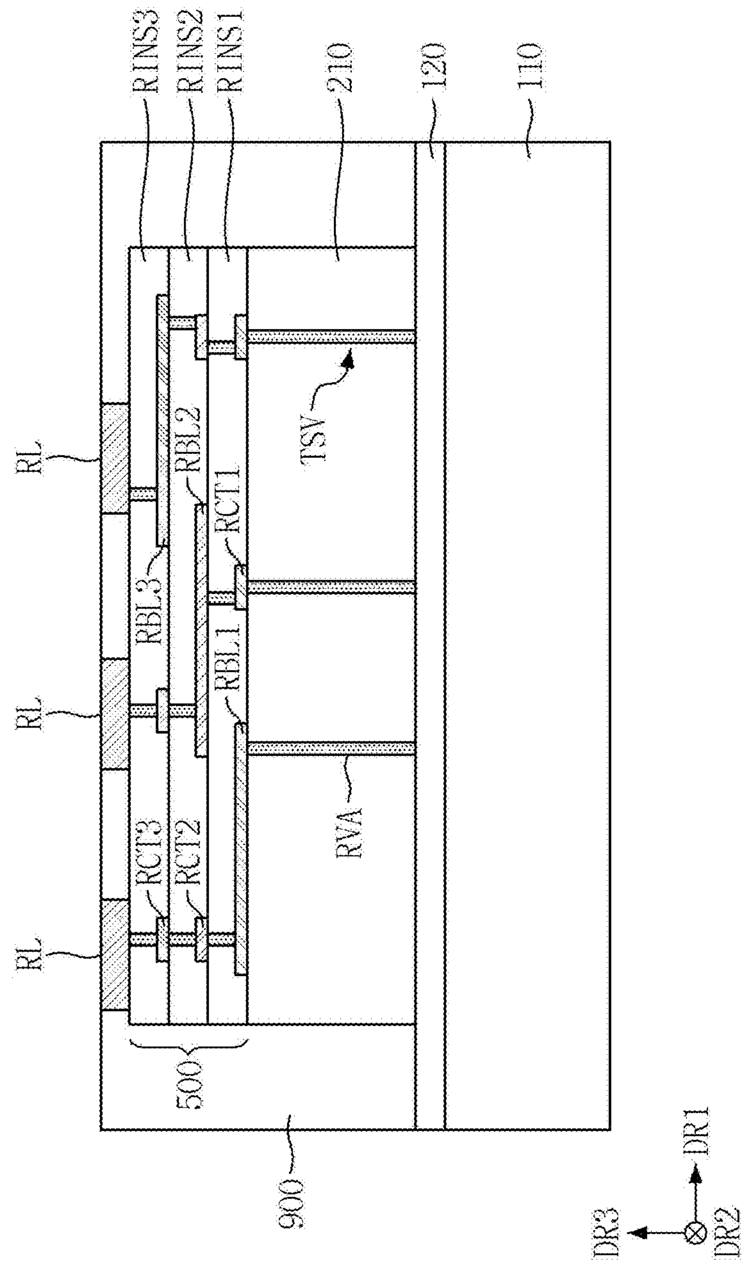
FIG. 28 is a schematic cross-sectional view illustrating an example of a connection line layer of a display device according to one or more embodiments.

FIG. 28 is a schematic cross-sectional view illustrating an example of a connection line layer of the display device according to one or more embodiments.

Referring to FIG. 28, in the display device 10, the first single crystal semiconductor substrate 110 of the driving part 100 may have a larger area than the second single crystal semiconductor substrate 210 of the display part 200. Accordingly, the protective layer 900 may be around (e.g., may surround) the second single crystal semiconductor substrate 210.

Figure 29:
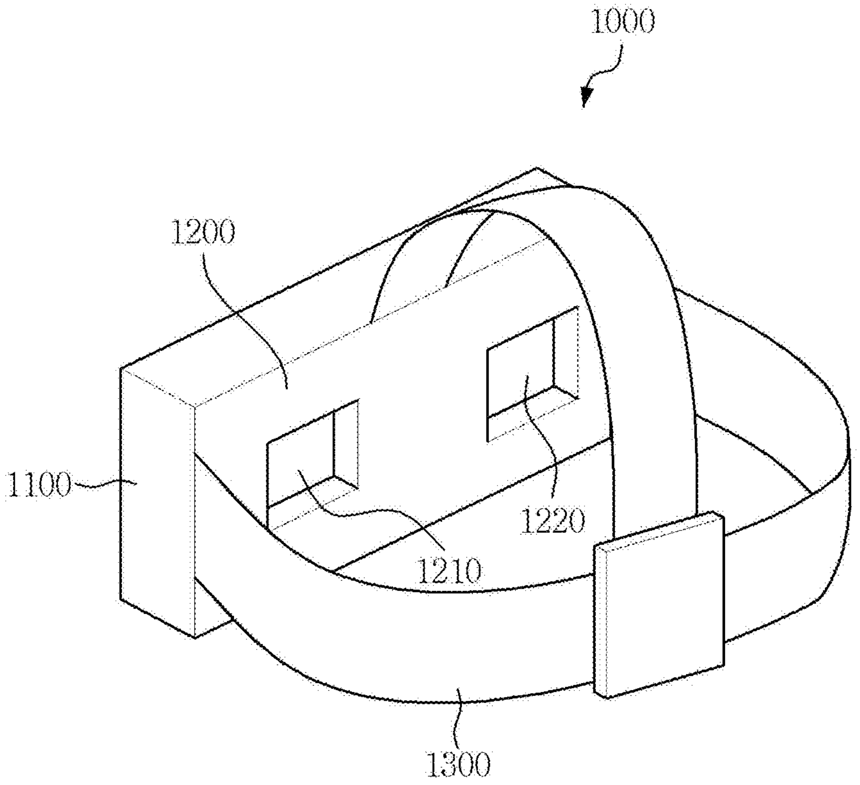
FIG. 29 is a perspective view illustrating a head mounted display device according to one or more embodiments.
Figure 30:
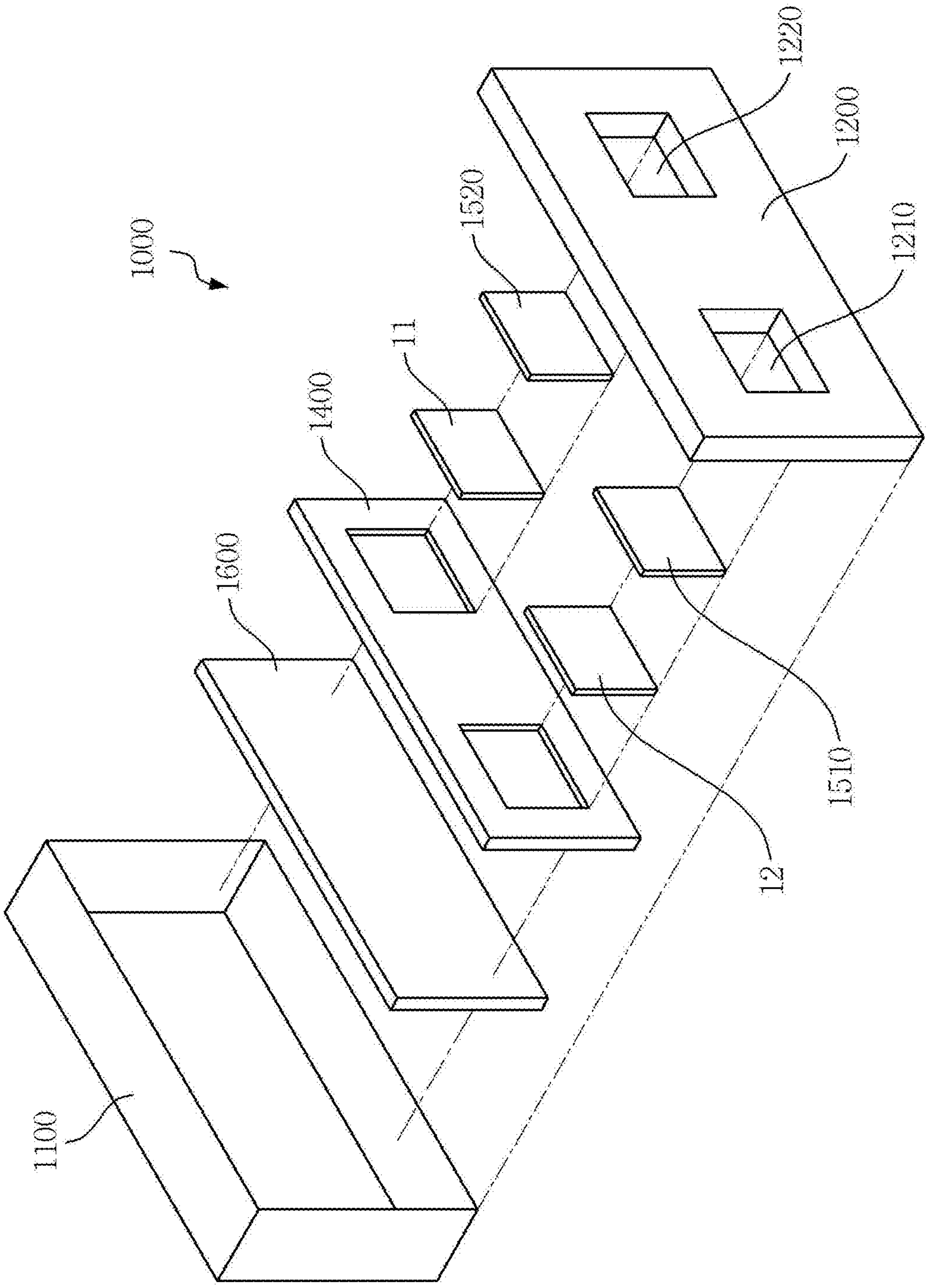
FIG. 30 is an exploded perspective view illustrating an example of the head mounted display device of FIG. 29.

FIG. 29 is a perspective view illustrating a head mounted display device according to one or more embodiments. FIG. 30 is an exploded perspective view illustrating an example of the head mounted display device of FIG. 29.

Referring to FIGS. 29 and 30, a head mounted display device 1000 according to one or more embodiments includes a first display device 11, a second display device 12, a display device accommodating portion 1100, an accommodating portion cover 1200, a first eyepiece 1210, a second eyepiece 1220, a head mounting band 1300, a middle frame 1400, a first optical member 1510, a second optical member 1520, a control circuit board 1600, and a connector.

The first display device 11 provides an image to a user's left eye, and the second display device 12 provides an image to a user's right eye. Because each of the first display device 11 and the second display device 12 is substantially the same as the display device 10 described with reference to FIG. 1, the descriptions of the first display device 11 and the second display device 12 will be omitted.

The first optical member 1510 may be disposed between the first display device 11 and the first eyepiece 1210. The second optical member 1520 may be disposed between the second display device 12 and the second eyepiece 1220. Each of the first optical member 1510 and the second optical member 1520 may include at least one convex lens.

The middle frame 1400 may be disposed between the first display device 11 and the control circuit board 1600 and may be disposed between the second display device 12 and the control circuit board 1600. The middle frame 1400 serves to support and fix the first display device 11, the second display device 12, and the control circuit board 1600.

The control circuit board 1600 may be disposed between the middle frame 1400 and the display device accommodating portion 1100. The control circuit board 1600 may be connected to the first display device 11 and the second display device 12 through the connector. The control circuit board 1600 may convert an image source input from the outside into digital video data DATA, and may transmit the digital video data DATA to the first display device 11 and the second display device 12 through the connector.

The control circuit board 1600 may transmit digital video data DATA corresponding to a left eye image optimized for the user's left eye to the first display device 11, and may transmit digital video data DATA corresponding to a right eye image optimized for the user's right eye to the second display device 12. Alternatively, the control circuit board 1600 may transmit the same digital video data DATA to the first display device 11 and the second display device 12.

The display device accommodating portion 1100 serves to accommodate the first display device 11, the second display device 12, the middle frame 1400, the first optical member 1510, the second optical member 1520, the control circuit board 1600, and the connector. The accommodating portion cover 1200 is disposed to cover one opened surface of the display device accommodating portion 1100. The accommodating portion cover 1200 may include a first eyepiece 1210 where the user's left eye is disposed and a second eyepiece 1220 where the user's right eye is disposed. It is illustrated in the drawing that the first eyepiece 1210 and the second eyepiece 1220 are separately disposed, but the present disclosure is not limited thereto. The first eyepiece 1210 and the second eyepiece 1220 may be integrated into one.

The first eyepiece 1210 may be aligned with the first display device 11 and the first optical member 1510, and the second eyepiece 1220 may be aligned with the second display device 12 and the second optical member 1520. Therefore, the user may view an image of the first display device 11 magnified as a virtual image by the first optical member 1510 through the first eyepiece 1210, and may view an image of the second display device 12 magnified as a virtual image by the second optical member 1520 through the second eyepiece 1220.

The head mounting band 1300 serves to fix the display device accommodating portion 1100 to a user's head so that the first eyepiece 1210 and the second eyepiece 1220 of the accommodating portion cover 1200 are disposed on the user's left and right eyes, respectively. When the display device accommodating portion 1100 is implemented in a lightweight and small size, the head mounted display device 1000 may include eyeglass frames instead of the head mounting band 1300.

In addition, the head mounted display device 1000 may further include a battery for supplying power, an external memory slot for accommodating an external memory, and an external connection port and a wireless communication module for receiving an image source. The external connection port may be a universe serial bus (USB) terminal, a display port, or a high-definition multimedia interface (HDMI) terminal, and the wireless communication module may be a 5G communication module, a 4G communication module, a Wi-Fi module, or a Bluetooth module.

Figure 31:
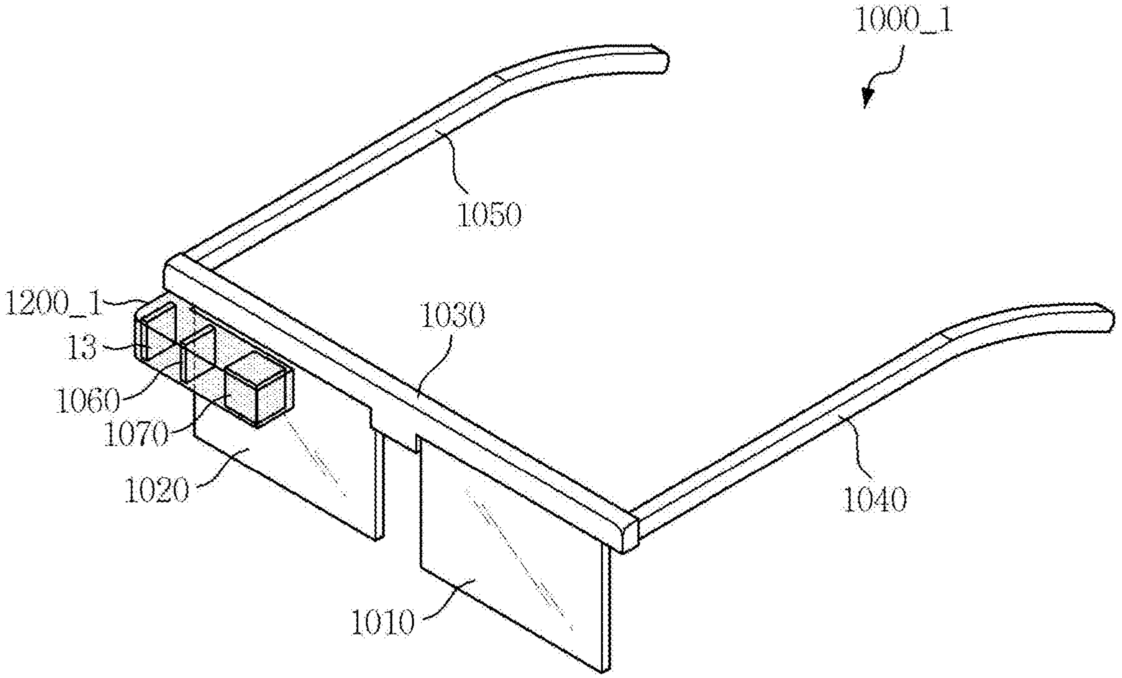
FIG. 31 is a perspective view illustrating a head mounted display device according to one or more embodiments.

FIG. 31 is a perspective view illustrating a head mounted display device according to one or more embodiments.

Referring to FIG. 31, a head mounted display device 1000_1 according to one or more embodiments may be a glasses-type display device in which a display device accommodating portion 1200_1 is implemented in a lightweight and small size. The head mounted display device 1000_1 according to one or more embodiments may include a display device 13, a left eye lens 1010, a right eye lens 1020, a support frame 1030, eyeglass frame legs 1040 and 1050, an optical member 1060, a light path conversion member 1070, and a display device accommodating portion 1200_1.

The display device accommodating portion 1200_1 may include the display device 13, the optical member 1060, and the light path conversion member 1070. As an image displayed on the display device 13 is magnified by the optical member 1060 and a light path thereof is converted by the light path conversion member 1070, the image may be provided to the user's right eye through the right eye lens 1020. Accordingly, the user may view an augmented reality image in which a virtual image displayed on the display device 13 and a real image viewed through the right eye lens 1020 are combined through the right eye.

It is illustrated in the drawing that the display device accommodating portion 1200_1 is disposed at a right distal end of the support frame 1030, but the present disclosure is not limited thereto. For example, the display device accommodating portion 1200_1 may be disposed at a left distal end of the support frame 1030, and in this case, the image of the display device 13 may be provided to the user's left eye. Alternatively, the display device accommodating portions 1200_1 may be disposed at both the left and right distal ends of the support frame 1030. In this case, the user may view the image displayed on the display device 13 through both the user's left and right eyes.

It should be understood, however, that the aspects and features of embodiments of the present disclosure are not restricted to the one set forth herein. The above and other aspects of the present disclosure will become more apparent to one of ordinary skill in the art to which the present disclosure pertains by referencing the claims, with equivalents thereof to be included therein.

What is claimed is:

1. A display device comprising a first single crystal semiconductor substrate on which a plurality of pixel circuits arranged along a first direction and a second direction intersecting the first direction is located, the plurality of pixel circuits comprising a first transistor;

a second single crystal semiconductor substrate on the first single crystal semiconductor substrate, the second single crystal semiconductor substrate on which a plurality of sub-pixels comprising a plurality of light emitting elements and arranged along the first direction and the second direction is located; and a connection line layer between the plurality of light emitting elements and the first single crystal semiconductor substrate and comprising a plurality of bridge lines, each of the plurality of bridge lines electrically connected to one of the plurality of pixel circuits and one of the plurality of sub-pixels, wherein the second single crystal semiconductor substrate includes a plurality of through holes in which a corresponding ones of conductive vias electrically connected to corresponding ones of the plurality of light emitting elements of each of the plurality of sub-pixels and corresponding ones of the plurality of bridge lines is located, wherein the connection line layer comprises a first conductive layer at which a first bridge line is located, a second conductive layer at which a second bridge line is located, and an interlayer insulating layer between the first conductive layer and the second conductive layer, wherein at least some of the plurality of sub-pixels are electrically connected to the first bridge line, and other ones of the plurality of sub-pixels adjacent to the sub-pixels connected to the first bridge line are electrically connected to the second bridge line, wherein a first sub-pixel of the plurality of sub-pixels is connected to the first bridge line, the first bridge line being entirely spaced from a center of the first sub-pixel in the second direction on a plane parallel to the first single crystal semiconductor substrate, wherein the first sub-pixel, a second sub-pixel, a third sub-pixel and a fourth sub-pixel of the plurality of sub-pixels are arranged in the first direction, wherein a first pixel circuit, a second pixel circuit, a third pixel circuit and a fourth pixel circuit of the plurality of pixel circuits are arranged in the first direction, wherein a corresponding area of the first sub-pixel, the second sub-pixel, the third sub-pixel and the fourth sub-pixel each approximates an area corresponding to four pixel circuits, wherein the first sub-pixel, the second sub-pixel, the third sub-pixel and the fourth sub-pixel do not overlap the first pixel circuit, the second pixel circuit, the third pixel circuit and the fourth pixel circuit in a plan view, wherein a second first sub-pixel, a second second sub-pixel, a second third sub-pixel and a second fourth sub-pixel overlap a second first pixel circuit, a second second pixel circuit, a second third pixel circuit and a second fourth pixel circuit in the first direction in the plan view, wherein the fourth sub-pixel is adjacent to the second first sub-pixel, the second first sub-pixel is adjacent to the second second sub-pixel, the second second sub-pixel is adjacent to the second third sub-pixel and the second third sub-pixel is adjacent to the second fourth sub-pixel in the first direction, wherein the first sub-pixel is connected to the first pixel circuit via the first bridge line, and the second sub-pixel is connected to the second pixel circuit via the second bridge line, and the third sub-pixel is connected to the third pixel circuit via a third bridge line of the plurality of bridge lines, and the fourth sub-pixel is connected to the fourth pixel circuit via a fourth bridge line of the plurality of bridge lines, wherein the first bridge line, the second bridge line, the third bridge line and the fourth bridge line each extend in the first direction, wherein a first distance between the first bridge line and the center of the first sub-pixel is greater than a second distance between the second bridge line and a center of the second sub-pixel, wherein the second distance is greater than a third distance between the third bridge line and a center of the third sub-pixel, and wherein the third distance is greater than a fourth distance between the fourth bridge line and a center of the fourth sub-pixel.

2. The display device of claim 1, wherein outermost sub-pixels in the first direction and outermost sub-pixels in the second direction from among the plurality of sub-pixels are electrically connected to different first bridge lines.

3. The display device of claim 2, wherein sub-pixels adjacent to inside of the outermost sub-pixels in the first and second directions from among the plurality of sub-pixels are electrically connected to different second bridge lines.

4. The display device of claim 1, wherein a sub-pixel from among the plurality of sub-pixels of a first pixel row located at one side in the first direction is electrically connected to a pixel circuit from among the plurality of pixel circuits that is aligned in the first direction with the sub-pixel of the first pixel row, and a sub-pixel from among the plurality of sub-pixels of a second pixel row adjacent to one side of the first pixel row in the second direction is electrically connected to a pixel circuit from among the plurality of pixel circuits that is not aligned in the first direction with the sub-pixel of the second pixel row.

5. The display device of claim 4, wherein a bridge line of the plurality of bridge lines electrically connected to the sub-pixel of the first pixel row overlaps the sub-pixel of the first pixel row.

6. The display device of claim 4, wherein at least a portion of a bridge line of the plurality of bridge lines electrically connected to the sub-pixel of the second pixel row overlaps the sub-pixel of the first pixel row.

7. The display device of claim 4, wherein the first sub-pixel located at an outermost portion of the first pixel row is connected to the first bridge line, the second sub-pixel adjacent to the first sub-pixel of the first pixel row is connected to the second bridge line, and the first bridge line connected to the first sub-pixel is located on an other side of the second bridge line connected to the second sub-pixel in the second direction.

8. The display device of claim 4, wherein a sub-pixel from among the plurality of sub-pixels of a first pixel column at an other side in the second direction is electrically connected to a pixel circuit from among the plurality of pixel circuits that is aligned in the second direction with the sub-pixel of the first pixel column, and a sub-pixel from among the plurality of sub-pixels of a second pixel column adjacent to an other side of the first pixel column in the first direction is electrically connected to a pixel circuit from among the plurality of pixel circuits that is not aligned in the second direction with the sub-pixel of the second pixel column.

9. The display device of claim 8, wherein a sub-pixel at an outermost portion of the first pixel column is connected to the first bridge line, a sub-pixel adjacent to the sub-pixel of the first pixel column is connected to the second bridge line, and the first bridge line connected to the sub-pixel of the first pixel column is located at one side of the second bridge line connected to the sub-pixel adjacent to the sub-pixel of the first pixel column in the first direction.

10. The display device of claim 1, wherein a sub-pixel at an outermost portion from among the plurality of sub-pixels arranged along a diagonal direction is connected to the first bridge line, a sub-pixel adjacent to the sub-pixel in the diagonal direction is connected to the second bridge line, and the second bridge line is located above the first bridge line.

11. The display device of claim 1, wherein a position of one end of the first bridge line in a sub-pixel from among the plurality of sub-pixels is different from a position of one end of the second bridge line in a sub-pixel adjacent to inside of the sub-pixel connected to the first bridge line.

12. The display device of claim 1, wherein the plurality of sub-pixels comprises overlapping sub-pixels that overlap the pixel circuits, and non-overlapping sub-pixels that do not overlap the pixel circuits, and wherein a portion of a bridge line connected to a non-overlapping sub-pixel from among the plurality of bridge lines does not overlap the first single crystal semiconductor substrate.

13. The display device of claim 12, wherein the bridge line connected to the non-overlapping sub-pixel from among the plurality of bridge lines is longer than a bridge line connected to an overlapping sub-pixel of the overlapping sub-pixels.

14. The display device of claim 12, wherein a bridge line connected to an overlapping sub-pixel of the overlapping sub-pixels from among the plurality of bridge lines has a zigzag shape.

15. The display device of claim 1, wherein an area of the first single crystal semiconductor substrate is smaller than an area of the second single crystal semiconductor substrate.

16. A display device comprising:

a first single crystal semiconductor substrate on which a plurality of first transistors and a plurality of pixel circuits are located, the plurality of pixel circuits comprising the first transistors;

a second single crystal semiconductor substrate on the first single crystal semiconductor substrate, the second single crystal semiconductor substrate on which a plurality of sub-pixels comprising a plurality of light emitting elements is located; and a connection line layer between the plurality of light emitting elements and the first single crystal semiconductor substrate, wherein the second single crystal semiconductor substrate includes a plurality of through holes in which conductive vias electrically connected to corresponding ones of the plurality of light emitting elements of each of the plurality of sub-pixels is located, wherein the connection line layer comprises a plurality of conductive layers comprising a plurality of bridge lines and a plurality of bridge contacts, and an interlayer insulating layer between the plurality of conductive layers, wherein the plurality of sub-pixels comprises a first sub-pixel connected to one of the plurality of pixel circuits through a first bridge line at a first conductive layer of the connection line layer, and a second sub-pixel connected to one of the plurality of pixel circuits through a second bridge line at a second conductive layer on the first conductive layer of the connection line layer, wherein the first bridge line is entirely spaced from a center of the first sub-pixel in a direction on a plane parallel to the first single crystal semiconductor substrate, wherein the first sub-pixel, the second sub-pixel, a third sub-pixel and a fourth sub-pixel of the plurality of sub-pixels are arranged in a first direction, wherein a first pixel circuit, a second pixel circuit, a third pixel circuit and a fourth pixel circuit of the plurality of pixel circuits are arranged in the first direction, wherein a corresponding area of the first sub-pixel, the second sub-pixel, the third sub-pixel and the fourth sub-pixel each approximates corresponding to four pixel circuits, wherein the first sub-pixel, the second sub-pixel, the third sub-pixel and the fourth sub-pixel do not overlap the first pixel circuit, the second pixel circuit, the third pixel circuit and the fourth pixel circuit in a plan view, wherein a second first sub-pixel, a second second sub-pixel, a second third sub-pixel and a second fourth sub-pixel overlap a second first pixel circuit, a second second pixel circuit, a second third pixel circuit and a second fourth pixel circuit in the first direction in the plan view, wherein fourth sub-pixel is adjacent to the second first sub-pixel, the second first sub-pixel is adjacent to the second second sub-pixel, the second second sub-pixel is adjacent to the second third sub-pixel and the second third sub-pixel is adjacent to the second fourth sub-pixel in the first direction, wherein the first sub-pixel is connected to the first pixel circuit via the first bridge line, and the second sub-pixel is connected to the second pixel circuit via the second bridge line, and the third sub-pixel is connected to the third pixel circuit via a third bridge line of the plurality of bridge lines, and the fourth sub-pixel is connected to the fourth pixel circuit via a fourth bridge line of the plurality of bridge lines, wherein the first bridge line, the second bridge line, the third bridge line and the fourth bridge line each extend in the first direction, wherein a first distance between the first bridge line and the center of the first sub-pixel is greater than a second distance between the second bridge line and a center of the second sub-pixel, wherein the second distance is greater than a third distance between the third bridge line and a center of the third sub-pixel, and wherein the third distance is greater than a fourth distance between the fourth bridge line and a center of the fourth sub-pixel.

17. The display device of claim 16, wherein the second bridge line is electrically connected to a first bridge contact at the first conductive layer, and the first bridge line is electrically connected to a second bridge contact at the second conductive layer.

18. The display device of claim 17, wherein each of the second bridge line and the second bridge contact is connected to corresponding one of the conductive vias.

19. The display device of claim 16, wherein at least a portion of the first bridge line is connected to the second bridge line at the second conductive layer.

20. A head mounted display device comprising:

a frame;

a plurality of display devices on the frame; and lenses on each of the plurality of display devices, wherein the display device comprises:

a first single crystal semiconductor substrate including a plurality of pixel circuits arranged along a first direction and a second direction intersecting the first direction, the plurality of pixel circuits comprising a first transistor;

a second single crystal semiconductor substrate on the first single crystal semiconductor substrate, the second single crystal semiconductor substrate including a plurality of sub-pixels comprising a plurality of light emitting elements and arranged along the first direction and the second direction; and a connection line layer between the plurality of light emitting elements and the first single crystal semiconductor substrate and comprising a plurality of bridge lines, each of the plurality of bridge lines electrically connected to one of the plurality of pixel circuits and one of the plurality of sub-pixels, wherein the second single crystal semiconductor substrate includes a plurality of through holes in which a corresponding ones of conductive vias electrically connected to corresponding ones of the plurality of light emitting elements of each of the plurality of sub-pixels and corresponding ones of the plurality of the bridge lines is located, wherein the connection line layer comprises a first conductive layer at which a first bridge line is located, a second conductive layer at which a second bridge line is located, and an interlayer insulating layer between the first conductive layer and the second conductive layer, wherein at least some of the plurality of sub-pixels are electrically connected to the first bridge line, and other ones of the plurality of sub-pixels adjacent to the sub-pixels connected to the first bridge line are electrically connected to the second bridge line, wherein a first sub-pixel of the plurality of sub-pixels is connected to the first bridge line, the first bridge line being entirely spaced from a center of the first sub-pixel in the second direction on a plane parallel to the first single crystal semiconductor substrate, wherein the first sub-pixel, a second sub-pixel, a third sub-pixel and a fourth sub-pixel of the plurality of sub-pixels are arranged in the first direction, wherein a first pixel circuit, a second pixel circuit, a third pixel circuit and a fourth pixel circuit of the plurality of pixel circuits are arranged in the first direction, wherein a corresponding area of the first sub-pixel, the second sub-pixel, the third sub-pixel and the fourth sub-pixel each approximates an area corresponding to four pixel circuits, wherein the first sub-pixel, the second sub-pixel, the third sub-pixel and the fourth sub-pixel do not overlap the first pixel circuit, the second pixel circuit, the third pixel circuit and the fourth pixel circuit in a plan view, wherein a second first sub-pixel, a second second sub-pixel, a second third sub-pixel and a second fourth sub-pixel overlap a second first pixel circuit, a second second pixel circuit, a second third pixel circuit and the second fourth pixel circuit in the first direction in the plan view, wherein the sub-pixel is adjacent to the second first sub-pixel, the second first sub-pixel is adjacent to the second second sub-pixel, the second second sub-pixel is adjacent to the second third sub-pixel and the second third sub-pixel is adjacent to the second fourth sub-pixel in the first direction, wherein the first sub-pixel is connected to the first pixel circuit via the first bridge line, and the second sub-pixel is connected to the second pixel circuit via the second bridge line, and the third sub-pixel is connected to the third pixel circuit via a third bridge line of the plurality of bridge lines, and the fourth sub-pixel is connected to the fourth pixel circuit via a fourth bridge line of the plurality of bridge lines, wherein the first bridge line, the second bridge line, the third bridge line and the fourth bridge line each extend in the first direction, wherein a first distance between the first bridge line and a center of the first sub-pixel is greater than a second distance between the second bridge line and a center of the second sub-pixel, wherein the second distance is greater than a third distance between the third bridge line and a center of the third sub-pixel, and wherein the third distance is greater than a fourth distance between the fourth bridge line and a center of the fourth sub-pixel.

* * * * *